US007668465B2

(12) United States Patent
Tanaka et al.

(10) Patent No.: US 7,668,465 B2
(45) Date of Patent: Feb. 23, 2010

(54) DISPERSION-MANAGED OPTICAL TRANSMISSION SYSTEM

(75) Inventors: Toshiki Tanaka, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/128,740

(22) Filed: May 29, 2008

(65) Prior Publication Data
US 2008/0226303 A1 Sep. 18, 2008

Related U.S. Application Data

(62) Division of application No. 10/747,314, filed on Dec. 30, 2003, now Pat. No. 7,457,546.

(30) Foreign Application Priority Data

Jan. 20, 2003 (JP) ............................. 2003-011643

(51) Int. Cl.
*H04B 10/12* (2006.01)
(52) U.S. Cl. .................... 398/147; 398/136; 398/158
(58) Field of Classification Search .............. 398/81, 398/136, 147, 158
See application file for complete search history.

(56) References Cited

U.S. PATENT DOCUMENTS

| | | |
|---|---|---|
| 6,414,775 B1 | 7/2002 | Pedersen |
| 6,583,907 B1 | 6/2003 | Essiambre |
| 6,882,466 B1 | 4/2005 | Shimojoh et al. |
| 7,058,311 B1 | 6/2006 | Islam et al. |
| 7,457,546 B2 | 11/2008 | Tanaka et al. |
| 2002/0114061 A1 | 8/2002 | Naito et al. |
| 2002/0131132 A1 | 9/2002 | Tanaka et al. |
| 2002/0131711 A1 | 9/2002 | Tanaka et al. |

(Continued)

FOREIGN PATENT DOCUMENTS

EP 0 777 347 6/1997

(Continued)

OTHER PUBLICATIONS

Patent Abstract of Japan, Publication No. 10-200509, published Jul. 31, 1998.

(Continued)

*Primary Examiner*—Dzung D Tran
(74) *Attorney, Agent, or Firm*—Staas & Halsey LLP

(57) ABSTRACT

An optical transmission system that alleviates waveform distortions due to nonlinear effects in fibers. A transmitter sends WDM signals to a receiver over a dispersion-managed optical transmission line with in-line optical repeaters. The transmission line is divided into a plurality of dispersion compensation intervals each composed of a main segment and a compensation segment. Chromatic dispersion is managed such that the dispersion compensation intervals have a non-zero net dispersion at every boundary point between them, or such that the number of zero-dispersion boundary points is reduced. The main segment is a series of repeater sections with negative dispersion, while the compensation segment is a single repeater section with positive dispersion. Non-uniform distribution of net chromatic dispersions over the transmission length is achieved by combining repeater section with different average dispersions, dispersion compensation intervals with different numbers of repeater sections, or repeater sections with different span lengths.

4 Claims, 56 Drawing Sheets

U.S. PATENT DOCUMENTS

| | | | |
|---|---|---|---|
| 2003/0165004 A1* | 9/2003 | Ueki | 359/334 |
| 2004/0190125 A1* | 9/2004 | Onaka et al. | 359/341.3 |
| 2005/0078351 A1* | 4/2005 | Avallone et al. | 359/334 |

FOREIGN PATENT DOCUMENTS

| | | |
|---|---|---|
| EP | 1 035 671 | 9/2000 |
| JP | 2000-261377 | 9/2000 |
| JP | 2001-102666 | 4/2001 |

OTHER PUBLICATIONS

Patent Abstract of Japan, Publication No. 2000-151507, published May 30, 2000.

Patent Abstracts of Japan, Publication No. 09-093202, published Apr. 4, 1997.

Vincent Lemaire et al., "GIGA 5: un système de transmission sous-marine transocéanique à 5 Gbit/s utilisant l'amplification optique \GIGA 5: a 5 Gbit/s Transoceanic Submarine Transmission System", L'Onde Electrique, Editions Chiron S.A., Paris, France. vol. 73, No. 2, Mar. 1, 1993, pp. 24-29. Abstract.

U.S. Appl. No. 10/747,314, filed Dec. 30, 2003, Toshiki Tanaka et al., Fujitsu Limited.

Partial European Search Report, mailed May 24, 2007 and issued in corresponding European Patent Application No. 04000224.8-1246.

European Search Report, mailed Jul. 26, 2007 and issued in corresponding European Patent Application No. 04000224.8-1246.

Japanese Patent Office Action, mailed Sep. 4, 2007 and issued in corresponding Japanese Patent Application No. 2003-011643.

Japanese Patent Office Action mailed Feb. 19, 2008 and issued in corresponding Japanese Patent Application No. 2003-011643.

Issue Notification mailed Nov. 5, 2008 in U.S. Appl. No. 10/747,314.

Supplemental Notice of Allowability mailed Oct. 23, 2008 in U.S. Appl. No. 10/747,314.

Notice of Allowance and Fee(s) Due mailed Apr. 17, 2008 in U.S. Appl. No. 10/747,314.

Office Action mailed Oct. 4, 2007 in U.S. Appl. No. 10/747,314.

Office Action mailed Jun. 14, 2007 in U.S. Appl. No. 10/747,314.

Office Action mailed Nov. 29, 2006 in U.S. Appl. No. 10/747,314.

* cited by examiner

Signals deteriorate due to nonlinear effects at boundary points between compensation intervals where net dispersion is zero Signal quality improves because non-zero net dispersion alleviates nonlinear effects at boundary points between compensation intervals

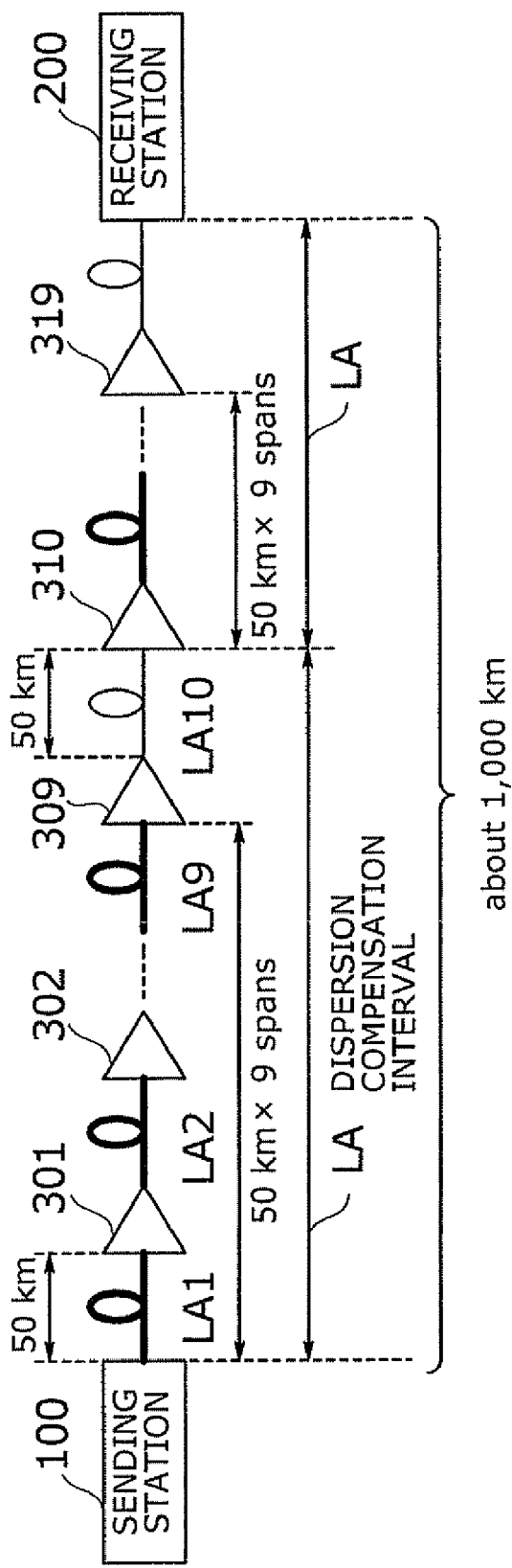
FIG. 2 *PRIOR ART*

|  | Pumps | Cables |
|---|---|---|
| +Davg/-Davg | 3 | 2 |
| -Davg/+Davg | 3 | 2 |
| +Davg/+Davg | 0 | 1 |
| -Davg/-Davg | 0 | 1 |

AL1 — POWER BALANCE ADJUSTMENT ALGORITHM

| | | Rules | | | |
|---|---|---|---|---|---|
| | | #1 | #2 | #3 | #4 |
| Optical Signal Power Level | Upstream | High | Low | Low | High |
| | Downstream | Low | High | Low | High |
| Pump Light Power | +Davg/−Davg | Raise | Lower | Raise | Lower |
| | −Davg/+Davg | Lower | Raise | Raise | Lower |

FIG. 42

| Optical Power Level | | Point A | Section | | | | | |
|---|---|---|---|---|---|---|---|---|
| | | | #1 | #2 | #3 | #4 | #5 | #6 |
| | Upstream | -6 | -10.1 | -14.2 | -18.2 | -14.5 | -10.7 | -7.0 |
| | Downstream | -8 | -12.6 | -17.1 | -21.7 | -16.8 | -11.9 | -7.0 |

FIG. 43

| Section | #1 | #2 | #3 | #4 | #5 | #6 |
|---|---|---|---|---|---|---|
| Pump Light Power (mW) | 9.5 | 9.5 | 9.5 | 221 | 221 | 221 |
| Raman Gain Upstream | 6.7 | 6.7 | 6.7 | 14.6 | 14.6 | 14.6 |
| Raman Gain Downstream | 6.2 | 6.2 | 6.2 | 15.7 | 15.7 | 15.7 |

FIG. 45

AL2 POWER BALANCE ADJUSTMENT ALGORITHM

|  |  | Rules | | | |
| --- | --- | --- | --- | --- | --- |
|  |  | #1 | #2 | #3 | #4 |
| Optical Signal Power Level | Upstream | High | Low | Low | High |
|  | Downstream | Low | High | Low | High |
| Pump Light Power | +Davg/-Davg | Raise | Lower | Raise | Lower |
|  | -Davg/+Davg | Lower | Raise | Raise | Lower |
| VOA Attenuation Level | Upstream | Raise | Lower | Lower | Raise |
|  | Downstream | Lower | Raise | Lower | Raise |

FIG. 47

NORMAL DISPERSION COMPENSATION INTERVAL

| | Pumps | Cables |
|---|---|---|
| +Davg/-Davg | 3 | 2 |
| -Davg/+Davg | 3 | 2 |
| +Davg/+Davg | 0 | 1 |
| -Davg/-Davg | 0 | 1 |

T2 DISPERSION COMPENSATION INTERVAL WITH GAIN EQUALIZING SECTION

| | Pumps | Cables |
|---|---|---|
| +Davg/-Davg | 2 | 1 |
| -Davg/+Davg | 2 | 1 |
| +Davg/+Davg | 2 | 3 |
| -Davg/-Davg | 0 | 1 |

AL3 POWER BALANCE ADJUSTMENT ALGORITHM

|  |  | Rules | | | |
| --- | --- | --- | --- | --- | --- |
|  |  | #1 | #2 | #3 | #4 |
| Optical Signal Power Level | Upstream | High | Low | Low | High |
|  | Downstream | Low | High | Low | High |
| Pump Light Power | +Davg/-Davg | Raise | Lower | Raise | Lower |
|  | -Davg/+Davg | Lower | Raise | Raise | Lower |
|  | +Davg/+Davg | No change | No change | Raise | Lower |
|  | -Davg/-Davg | No change | No change | Raise | Lower |

FIG. 53

DISPERSION-MANAGED OPTICAL TRANSMISSION SYSTEM

CROSS REFERENCE TO RELATED APPLICATION

This application is a divisional of Ser. No. 10/747,314 filed Dec. 30, 2003, now U.S. Pat. No. 7,457,546, the disclosure of which is incorporated herein by reference.

BACKGROUND OF THE INVENTION

1. Field of the Invention

The present invention relates to an optical transmission system, and more particularly to an optical transmission system which transports optical signals over a dispersion-managed transmission line by using wavelength-division multiplexing (WDM) techniques.

2. Description of the Related Art

Long-haul optical transmission systems use in-line repeaters for retiming, reshaping, and regenerating information signals at appropriate intervals along the fiber-optic transmission path. While earlier regenerative repeaters convert optical signals back to electrical form before performing such signal processing functions, today's mainstream systems employ a linear, optical fiber amplifier that amplifies light signals purely in the optical domain. The use of optical amplifiers in place of regenerative circuits drastically reduces the number of components required in repeater equipment, resulting in a significant cost reduction and reliability improvement.

Recent years have also seen great leaps in the capacity of optical networks, mainly because of the development of wavelength-division multiplexing (WDM) technologies. WDM systems transmit many signals simultaneously on a single fiber, using different optical wavelengths. The combined use of WDM and optical amplification techniques has made it possible to send and receive large amounts of data over a great distance in the most economical way. In such modern optical transmission systems, however, chromatic dispersion and nonlinear effects in optical fibers become increasingly problematic, as the communications market dictates higher optical signal power, longer transmission distances, and denser wavelength channels. How to deal with chromatic dispersion and nonlinear effects is a key issue in designing a high-speed high-capacity optical transmission line.

Chromatic dispersion is a phenomenon that causes the separation of a light wave into its spectral components and thus broadens the pulse width as it propagates through a fiber medium. Nonlinear effects refer to a class of interferences that a relatively strong light could encounter when it goes through a glass medium, where non-linearity of the medium comes to the surface because of its properties affected by the intensity of the light. We must suppress such chromatic dispersion and nonlinear effects to sufficiently low levels to realize distortion-free long-distance transport of optical pulses.

Chromatic dispersion can, in fact, be canceled by placing dispersion compensating fibers on the optical path at appropriate intervals. Such design techniques are called "dispersion management," and it is known that a dispersion-managed transmission line not only prevents the propagating optical pulses from suffering dispersion distortion, but also alleviates nonlinear effects on them.

The existing dispersion compensation techniques include the use of a non-zero dispersion-shifted fiber (NZ-DSF) in combination with a single mode fiber (SMF). More specifically, it is proposed to use an NZ-DSF medium with a zero-dispersion wavelength of 1585 nm and a dispersion coefficient of about −2 ps/nm/km in the operating wavelength band, and an SMF medium with a zero-dispersion wavelength of 1310 nm and a dispersion coefficient of about −18 ps/nm/km in the same band. This technique is referred to herein as the "first conventional scheme." For more details, see N. S. Bergano, "Wavelength Division Multiplexing in Long-Haul Transmission Systems," IEEE Journal of Lightwave Technology, Vol. 14, No. 6, 1996, pp. 1299-1308.

The above first conventional scheme, however, has a disadvantage in its characteristics of dispersion slope (or first derivative of chromatic dispersion with respect to wavelength). That is, the combination of NZ-DSF and SMF does not allow us to expand the operating wavelength band for higher link capacity, because its minimum-dispersion window is too narrow to cancel dispersions for all the required wavelengths.

Another existing technique uses positive-dispersion fiber (+D fiber) and negative-dispersion fiber (−D fiber) to form each repeater section. Positive-dispersion fiber exhibits a positive dispersion in the operating wavelength band and zero dispersion at the wavelength of 1.3 μm. To cancel out the chromatic dispersion and dispersion slope of this +D fiber, a negative-dispersion fiber with opposite characteristics is combined. Each repeater section has a hybrid structure of half positive and half negative dispersions. This technique is referred to herein as the "second conventional scheme." For more details, see M. Murakami et al., "Long-haul 16×10 WDM transmission experiment using higher order fiber dispersion management technique", ECOC'98, 1998, pp. 313-314.

The second conventional scheme permits us to expand the signal wavelength band, since its dispersion compensation capability covers a wider range of optical wavelengths. The problem is, however, that WDM optical pulses (or bits) with different wavelengths are aligned at every boundary point between dispersion compensation intervals. This causes nonlinear effects in fibers, thus deforming transmission signals.

Meanwhile, Raman amplifiers are of particular interest in these years. Raman amplifiers are based on a physical phenomenon, known as the "Raman effect," that the wavelength of light changes when a light beam is deflected by vibrating molecules. Signal amplification occurs if optical pump waves with the correct wavelength and power level are launched into the optical fiber, turning the full transmission length into an amplifying medium. The peak gain of Raman amplification is obtained at the wavelength that is about 100 nm longer than the pump light beam's. That is, the launched pump beam boosts optical signals with 100-nm longer wavelengths. This means that, for example, a 1.45-μm pump light beam is used to amplify 1.55-μm optical signals.

Compared to Erbium($Er^{3+}$)-doped fiber (EDF) amplifiers, the above-described Raman amplifiers are more suitable for optical repeaters for use in long-distance applications, because they allow the use of longer fiber cables to extend repeater intervals. Also, Raman amplifiers operate at low noise levels, as well as is applicable to wideband transmission when used with multiple-wavelength pump light sources.

The gain of a Raman amplifier depends on the length of an optical fiber serving as the amplification medium. This nature of Raman amplifiers poses a problem in constructing hybrid transmission lines using +D fiber and −D fiber. More specifically, +D and −D fibers are combined at an appropriate ratio that is determined by the desired dispersion characteristic of upstream or downstream repeater sections. Upstream sections may be designed to have a different length ratio from downstream sections in this case, and that difference in lengths could result in an unbalanced Raman gain distribution between the upstream and downstream transmission lines, which leads to reduced reliability of optical amplification.

SUMMARY OF THE INVENTION

In view of the foregoing, it is an object of the present invention to provide an optical transmission system that alleviates waveform distortions due to nonlinear effects in fibers, as well as reducing unbalanced distribution of Raman amplification gains, in order to offer high-quality, high-reliability communication services.

To accomplish the above object, the present invention provides an optical transmission system comprising the following elements: (a) a transmitter that transmits wavelength-division multiplexed (WDM) optical signals; (b) a receiver that receives the WDM optical signals; (c) at least one optical repeater; and (d) an optical transmission line on which said at least one optical repeater is disposed. The optical transmission line is divided into a plurality of dispersion compensation intervals. Chromatic dispersion in the optical transmission line is managed in such a way that the dispersion compensation intervals have a non-zero net chromatic dispersion at every boundary point therebetween, or in such a way that the number of boundary points with zero net chromatic dispersion is reduced.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 illustrates a conventional dispersion management scheme.

FIG. 41 is a table showing the number of pumps and the number of cables in a dispersion compensation interval.

FIG. 42 is a table representing an algorithm of power balance adjustment for optical signals.

FIG. 43 shows a distribution of optical signal power.

FIG. 45 shows pump light power and Raman gain in each section.

FIG. 47 is a table representing an algorithm of power balance adjustment for optical signals.

FIG. 53 is a table representing an algorithm for power balance adjustment for optical signals.

DESCRIPTION OF THE PREFERRED EMBODIMENTS

Figure 1A:
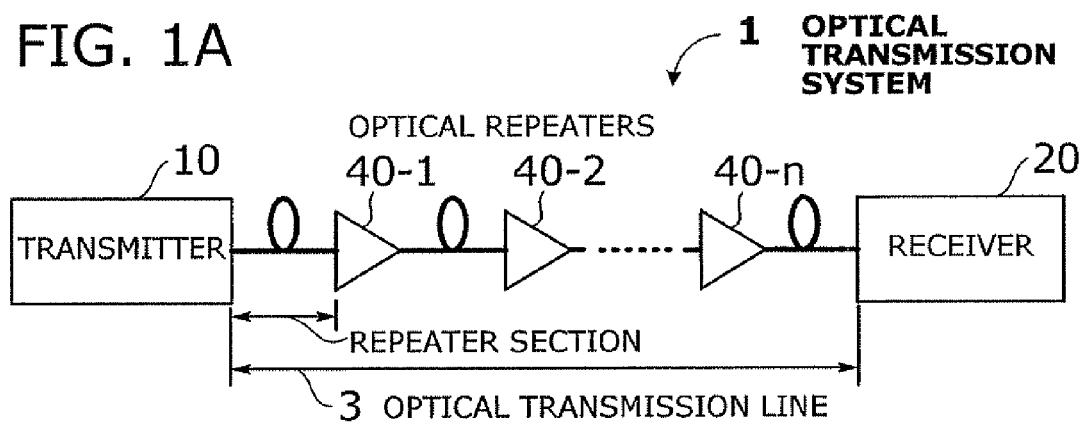
FIG. 1A is a conceptual view of an optical transmission system according to the present invention.

Preferred embodiments of the present invention will be described below with reference to the accompanying drawings, wherein like reference numerals refer to like elements throughout.

Concept of the Invention

FIG. 1A is a conceptual view of an optical transmission system according to the present invention. The illustrated optical transmission system 1 is intended to deliver large amounts of data at a high speed over a long distance. The system 1 comprises the following components: a transmitter 10, a receiver 20, a plurality of optical repeaters 40-1 to 40-$n$ (referred to collectively by the reference numeral "40"), and an optical transmission line 3 made up of a plurality of repeater sections. While FIG. 1 only shows a unidirectional transmission link for the sake of simplicity, most implementations of the optical transmission system 1 will have upstream and downstream links to make two-way communication possible. Each end station employs both transmitter 10 and receiver 20 in this case.

The transmitter 10 multiplexes SONET, SDH, ATM, or other given signals using wavelength-division multiplexing techniques and sends the resultant optical signals over a single optical transmission line 3. The receiver 20 receives this multiplexed signals and splits them back into individual optical signals with different wavelengths for processing in later stages. The optical transmission line 3 employs a plurality of optical repeaters 40-1 to 40-$n$. The chromatic dispersion of optical signals is managed at appropriate dispersion compensation intervals, such that a non-zero net dispersion will be obtained at boundary points between dispersion compensation intervals, or such that the number of boundary points with zero net dispersion is reduced.

Figure 1B:
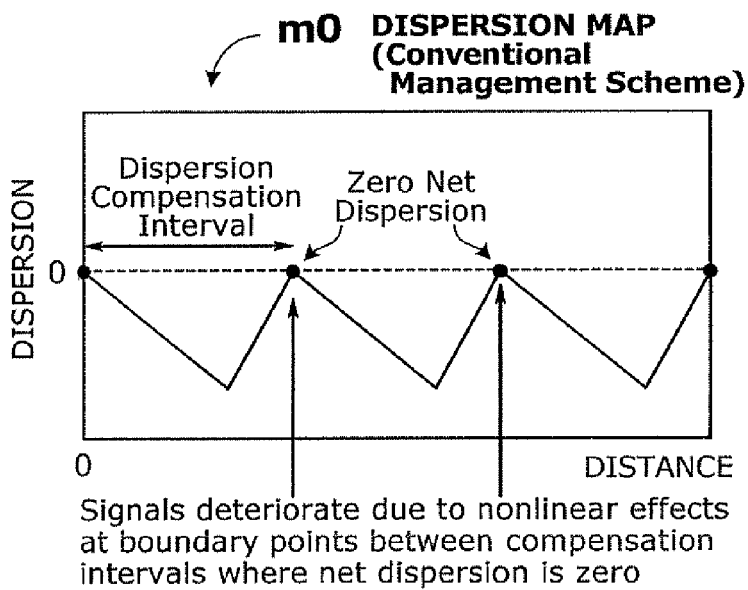
FIGS. 1B and 1C show dispersion maps according to a conventional management scheme and a new management scheme according to the invention, respectively.
Figure 1C:
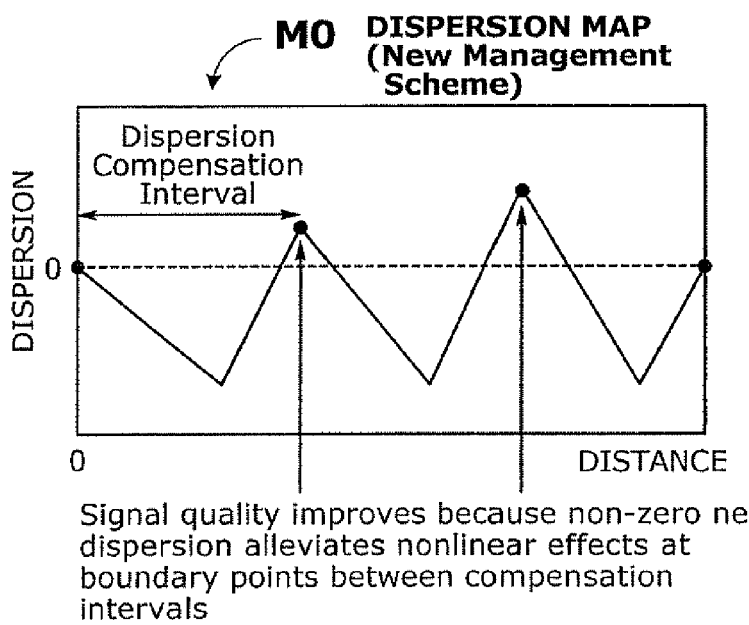

Dispersion maps are used to represent a profile of chromatic dispersion accumulated along the length of an optical transmission line. FIGS. 1B and 1C show dispersion maps m0 and M0, respectively, for comparison between a conventional dispersion management scheme and a new management scheme that we propose. Referring first to FIG. 1B, this conventional dispersion map m0 represents dispersion management where the net dispersion becomes zero at every boundary point between dispersion compensation intervals. Non-linear effects are likely to occur at those zero-dispersion points, which degrade the quality of transmission signals. FIG. 1C shows an improved dispersion map M0 according to the present invention, which differs from the conventional map m0 in that the net dispersion does not return to zero at any boundary points of compensation intervals. This dispersion profile alleviates nonlinear effects in the fiber medium, thus making it possible to deliver optical signals at a high quality level.

While the net dispersion of the entire transmission line has to be corrected to zero, the balance in each dispersion compensation interval may not necessarily be so. The dispersion management of the present invention deliberately gives non-zero net dispersion to each compensation interval while ensuring that the optical transmission signals can reach the destination with no residual dispersions. We will elaborate on this issue in a later section of this description, with reference to FIG. 10 and subsequent diagrams.

Conventional Dispersion Management

In this section, we will review what problems the present invention is intended to solve. Referring first to FIG. 2, a conventional dispersion management scheme is shown, which is what we have mentioned as the first conventional scheme in the "Background of the Invention" section. The illustrated system comprises a sending station 100, a receiving station 200, and a plurality of EDF amplifiers 301 to 319 disposed along the length of a transmission line that interconnects the two stations 100 and 200. The repeater section, or span between two repeaters, is 50 km in length. In the system of FIG. 2, one dispersion compensation interval LA consists of ten repeater sections LA1 to LA10, and two different types of fibers are used in combination. That is, a non-zero dispersion-shifted fiber (NZ-DSF) is used to form the first nine repeater sections LA1 to LA9, while a single mode fiber (SMF) is used in the tenth section LA10. NZ-DSF has a zero-dispersion wavelength of 1585 nm and a dispersion coefficient of about −2 ps/nm/km in an operating wavelength band around 1585 nm. SMF, on the other hand, has a zero-dispersion wavelength of 1310 nm and a dispersion coefficient of about +18 ps/nm/km in the same wavelength band. The illustrated system has two such dispersion compensation intervals LA between the sending station 100 and receiving station 200, and thus the total transmission distance is about 1,000 km.

With the first conventional scheme, the negative dispersion accumulated in nine NZ-DSF sections is cancelled out by the positive dispersion of SMF in the tenth section of every dispersion compensation interval LA. The balance in each interval is expressed as follows:

$$(-2) \times 50 \text{ km} \times 9 \text{ spans} + 18 \times 50 \text{ km} = 0$$

The net dispersion of the entire transmission line can thus be corrected to zero.

Figure 3:
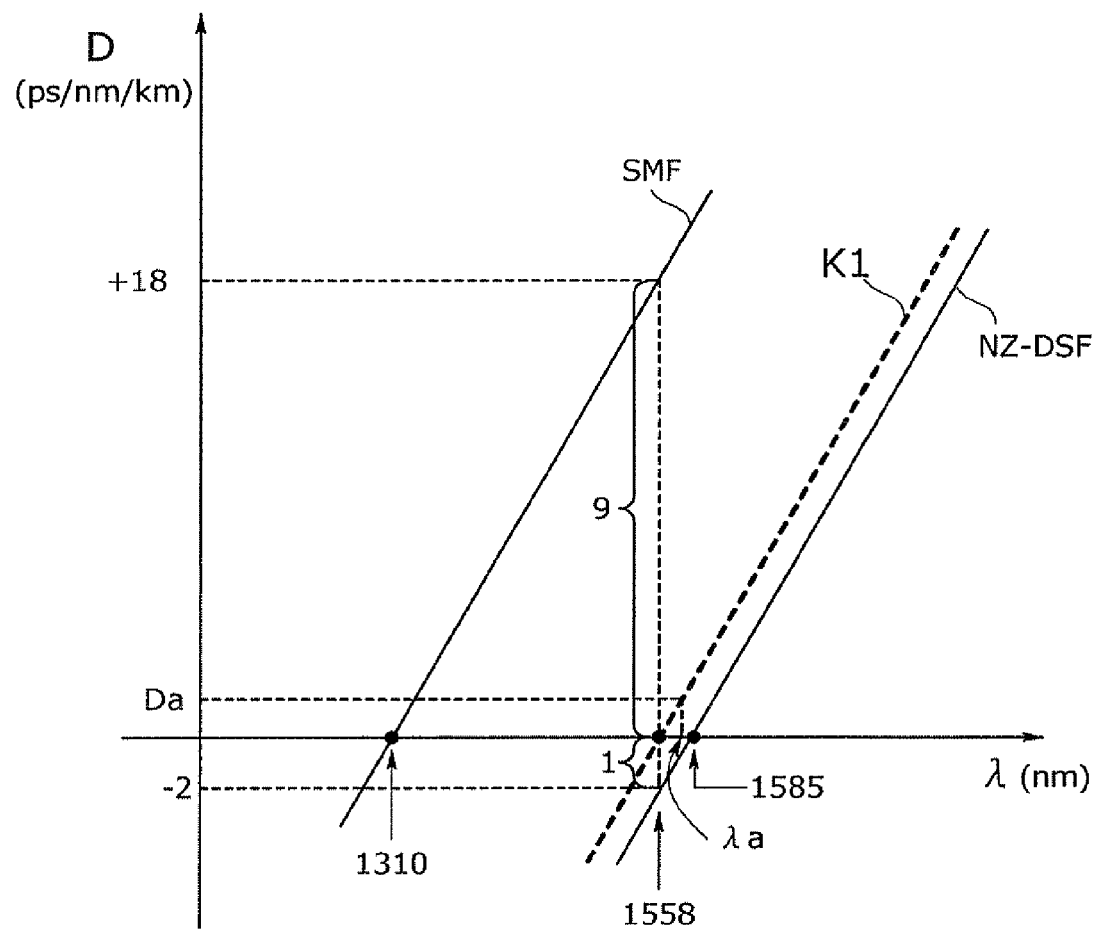
FIG. 3 shows dispersion characteristics of NZ-DSF and SMF.

The first conventional scheme, however, would not work well if a wider transmission wavelength range is required. FIG. 3 explains why. The vertical axis of this graph represents dispersion D in ps/nm/km, and the horizontal axis represents the wavelength $\lambda$ in nm. The two solid straight lines indicate dispersion slopes of NZ-DSF and SMF. As mentioned, the zero-dispersion wavelength of NZ-DSF is 1585 nm, while that of SMF is 1310 nm. Their respective dispersion coefficients at 1558 nm are −2 ps/nm/km and +18 ps/nm/km. That is, when NZ-DSF and SMF are combined in the ratio of 9:1, their average zero-dispersion wavelength is 1558 nm. The broken straight line K1 in FIG. 3 represents the average dispersion slope, namely, the dispersion characteristic of the compensation intervals LA.

According to the first conventional scheme, the system of FIG. 2 offers a minimum dispersion in the vicinity of 1558 nm. However, this minimum-dispersion window is too narrow to accommodate more WDM wavelengths for a wider communication bandwidth. Think of, for example, using a wavelength $\lambda a$ that is slightly longer than 1558 nm. As FIG. 3 shows, the average dispersion curve K1 gives a non-zero dispersion Da at $\lambda a$, meaning that the communication channel using this wavelength $\lambda a$ is not dispersion-free at the boundary point between dispersion compensation intervals LA. That is, the first conventional technique has a problem in that its compensation range is too narrow to allow for an expanded communication bandwidth.

Figure 4:
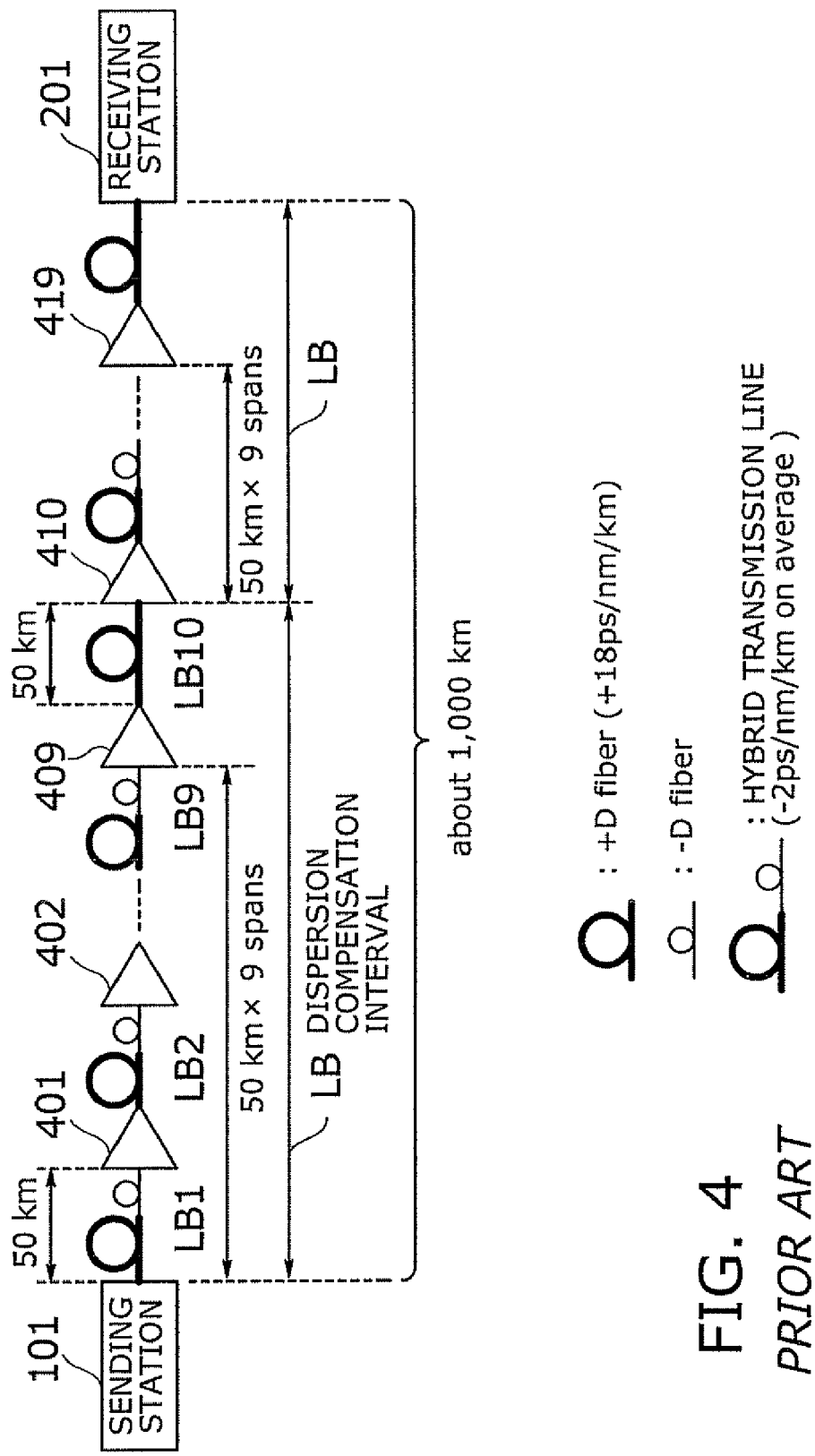
FIG. 4 illustrates another conventional dispersion management scheme.

FIG. 4 shows another conventional dispersion management, which we have mentioned as the second conventional scheme in the Background of the Invention section. The illustrated system uses +D fiber in combination with −D fiber to form an alternating-dispersion hybrid transmission line. The system comprises a sending station 101, a receiving station 201, and a plurality of EDF amplifiers 401 to 419 disposed on the transmission line that interconnects the two stations.

In the system of FIG. 4, one dispersion compensation interval LB consists of ten repeater sections LB1 to LB10, each with a span length of 50 km. The first nine sections LA1 to LA9 form a hybrid transmission line, each section consisting of +D fiber and −D fiber with a section average dispersion of −2 ps/nm/km at 1585 nm. The tenth repeater section uses +D fiber with a dispersion of +18 ps/nm/km at 1585 nm. The illustrated system employs two such dispersion compensation intervals LB between the sending station 101 and receiving station 201, and thus the total transmission distance is about 1,000 km.

With the second conventional scheme of FIG. 4, the negative dispersion accumulated in the hybrid transmission lines is cancelled out by the positive dispersion of +D fiber in the tenth section of each dispersion compensation interval LB. This balance is expressed as follows:

$$(-2) \times 50 \text{ km} \times 9 \text{ spans} + 18 \times 50 \text{ km} = 0$$

The net dispersion of the entire transmission line can thus be canceled to zero.

Figure 5:
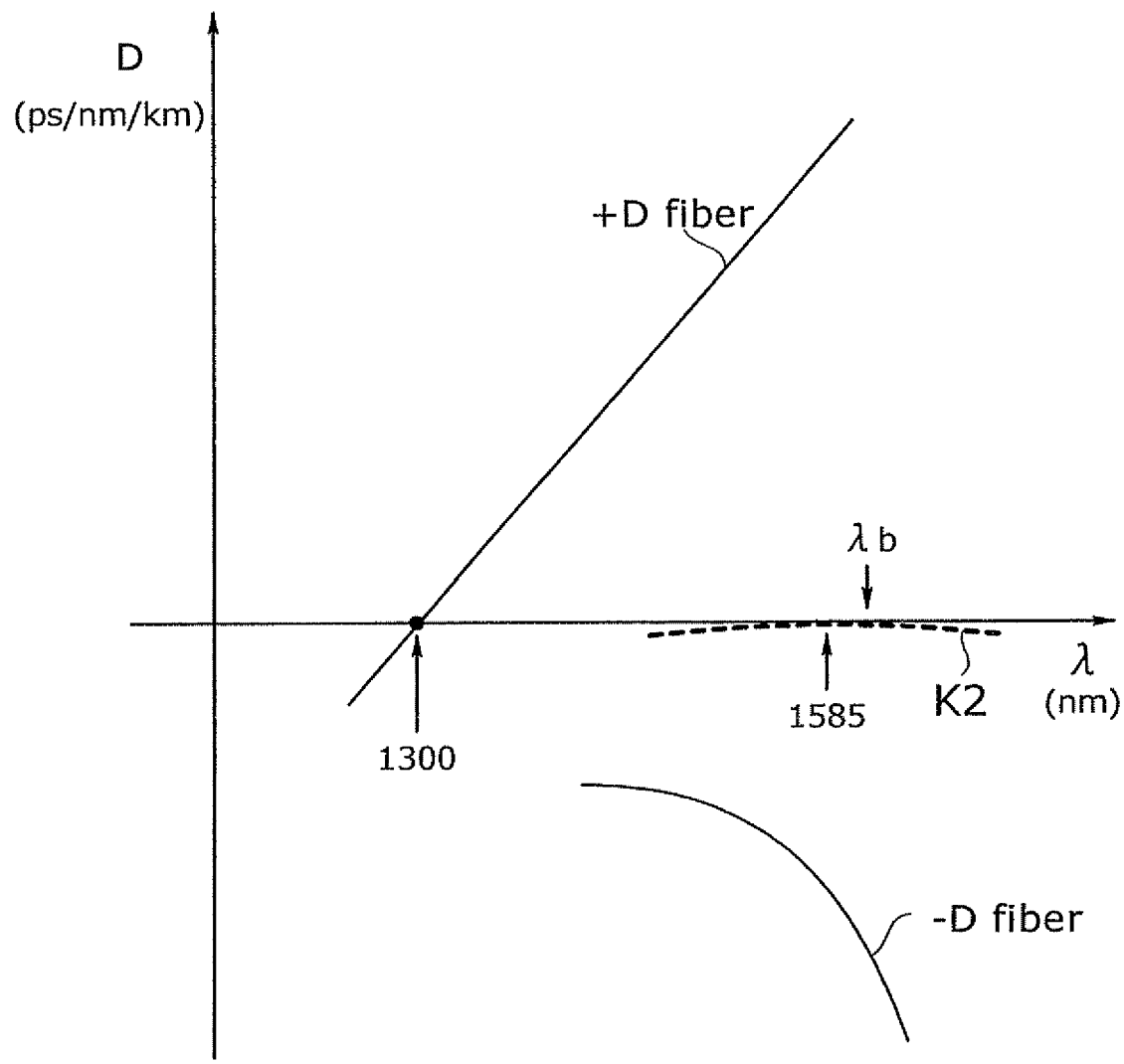
FIG. 5 shows dispersion characteristics of +D fiber and −D fiber.

Unlike the first conventional scheme, the second conventional scheme can reduce the accumulated dispersion of a transmission line even in the case that a wider transmission wavelength range is required. FIG. 5 is a graph showing how the chromatic dispersion is canceled. The vertical axis of this graph represents dispersion D in ps/nm/km, and the horizontal axis represents wavelength $\lambda$ in nm. The two solid lines indicate dispersion slopes of +D fiber and −D fiber. The +D fiber has a zero-dispersion wavelength of 1300 nm and a substantially linear slope (although it would exhibit some nonlinearity when used in a wider range of wavelengths). The −D fiber, on the other hand, has a non-linear dispersion curve as shown in FIG. 5. When averaged, those +D and −D fibers provides a mild dispersion slope as indicated by the broken line K2 in FIG. 3. This curve K2 represents the residual dispersion in each compensation interval LB.

As FIG. 5 shows, the second conventional scheme offers a wider minimum-dispersion window that can accommodate more WDM wavelengths for higher bandwidth communication. Think of, for example, using a wavelength $\lambda b$ that is longer than 1585 nm. The averaged dispersion curve K2 gives substantially zero dispersion in a wide wavelength range, which contains the wavelength $\lambda b$. The dispersion-free intervals LB of the second conventional scheme permits the WDM system to expand its bandwidth.

Figure 6:
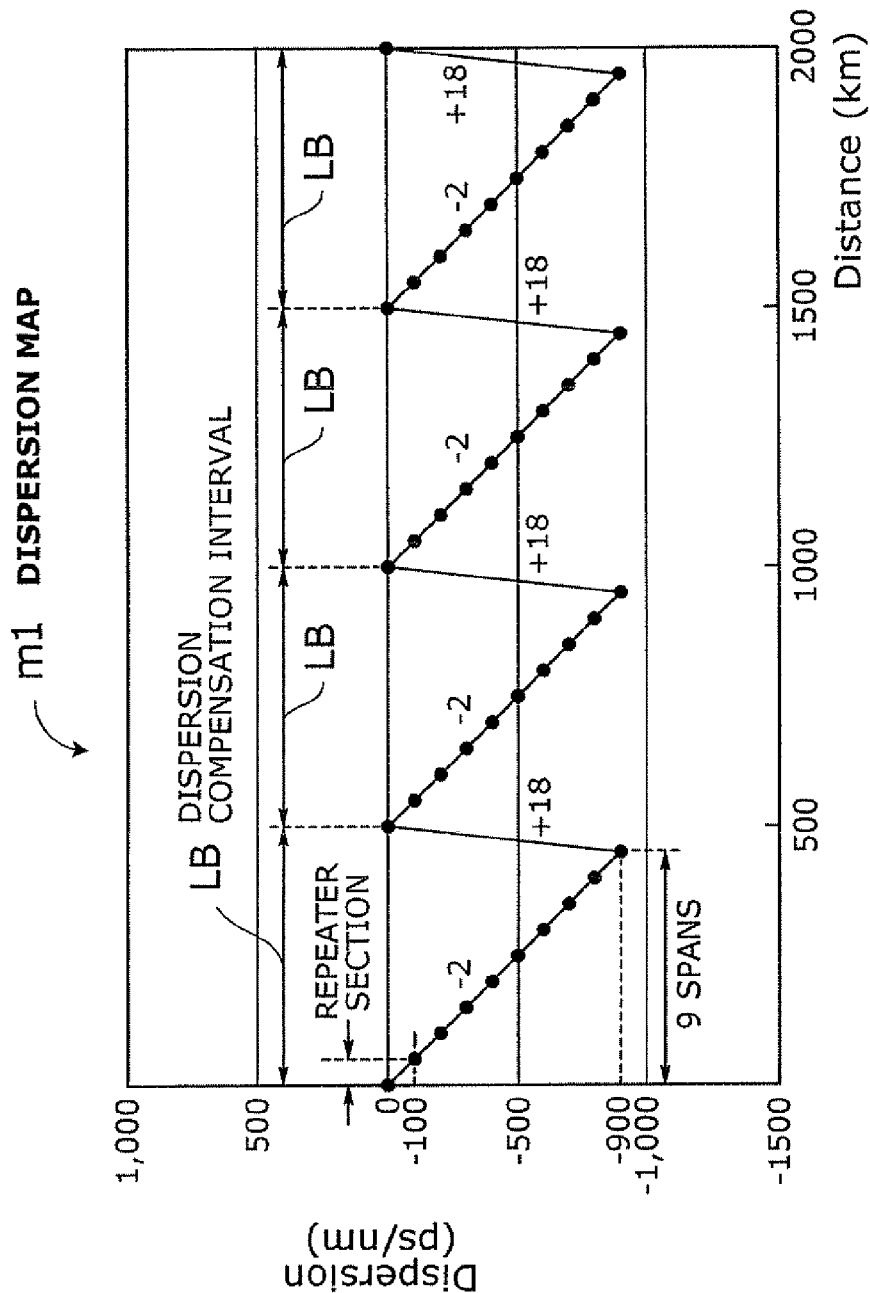
FIG. 6 shows a conventional dispersion map.

FIG. 6 is a dispersion map according to the second conventional scheme. This dispersion map m1 shows how the chromatic dispersion is managed in a system with four dispersion compensation intervals LB. The vertical axis represents the amount of dispersion D in ps/nm, and the horizontal axis represents the distance from the sending station in units of km.

Since the hybrid transmission line with +D and −D fibers has an average dispersion of −2 ps/nm per kilometer, the dispersion that accumulates in each repeater section spanning 50 km is −100 ps/nm. For nine repeater sections, the dispersion amounts to −900 ps/nm. Those sections are followed by a single span of +D fiber with a dispersion coefficient of +18 ps/nm per kilometer. This +D section is also 50 km in length and thus gives a dispersion of +900 ps/nm, which cancels out the accumulated dispersion of the preceding −D sections. Accordingly, one dispersion compensation interval LB has zero average dispersion. FIG. 6 shows four consecutive instances of such a compensation interval LB.

As can be seen from the above, the second conventional scheme makes it possible to implement dispersion compensation for the entire wavelength range that is used to transmit signals. In this system, however, optical transmission signals are likely to deteriorate due to nonlinear effects at the boundary points of dispersion compensation intervals LB, where the net chromatic dispersion always becomes zero. The same holds true for systems according to the aforementioned first conventional scheme. The following gives details of this nonlinearity issue.

Generally, light pulses traveling through an optical transmission line suffer a certain amount of distortion due to various nonlinear effects that could happen in the fiber. They include: four-wave mixing (FWM), self-phase modulation (SPM), and cross-phase modulation (XPM). Four-wave mixing occurs when two light waves $\omega 1$ and $\omega 2$ propagate together through an optical fiber. With third-order non-linear polarization, the interference between those waves $\omega 1$ and $\omega 2$ creates new signals with wavelengths of $\omega 3$ and $\omega 4$ when a condition known as phase matching is satisfied. Cross-phase modulation happens to two light signals with different wavelengths that propagate through an optical fiber. The intensity variations of one signal causes a refractive index change in the fiber, which alters the phase of the other signal. Self-phase modulation (SPM) refers to a phase variation of an optical pulse that occurs as a result of a refractive index change induced by the pulse itself.

Figure 7:
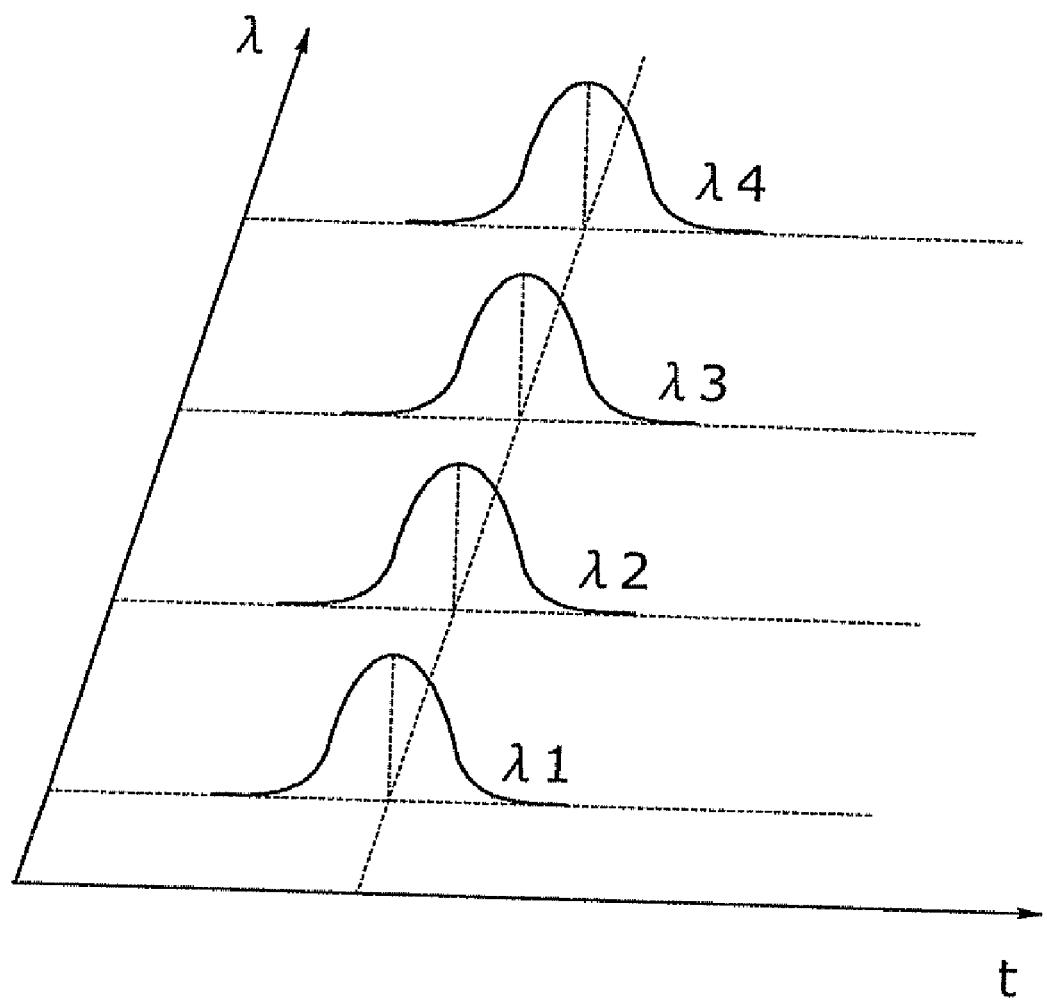
FIGS. 7 and 8 explain how the optical pulses with different wavelengths are aligned in the time domain.
Figure 8:
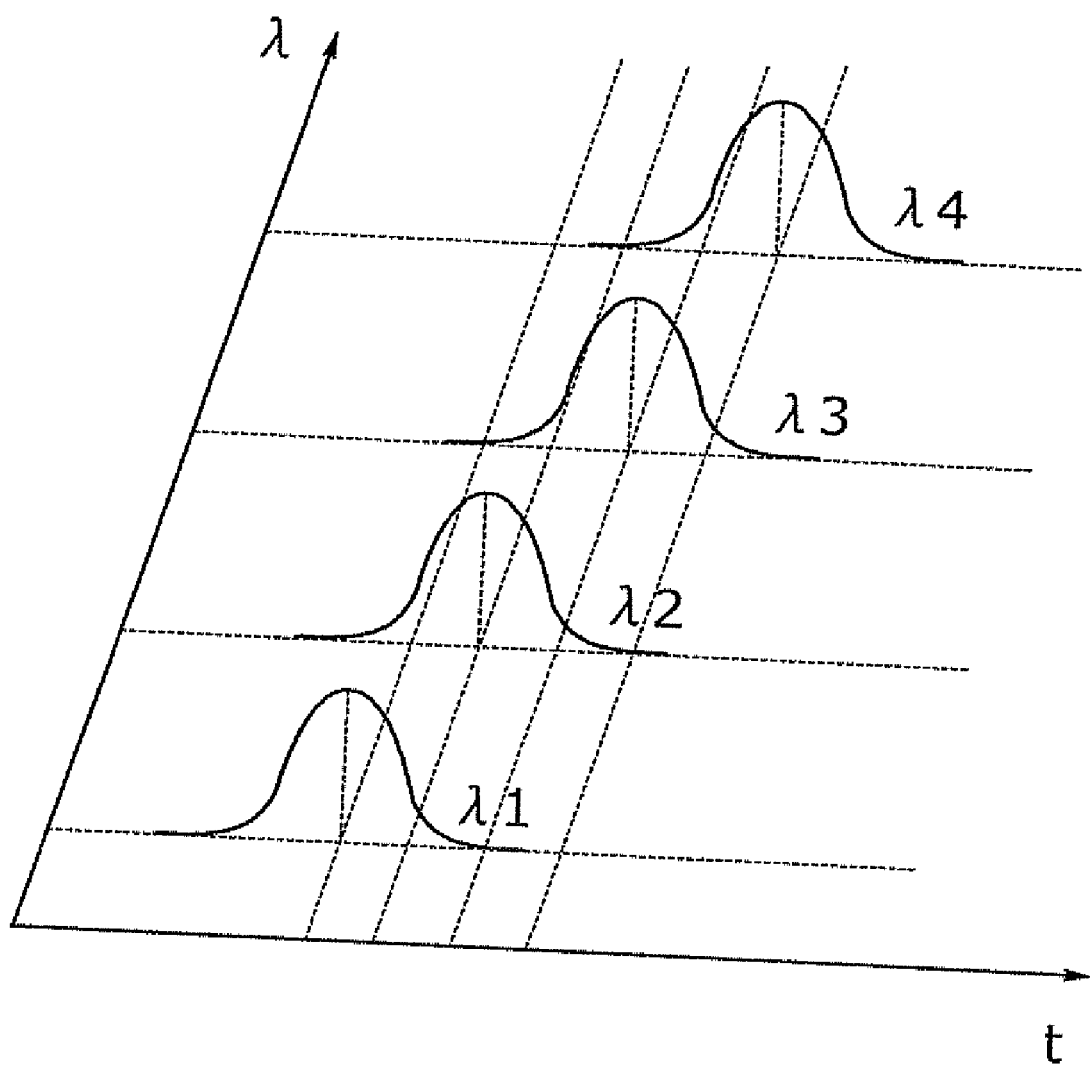

FIGS. 7 and 8 illustrate temporal relationships between optical pulses with different wavelengths. The vertical and horizontal axes of those diagrams represent the wavelength and time, respectively. FIG. 7 shows a case where the dispersion compensation intervals are designed to have zero net dispersion, while FIG. 8 shows a case where they are designed to give a non-zero net dispersion.

Nonlinear effects in an optical fiber are significant in a region where the optical power level is high or where the light density is high. For this reason, maximum nonlinear effects are likely to happen near the output of an optical amplifier or at a point where the core diameter is small, particularly in such regions where the net chromatic dispersion is small. FIG. 7 depicts a situation where WDM optical pulses with different wavelengths $\lambda 1$ to $\lambda 4$ are aligned properly in a zero dispersion region. This means that four pulses pass through this region together at the same time, and their combined peak power causes stronger nonlinear effects between different wavelengths. In this situation, the optical pulses are likely to satisfy phase matching conditions, and one wavelength may alter the phase of the others, meaning that FWM and XPM distortions can happen at a higher probability.

In contrast to the above, non-zero dispersions of dispersion compensation intervals give different delays to WDM optical pulses depending on their wavelengths. As FIG. 8 shows, four optical pulses with different wavelengths $\lambda 1$ to $\lambda 4$ travel through the fiber separately from each other. For this reason, nonlinear interferences between wavelengths would not be particularly strong.

The second conventional scheme can avoid or reduce the optical signal deterioration that derives from SPM and chromatic dispersion by ensuring that its average zero-dispersion wavelength range will cover the operating wavelength band. However, the transmission line designed using this scheme has many zero-dispersion points, because it is configured as a simple repetition of dispersion compensation intervals LB each having no accumulated dispersion. At those zero-dispersion points, optical pulses with different wavelengths come into alignment as shown in FIG. 7, which causes increased nonlinear interference effects such as FWM and XPM distortions. This is not peculiar to the first or second conventional schemes, but is a common problem of all existing optical transmission systems using conventional dispersion management schemes.

Figure 9:
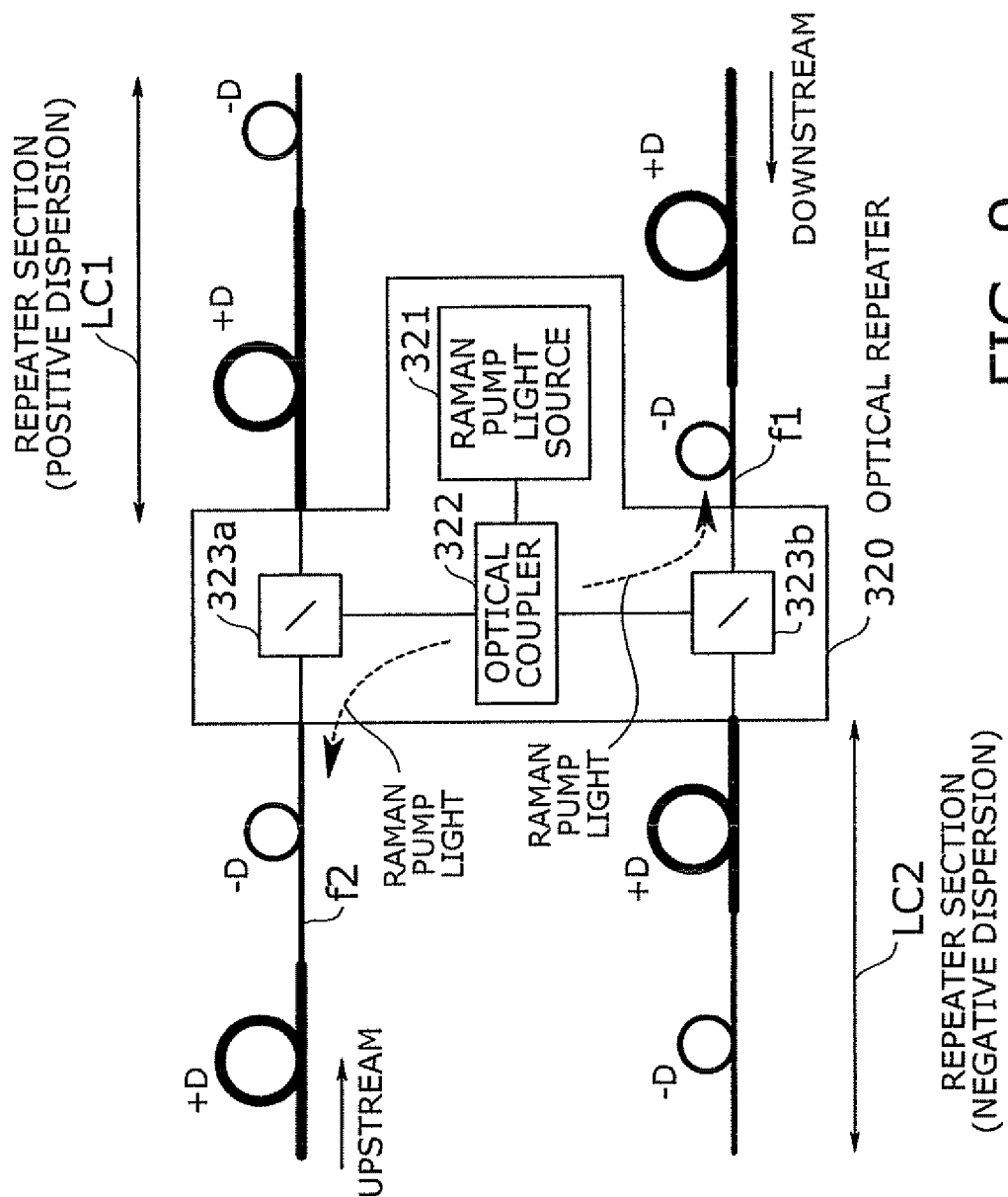
FIG. 9 shows the structure of a conventional optical repeater.
Figure 10:
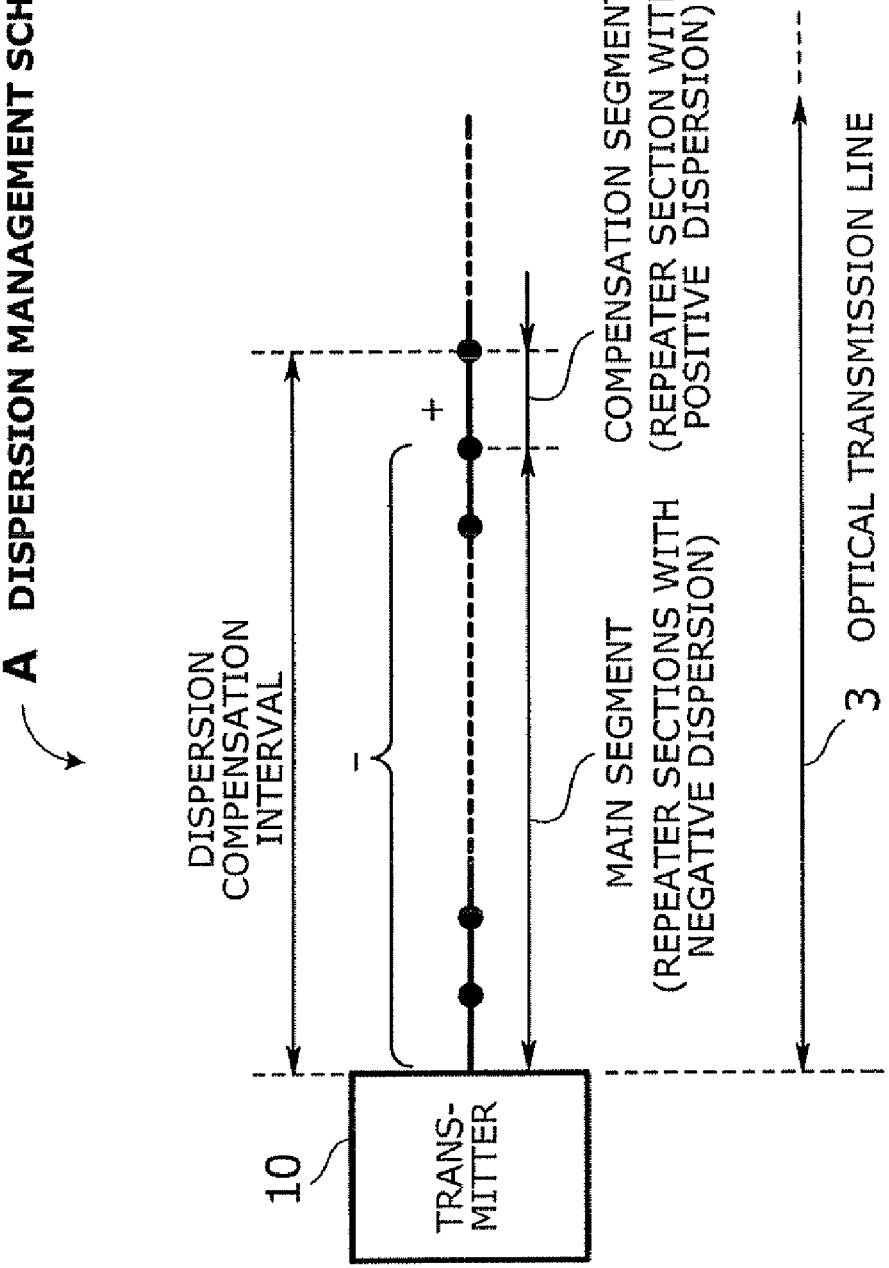
FIG. 10 is a schematic view of a dispersion management scheme according to a first embodiment of the present invention.

Referring next to FIGS. 9 and 10, we will now explain a problem of a conventional dispersion-managed optical transmission system using Raman amplifiers in repeater equipment. FIG. 9 shows the structure of an optical repeater. This optical repeater 320 comprises a Raman pump light source 321, an optical coupler 322, and optical combiners 323a and 323b. The Raman pump light source 321 produces a pump light, and the optical coupler 322 divides it into two beams. These two pump light beams are used for backward pumping. More specifically, the upstream-side optical combiner 323a launches one pump light beam in the downstream direction, opposite to the upstream transmission signals. The downstream-side optical combiner 323b launches the other pump light beam in the upstream direction, opposite to the downstream transmission signals. Raman amplifier takes place on both transmission lines.

The illustrated system employs alternating-dispersion hybrid transmission lines with +D and −D fibers to form dispersion-managed repeater sections. Note that dispersion characteristics of transmission lines are not uniform. For instance, an upstream repeater section LC1 has a positive dispersion, while a downstream repeater section LC2 has a negative dispersion. This asymmetry comes from different lengths of fibers depending on the directions. In the example of FIG. 9, downstream −D fiber f1 is shorter than upstream −D fiber f2. Although the same amount of pump light is launched into the upstream and downstream fibers, the resulting Raman gains are different between the two −D fibers f1 and f2, because Raman gain depends on the length of the amplification medium (i.e., optical fiber) that is used. Unbalanced Raman gains of upstream and downstream links lead to a reliability problem of optical amplifiers.

In this section, we have pointed out two drawbacks of conventional dispersion management schemes. One is signal deterioration due to nonlinear effects at zero-dispersion boundary points of dispersion compensation intervals. The other is unbalanced upstream and downstream gains in a system using Raman amplifiers. The present invention is intended to solve those problems in order to offer an optical transmission system with improved quality and reliability.

First Embodiment

Referring now to FIG. 10 and subsequent diagrams, we will describe dispersion management schemes of the present invention in detail. According to a first embodiment of the invention, each dispersion compensation interval has two parts: a main segment composed of a plurality of repeater sections with negative dispersion, and a compensation segment composed of a single repeater section with positive dispersion. Different net dispersions are given to individual dispersion compensation intervals to yield a randomized (i.e., non-uniform) distribution of dispersion values over the transmission line.

FIG. 10 is a schematic view of a dispersion management scheme according to the first embodiment of the invention. An optical transmission line 3 starts at a transmitter 10 and extends toward a receiver 20 (not shown), the black round dots on which represent repeaters. The optical transmission line 3 is designed as a series of dispersion compensation intervals each composed of a plurality of repeater sections. Most repeater sections (called "main segment") in a dispersion compensation interval have a negative average dispersion, while the remaining single repeater section (called "compensation segment") has a positive dispersion to compensate for the negative dispersion in the main segment. This type of system configuration is referred to herein as the dispersion management scheme A.

Figure 11:
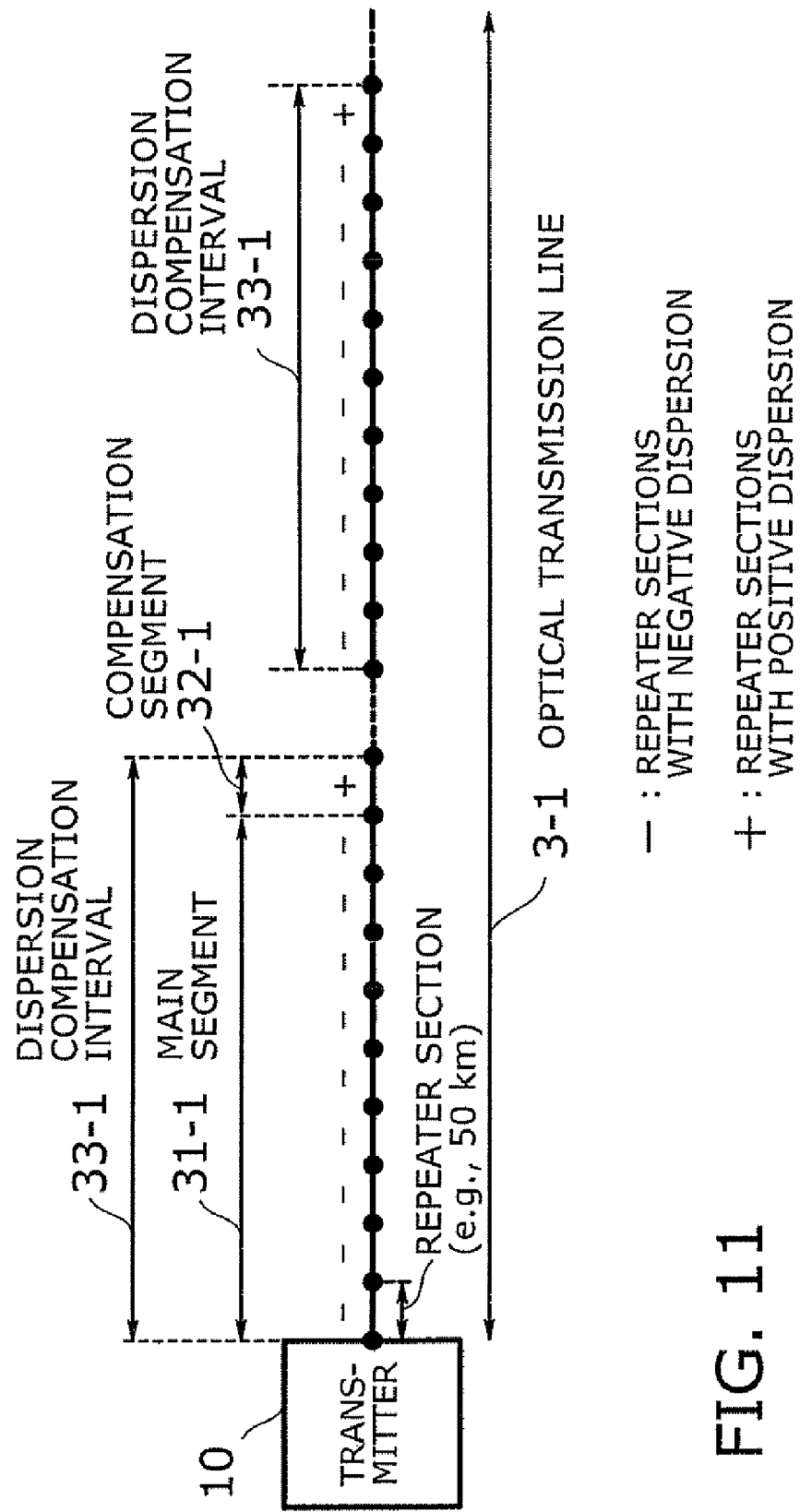
FIG. 11 shows an example of the proposed dispersion management scheme.

FIG. 11 shows a specific example of the dispersion management scheme A of FIG. 10. In this example, all dispersion compensation intervals are equal in length. More specifically, the illustrated dispersion management scheme A-1 provides an optical transmission line 3-1 extending from a transmitter 10. One dispersion compensation interval 33-1 consists of nine negative-dispersion repeater sections (or the main segment 31-1) and one positive-dispersion repeater section (or the compensation segment 32-1). The optical transmission line 3-1 is formed by repeating such dispersion compensation intervals 33-1 as many times as needed. All those intervals 33-1 are uniform in length since they equally have the same number (nine) of negative-dispersion repeater sections.

Figure 12:
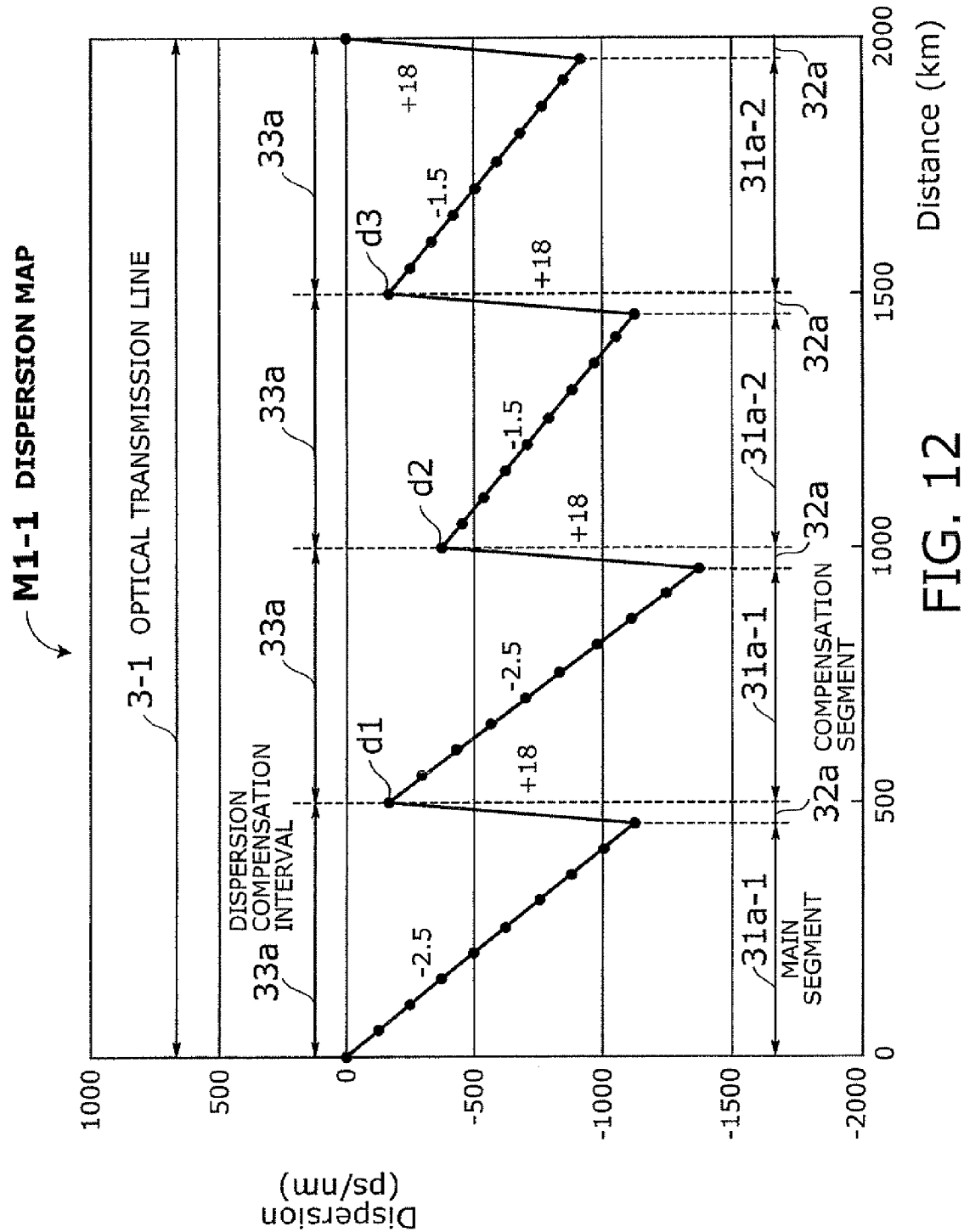
FIGS. 12 to 14 show dispersion maps according to the dispersion management scheme of FIG. 11.

The dispersion management scheme A-1 is actually configured so that the dispersion compensation intervals will have a non-uniform series of net chromatic dispersions. This is accomplished by, for example, assigning different average dispersions to different groups of repeater sections, as shown in the example of FIG. 12. Particularly, the illustrated dispersion map M1-1 is designed to have a negative dispersion at every boundary point between compensation intervals. In FIG. 12 the symbols d1, d2, and d3 indicate such boundary points, and the black round dots indicate the net dispersion, i.e., accumulated dispersion, at the point of each repeater (same for other dispersion maps that follow).

In the first 1,000 km of the optical transmission line 3-1, the main segments 31a-1 use a fiber medium with a dispersion coefficient of, for example, −2.5 ps/nm/km. In the remaining 1,000 km, the main segments 31a-2 use a different fiber medium, whose dispersion coefficient is −1.5 ps/nm/km. For all compensation segments 32a, yet another fiber medium with a dispersion coefficient of +18 ps/nm/km is used. Since repeater sections are each 50 km in length, the average dispersion in each section is either 125 (=2.5×50), 75 (=1.5×50), or 900 (=18×50) ps/nm in absolute terms. As can be seen, the repeater sections are designed to have various dispersion values.

The above arrangement yields a negative net chromatic dispersion d1 to d3 at each boundary point between dispersion compensation intervals 33a as shown in FIG. 12. Such non-zero net dispersions will alleviate nonlinear effects, thus reducing the deterioration of transmission signals.

Figure 13:
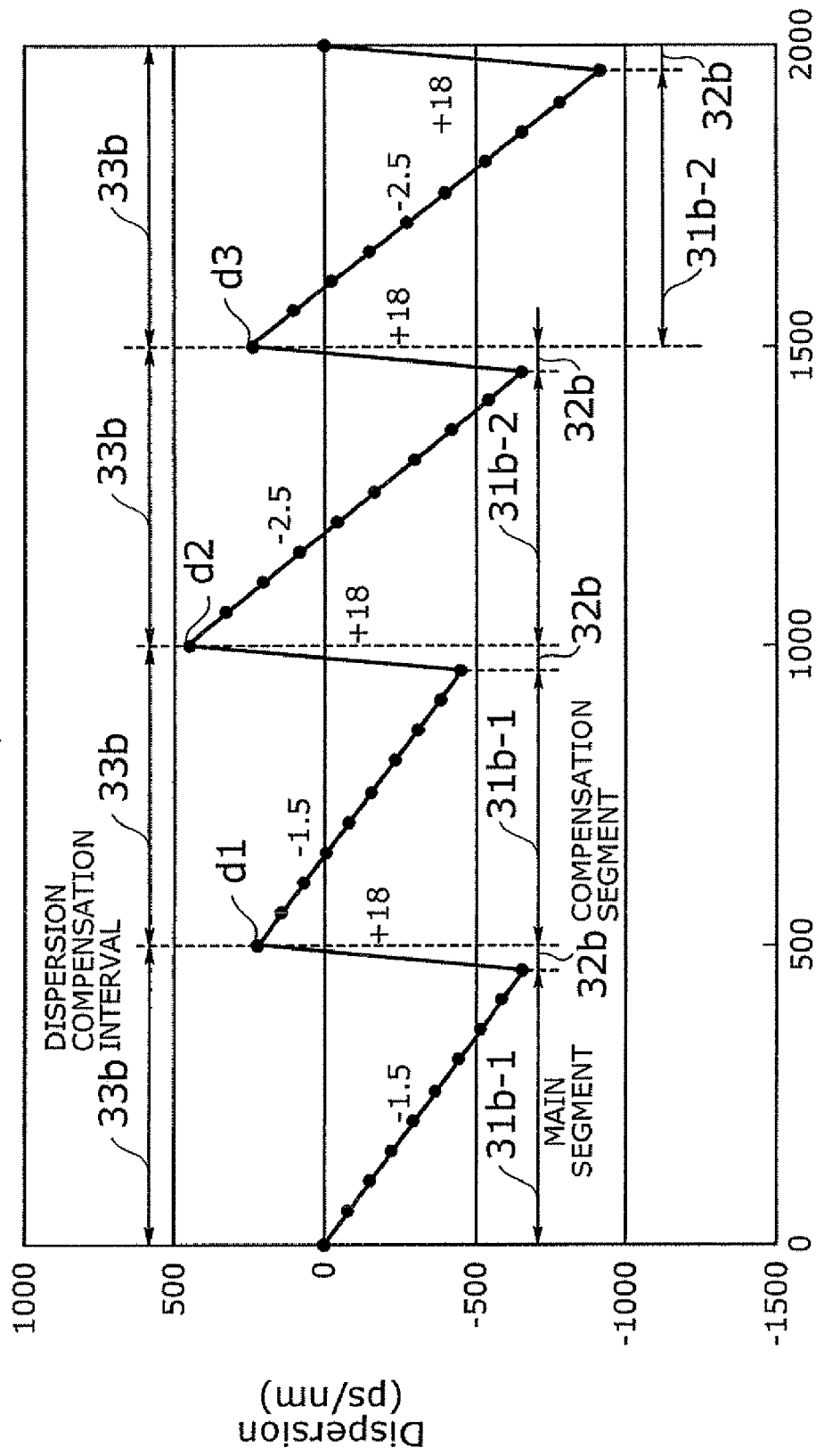

FIG. 13 shows another dispersion map M1-2, in which repeater sections with different average dispersions are combined, similarly to FIG. 12. The dispersion map M1-2 is different in that the dispersion compensation intervals are designed to have a positive net dispersion at their boundaries. In this example, the main segments 31b-1 in the first 1,000 km of the optical transmission line 3-1 use a fiber medium with a dispersion coefficient of −1.5 ps/nm/km. In the remaining 1,000 km, the main segments 31b-2 use a fiber medium with a dispersion coefficient of −2.5 ps/nm/km. For compensation segments 32b, a fiber medium with a dispersion coefficient of +18 ps/nm/km is used. The repeater sections have non-uniform average dispersions, as in the dispersion map M1-1 of FIG. 12.

As can be seen from FIG. 13, the net chromatic dispersions d1 to d3 at the boundary points between dispersion compensation intervals 33b are all positive. Such non-zero net dispersions will alleviate nonlinear effects, thus reducing the deterioration of transmission signals.

Figure 14:
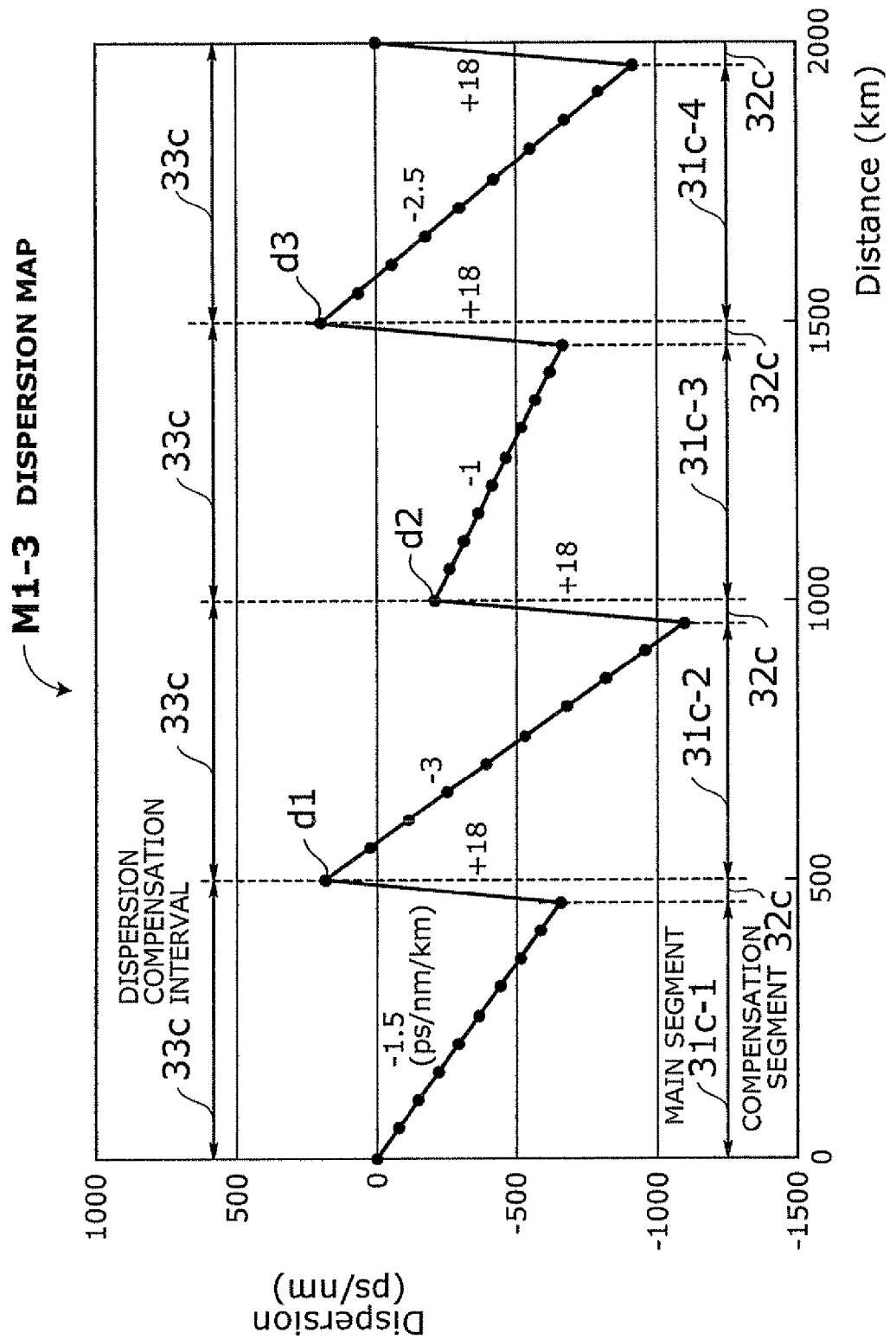

FIG. 14 shows yet another example of a dispersion map. As in the preceding two examples, the illustrated map M1-3 gives different absolute average dispersions to individual repeater sections. It is different, however, in that the dispersion compensation intervals are designed to have alternating-polarity (i.e., positive then negative, or vice versa) net dispersions. More specifically, the optical transmission line 3-1 has four dispersion compensation intervals 33c, and their main segments 31c-1 to 31c-4 each use a fiber medium with a dispersion coefficient of −1.5, −3, −1, and −2.5 ps/nm/km, respectively. Compensation segments 32c, on the other hand, use a fiber medium with a dispersion coefficient of +18 ps/nm/km. Since the repeater sections are each 50 km long, the average dispersion in each section is either 75 (=1.5×50), 150 (=3×50), 50 (=1×50), 125 (=2.5×50), or 900 (=18×50) ps/nm in absolute value. In this way, the repeater sections are given various dispersion values depending on their locations.

As a result of the above-described arrangement, the net chromatic dispersions d1 to d3 at the boundary points of the dispersion compensation intervals 33c have alternating polarities (i.e., positive, negative, and then positive) as shown in FIG. 14. Such alternating net dispersions will alleviate nonlinear effects, thus reducing the deterioration of transmission signals.

Figure 15:
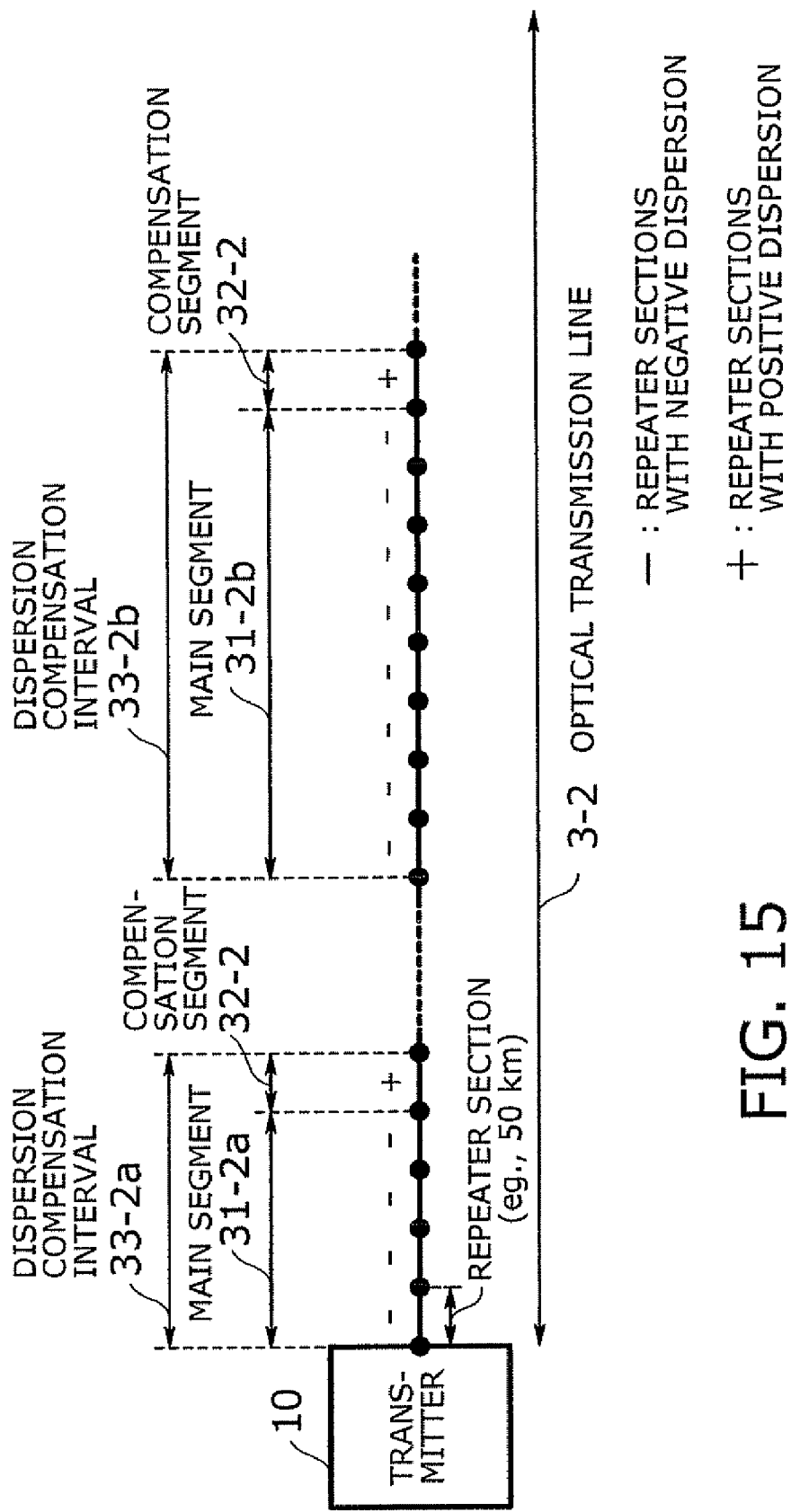
FIG. 15 shows another example of the proposed dispersion management scheme.

The dispersion management scheme A of FIG. 10 has another variation, in which each dispersion compensation interval has a different length from others. FIG. 15 illustrates this type of dispersion management scheme. Specifically, the illustrated dispersion management scheme A-2 provides an optical transmission line 3-2 extending from a transmitter 10. The dispersion compensation intervals are each divided into two parts: a main segment composed of a plurality of repeater sections with negative dispersion, and a single repeater section with positive dispersion. The number of negative-dispersion sections may vary, meaning that the lengths of dispersion compensation intervals are variable.

In the example of FIG. 15, the leftmost main segment 31-2a has four spans of negative-dispersion repeater sections, which is followed by a single positive-dispersion repeater section that serves as a compensation segment 32-2. These five sections constitute a first dispersion compensation interval 33-2a. FIG. 15 shows another dispersion compensation interval 33-2b, which has a main segment composed of eight spans of negative-dispersion repeater sections, and a single positive-dispersion repeater section as a compensation segment 32-2. The optical transmission line 3-2 is constructed as a series of such variable-length dispersion compensation intervals.

Figure 16:
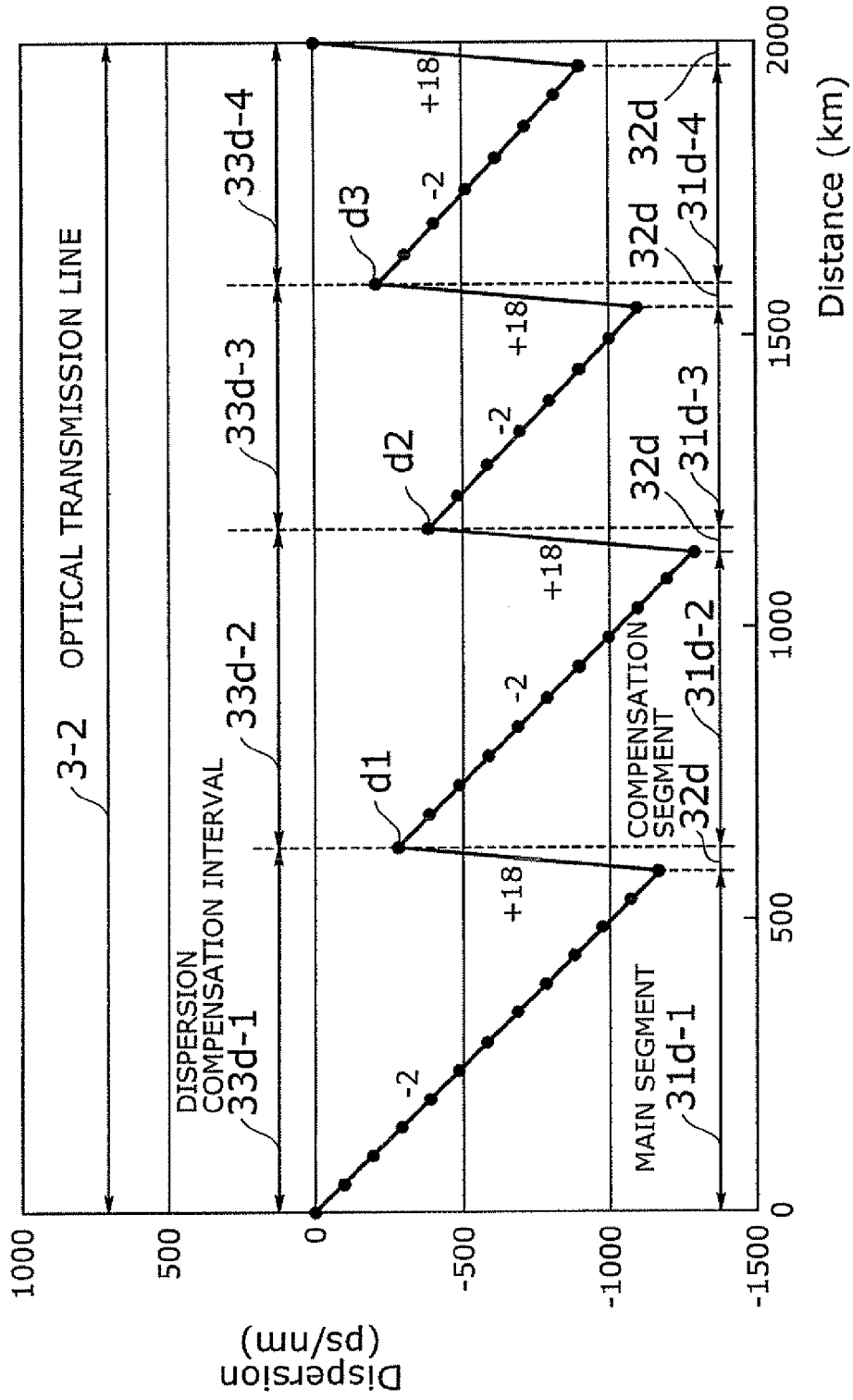
FIGS. 16 to 18 show dispersion maps according to the dispersion management scheme of FIG. 15.

The above-described dispersion management scheme A-2 provides a non-uniform distribution of net chromatic dispersions throughout the optical transmission line 3-2. FIG. 16 shows a dispersion map M2-1 of this type, which represents a pattern of dispersion management using variable-length dispersion compensation intervals each composed of a different number of repeater sections. Those compensation intervals are configured to have negative net dispersions at their boundary points.

More specifically, the optical transmission line 3-2 has four dispersion compensation intervals 33d-1 to 33d-4, and their respective main segments 31d-1 to 31d-4 use a fiber medium with a dispersion coefficient of −2 ps/nm/km. The first main segment 31d-1 is twelve spans in length, and the second main segment 31d-2 is ten spans in length. The remaining two main segments 31d-3 and 31d-4 have seven spans each. Every main segment is followed by a compensation segment 32c that uses a fiber medium with a dispersion coefficient of +18 ps/nm/km.

As can be seen from FIG. 16, the above-described arrangement yields a negative net chromatic dispersion d1 to d3 at every boundary point between the dispersion compensation intervals 33d-1 to 33d-4. Such non-zero net dispersions will alleviate nonlinear effects, thus reducing the deterioration of transmission signals.

Figure 17:
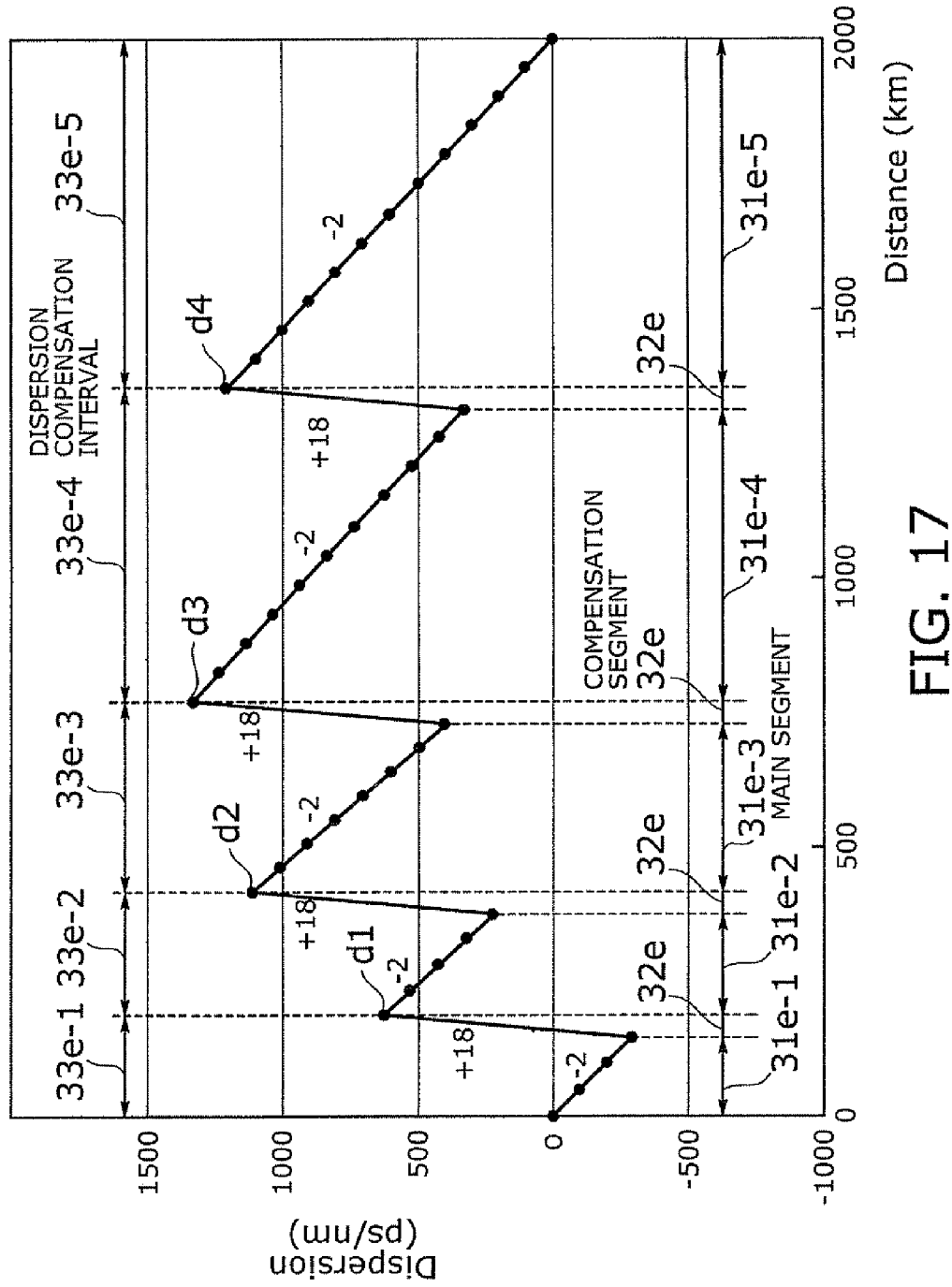

FIG. 17 shows another example of a dispersion map according to the dispersion management scheme A-2 of FIG. 15. The illustrated map M2-2 represents variable-length dispersion compensation intervals each consisting of a different number of repeater sections. Those compensation intervals are designed to have a positive net dispersion at their boundary points.

More specifically, the optical transmission line 3-2 has five dispersion compensation intervals 33e-1 to 33e-S, and their respective main segments 31e-1 to 31e-5 use a fiber medium with a dispersion coefficient of −2 ps/nm/km. The first main segment 31e-1 is three spans in length, and the second main segment 31e-2 is four spans in length. Likewise, the lengths of the succeeding three main segments 31e-3, 31e-4, and 31e-5 are seven, ten, and twelve spans, respectively. All main segments, except for the last segment 31e-5, are followed by a compensation segment 32e that uses a fiber medium with a dispersion coefficient of +18 ps/nm/km.

As can be seen from FIG. 17, the above-described arrangement yields a positive net chromatic dispersion d1 to d4 at every boundary point between dispersion compensation intervals 33e-1 to 33e-5. Such non-zero net dispersions will alleviate nonlinear effects, thus reducing the deterioration of transmission signals.

Figure 18:
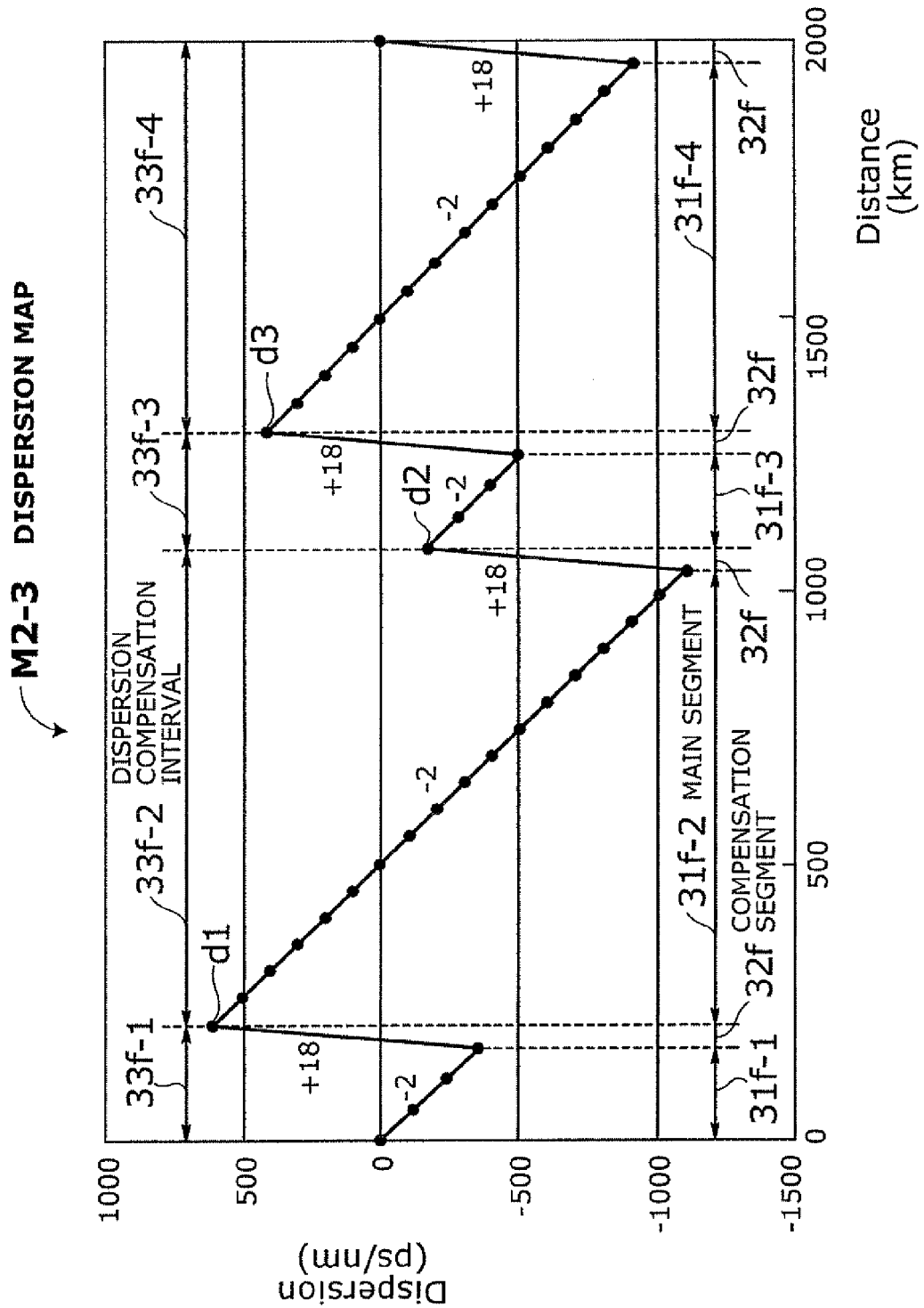

FIG. 18 shows yet another dispersion map. The illustrated map M2-3 represents variable-length dispersion compensation intervals each consisting of a different number of repeater sections. Every compensation interval, except for the last one, is designed to end with either a positive or negative net dispersion.

In this example, the optical transmission line 3-2 has four dispersion compensation intervals 33f-1 to 33f-4, and their respective main segments 31f-1 to 31f-4 use a fiber medium with a dispersion coefficient of −2 ps/nm/km. The first main segment 31f-1 is three spans in length, and the second main segment 31f-2 is seventeen spans in length. The third main segment 31f-3 is three spans, and the fourth main segment 31e-4 is thirteen spans. Every main segment is followed by a compensation segment 32f that uses a fiber medium with a dispersion coefficient of +18 ps/nm/km.

As a result of the above arrangement, the net chromatic dispersions d1 to d3 at the boundary points between dispersion compensation intervals 33f-1 to 33f-4 have alternating polarities (i.e., positive, negative, and then positive) as shown in FIG. 18. Such alternating net dispersions will alleviate nonlinear effects, thus reducing the deterioration of transmission signals.

Figure 19:
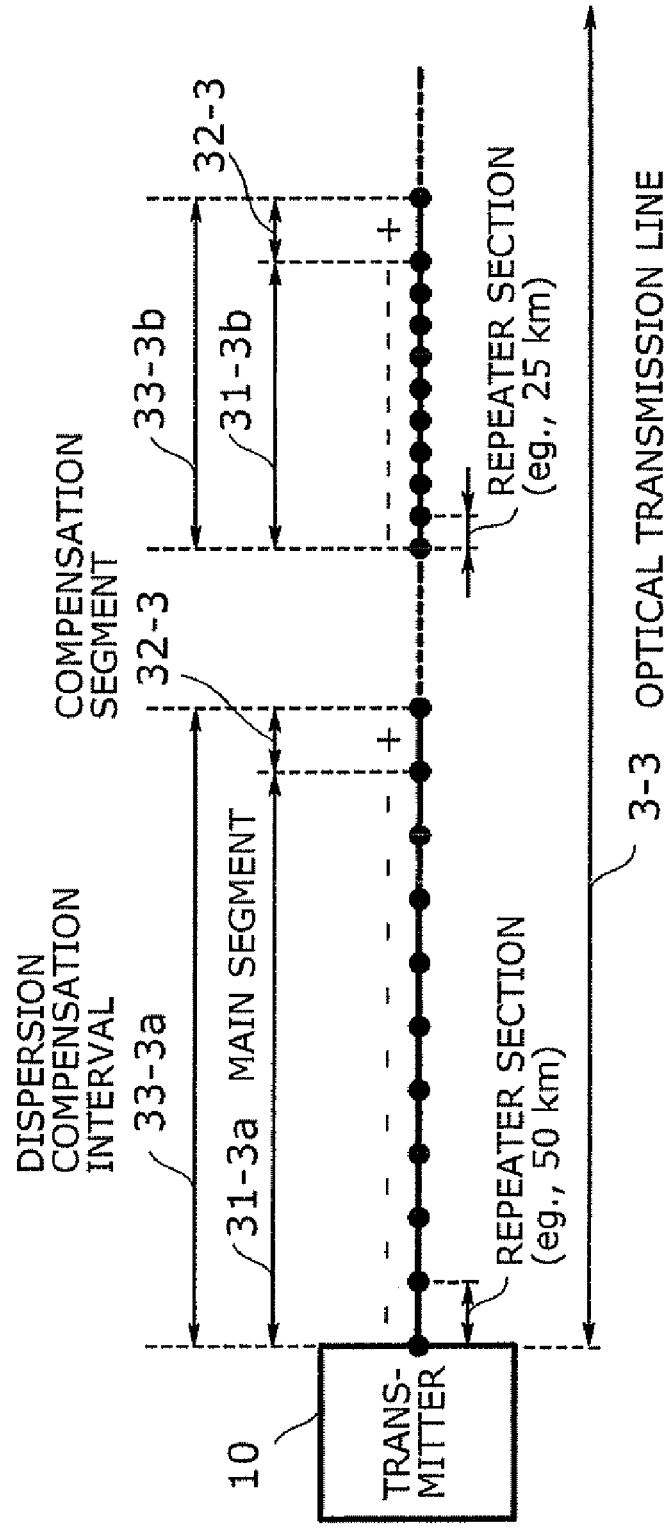
FIG. 19 shows yet another example of the proposed dispersion management scheme.

The dispersion management scheme A of FIG. 10 has yet another variation, in which the repeater sections are non-uniform in length. FIG. 19 shows an example of this type of dispersion management scheme. More specifically, the illustrated dispersion management scheme A-3 provides an optical transmission line 3-3 extending from a transmitter 10. While the preceding two management schemes A-1 and A-2 have assumed that every repeater section has a fixed span of 50 km, the dispersion management scheme A-3 of FIG. 19 allows the section length to be variable.

In the example of FIG. 19, the leftmost main segment 31-3a has nine spans of negative-dispersion repeater sections, which is followed by a single positive-dispersion section that serves as a compensation segment 32-3. Each repeater section has a length of 50 km, and the ten sections constitute a first dispersion compensation interval 33-3a. FIG. 19 also shows another dispersion compensation interval 33-3b, which has a main segment composed of nine spans of negative-dispersion repeater sections and a single positive-dispersion repeater section that serves as a compensation segment 32-3. The repeater sections of this dispersion compensation interval 33-3b are each 25 km, shorter than those of the first dispersion compensation interval 33-3a. The optical transmission line 3-3 is constructed as a series combination of such variable-length compensation intervals.

The above-described dispersion management scheme A-3 provides a non-uniform distribution of net chromatic dispersions over the optical transmission line 3-3. The illustrated map M3-1 represents variable-length dispersion compensation intervals composed of different numbers of repeater sections. All those compensation intervals are designed to have a negative net dispersion at their boundary points.

In this example, the optical transmission line 3-3 has four dispersion compensation intervals 33g-1 to 33g-4, and their respective main segments 31g-1 to 31g-4 use a fiber medium with a dispersion coefficient of −2 ps/nm/km. The first and second main segments 31g-1 and 31g-2 are each composed of thirteen repeater sections, 50 km per section, and the third and fourth main segments 31g-3 and 31g-4 are each composed of ten repeater sections, 25 km per section. Every main segment is followed by a 50-km long compensation segment 32g with a dispersion coefficient of +18 ps/nm/km.

Figure 20:
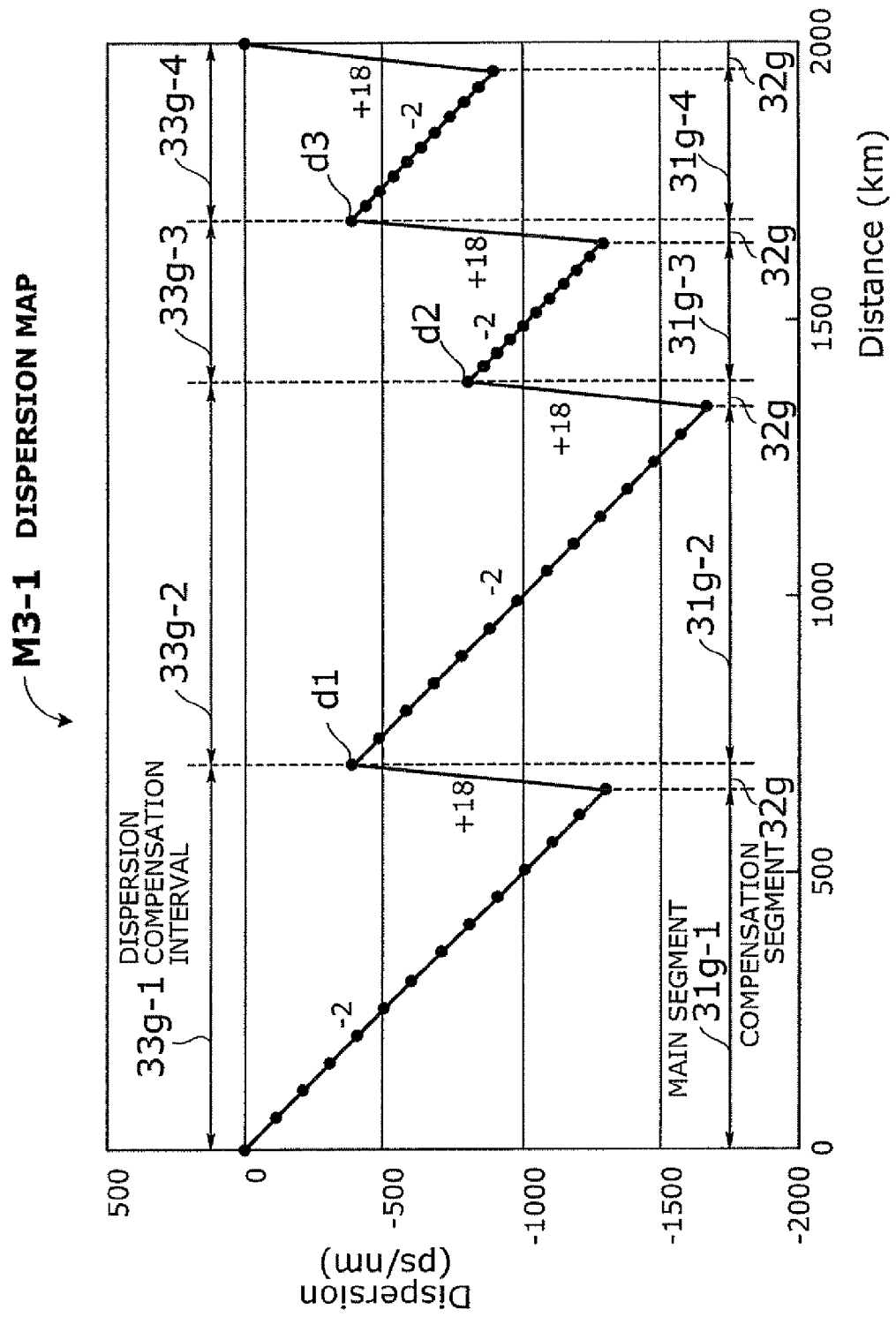
FIG. 20 shows a dispersion map according to the dispersion management scheme of FIG. 19.

The above-described arrangement yields a negative net chromatic dispersion d1 to d3 at every boundary point between the dispersion compensation intervals 33g-1 to 33g-4 as shown in FIG. 20. Such non-zero net dispersions will alleviate nonlinear effects, thus reducing the deterioration of transmission signals.

The dispersion management scheme A-3 would allow more variations. For example, it is possible to construct a system having all positive net chromatic dispersions. Alternating polarity design may also be adapted to the dispersion management scheme A-3. We omit the details of these modified versions since they are analogous to the preceding examples of dispersion maps (e.g., FIGS. 17 and 18.

Second Embodiment

In this section, we will describe dispersion management schemes according to a second embodiment of the present invention. The second embodiment provides a randomized (i.e., non-uniform) distribution of net chromatic dispersions by combining various types of negative-dispersion segments and positive-dispersion segments to form dispersion compensation intervals. Each negative-dispersion segment is composed of a plurality of repeater sections with negative dispersion, while each positive-dispersion segment is composed of a plurality of repeater sections with positive dispersion. In other words, the second embodiment employs a plurality of positive-dispersion repeater sections to compensate for the negative dispersion of each main segment. This is unlike the first embodiment, which uses a single positive-dispersion repeater section to do the same.

Figure 21:
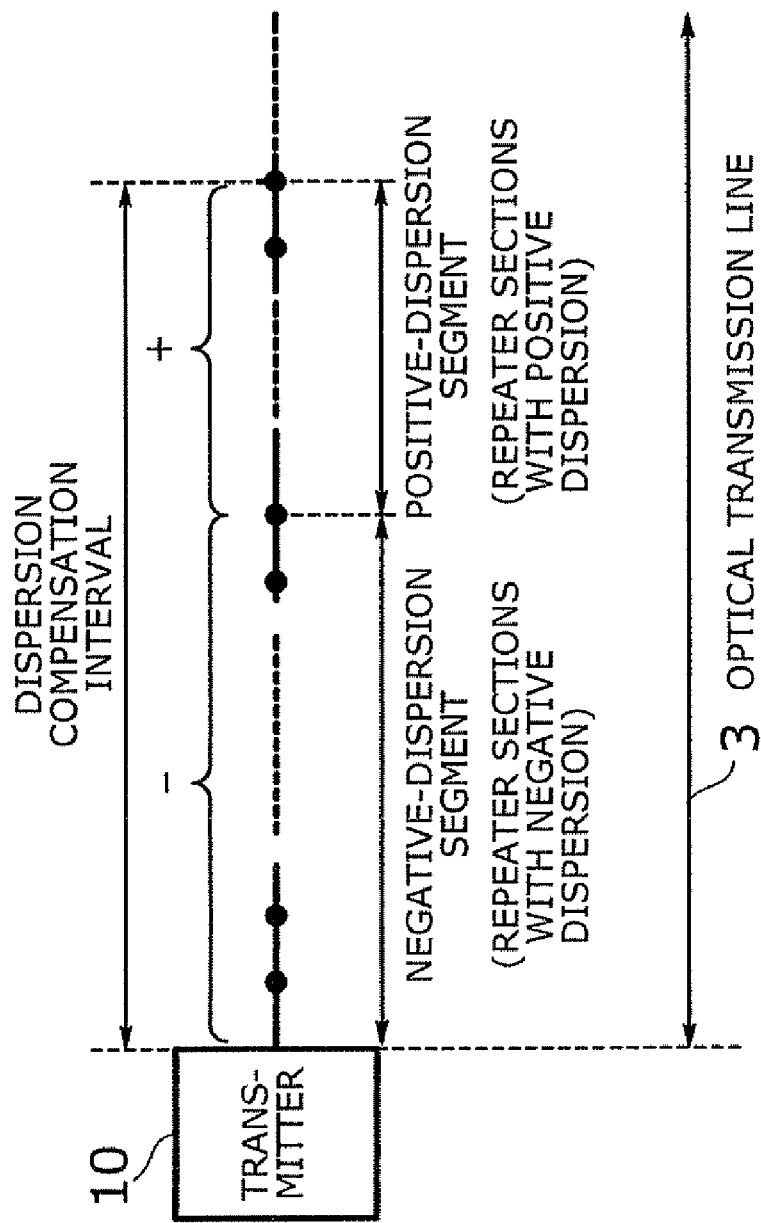
FIG. 21 is a schematic view of a dispersion management scheme according to a second embodiment of the present invention.

FIG. 21 is a schematic view of a dispersion management scheme according to the second embodiment of the present invention. FIG. 21 shows an optical transmission line 3 extending from a transmitter 10, which is constructed as a series of dispersion compensation intervals. Each compensation interval has a negative-dispersion segment and a positive-dispersion segment, in either order. The negative-dispersion segment is composed of multiple negative-dispersion repeater sections, while the positive-dispersion segment is composed of multiple positive-dispersion repeater sections. This type of system configuration is referred to herein as the "dispersion management scheme B."

Figure 22:
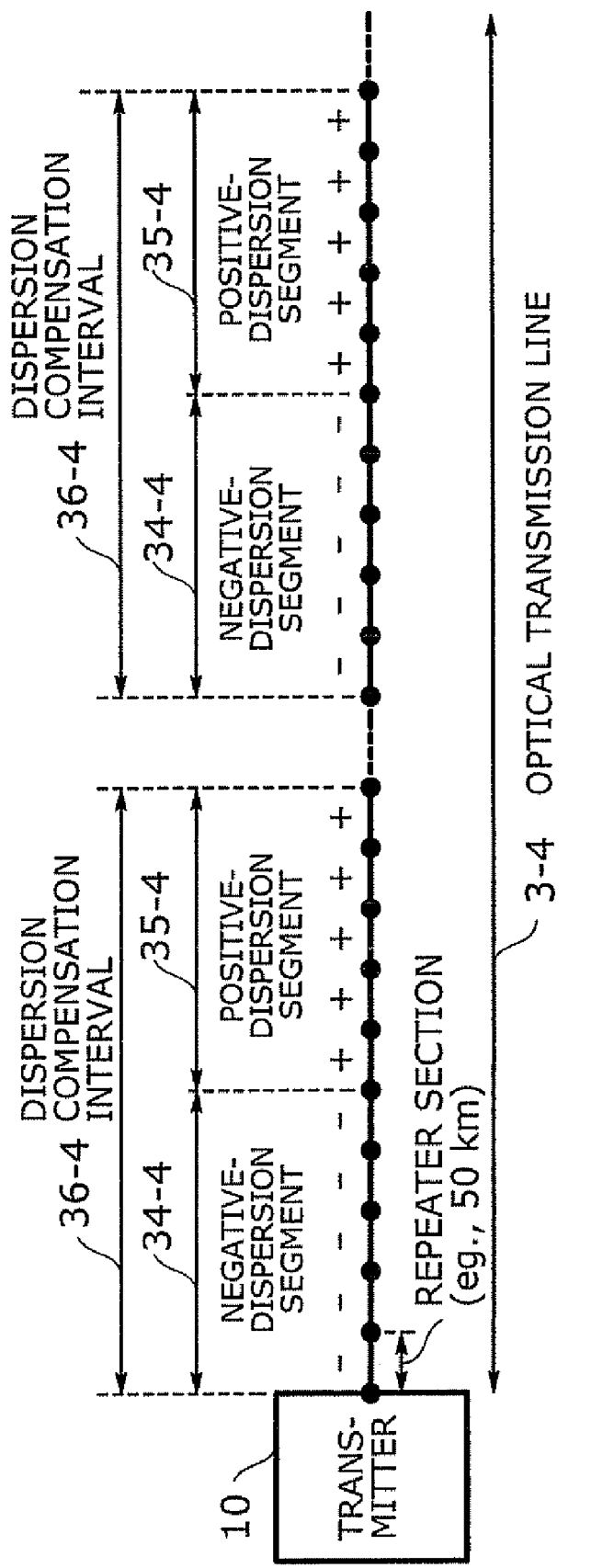
FIG. 22 shows an example of the proposed dispersion management scheme of the second embodiment.

FIG. 22 shows a specific example of the dispersion management scheme B. In this example, all dispersion compensation intervals are equal in length. The illustrated dispersion management scheme B-1 provides an optical transmission line 3-4 extending from a transmitter 10, which is constructed as a series of negative-dispersion segments 34-4 and positive-dispersion segments 35-4. Each negative-dispersion segment 34-4 consists of five spans of negative-dispersion repeater sections, while each positive-dispersion segment 35-4 consists of five spans of positive-dispersion repeater sections. A pair of those two types of transmission lines constitute a ten-span long dispersion compensation interval 36-4, and the proposed optical transmission line 3-4 is constructed as a series of such uniform-length dispersion compensation intervals 36-4.

Figure 23:
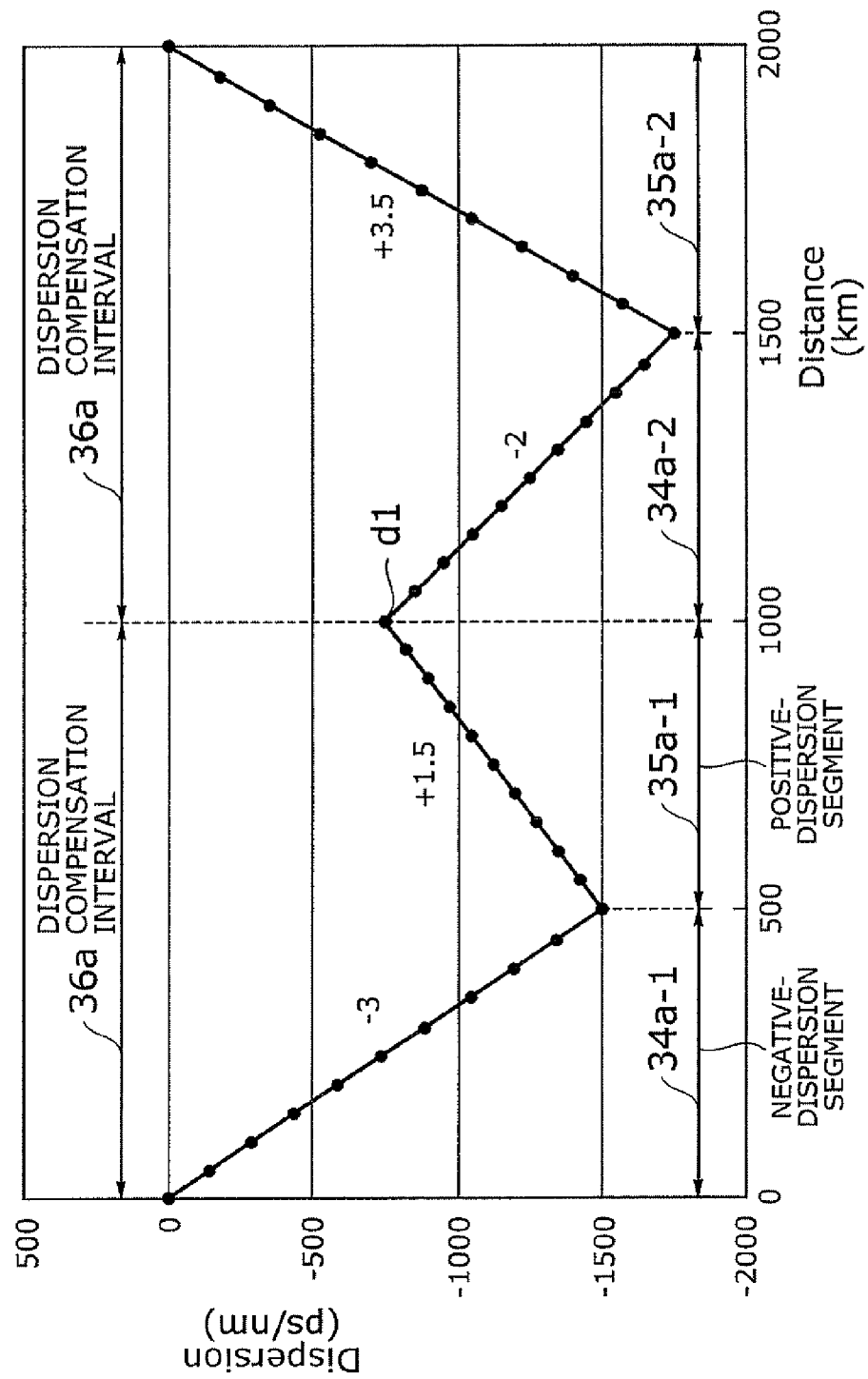
FIGS. 23 and 24 show dispersion maps according to the dispersion management scheme of FIG. 22.

The dispersion management scheme B-1 of FIG. 22 may be modified so that the dispersion compensation intervals will have non-uniform net chromatic dispersions. This is accomplished by giving different absolute average dispersions to individual repeater sections. FIG. 23 shows a dispersion map of such a modified version of the dispersion management scheme B-1. This dispersion map M4-1 illustrates the case where the boundary point between dispersion compensation intervals has a negative net dispersion.

More specifically, the optical transmission line 3-4 has two dispersion compensation intervals 36a, and their negative-dispersion segments 34a-1 and 34a-2 each use a fiber medium with a dispersion coefficient of −3 and −2 ps/nm/km, respectively. Their corresponding positive-dispersion segments 35a-1 and 35a-2 each have a dispersion coefficient of +1.5 and +3.5 ps/nm/km, respectively. Since the repeater sections are each 50 km long, the average dispersion in a section is either 150 (=3×50), 100 (=2×50), 75 (=1.5×50), or 175 (=3.5×50) ps/nm in absolute terms. This example demonstrates repeater sections designed to have various dispersion values.

The above-described arrangement of repeater sections yields a negative net chromatic dispersion d1 at the boundary point of dispersion compensation intervals 36a as shown in FIG. 23. Such a non-zero net dispersion will alleviate nonlinear effects, thus reducing the deterioration of transmission signals. The dispersion management scheme B-1 may also be configured to have positive net dispersions or alternating net dispersions (explanations omitted).

While we have shown many examples in which none of the boundary points between compensation intervals has zero net chromatic dispersion, it is not intended to entirely exclude transmission lines with a zero-dispersion point on their span. As a matter of fact, the presence of a single zero-dispersion point would do no harm to the entire performance of a transmission line. Rather, such systems still have an advantage over conventional dispersion management schemes in terms of signal quality degradation due to nonlinear effects in fibers. We will give an example of this type of dispersion map with reference to FIG. 24.

Figure 24:
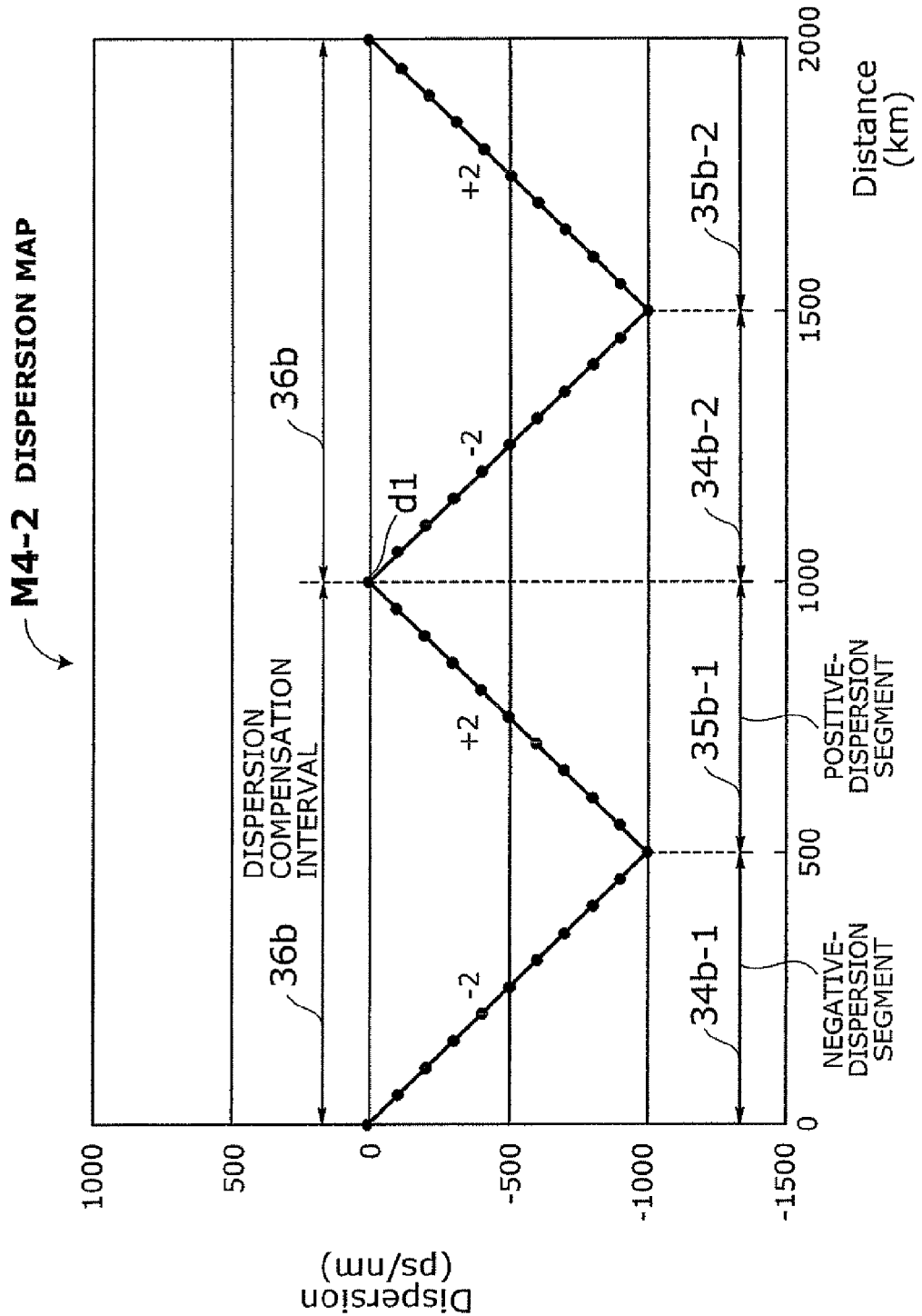

FIG. 24 shows a dispersion map M4-2 of a transmission line having one zero-dispersion point in its middle part. More specifically, the optical transmission line 3-4 has two dispersion compensation intervals 36b. Their negative-dispersion segments 34b-1 and 34b-2 use a fiber medium with a dispersion coefficient of −2 ps/nm/km. The corresponding positive-dispersion segments 35*b*-1 and 35*b*-2 have a dispersion coefficient of +2 ps/nm/km. Both positive-dispersion segments span ten repeater sections, and so do the negative-dispersion segments.

The above arrangement yields zero net dispersion d1 at the boundary point between the two dispersion compensation intervals 36*b* as shown in FIG. 24. Referring back to FIG. 6, the conventional dispersion map m1 has three zero-dispersion points in a similar situation (i.e., the same total distance and a similar maximum dispersion). This comparison suggests us that the proposed dispersion management scheme reduces the chance for the propagating optical pulses to encounter distortion-prone zero-dispersion regions, thus avoiding quality degradation of transmission signals.

Figure 25:
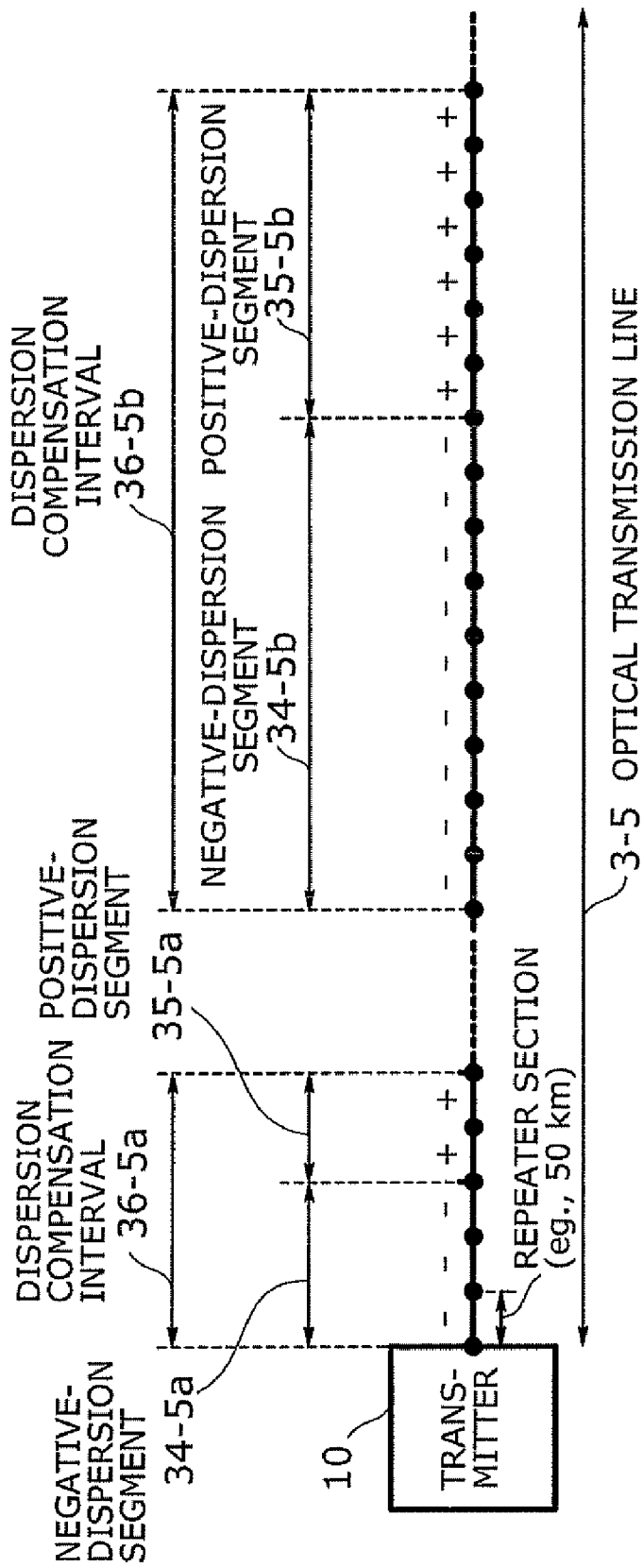
FIG. 25 shows another example of the proposed dispersion management scheme of the second embodiment.

The dispersion management scheme B of FIG. 21 may be modified in such a way that dispersion compensation intervals have different lengths. FIG. 25 shows an example of this type of dispersion management scheme. The illustrated dispersion management scheme B-2 provides an optical transmission line 3-5 extending from a transmitter 10, which is constructed as a series of dispersion compensation intervals each composed of a negative-dispersion segment and a positive-dispersion segment. The dispersion management scheme B-2 allows any number of repeater sections to form a negative-dispersion segment or positive-dispersion segment, and therefore, a system with variable-length dispersion compensation intervals can be constructed.

In the example of FIG. 25, the leftmost negative-dispersion segment 34-5*a* has three repeater sections with negative dispersion, which is followed by two repeater sections with positive dispersion that form a positive-dispersion segment 35-5*a*. These five sections constitute a first dispersion compensation interval 36-5*a*. Also shown in FIG. 25 is another dispersion compensation interval 36-5*b*, which has a negative-dispersion segment composed of nine negative-dispersion repeater sections and a positive-dispersion segment 35-5*b* composed of six positive-dispersion repeater sections. The optical transmission line 3-5 is constructed as a series of such variable-length dispersion compensation intervals.

Figure 26:
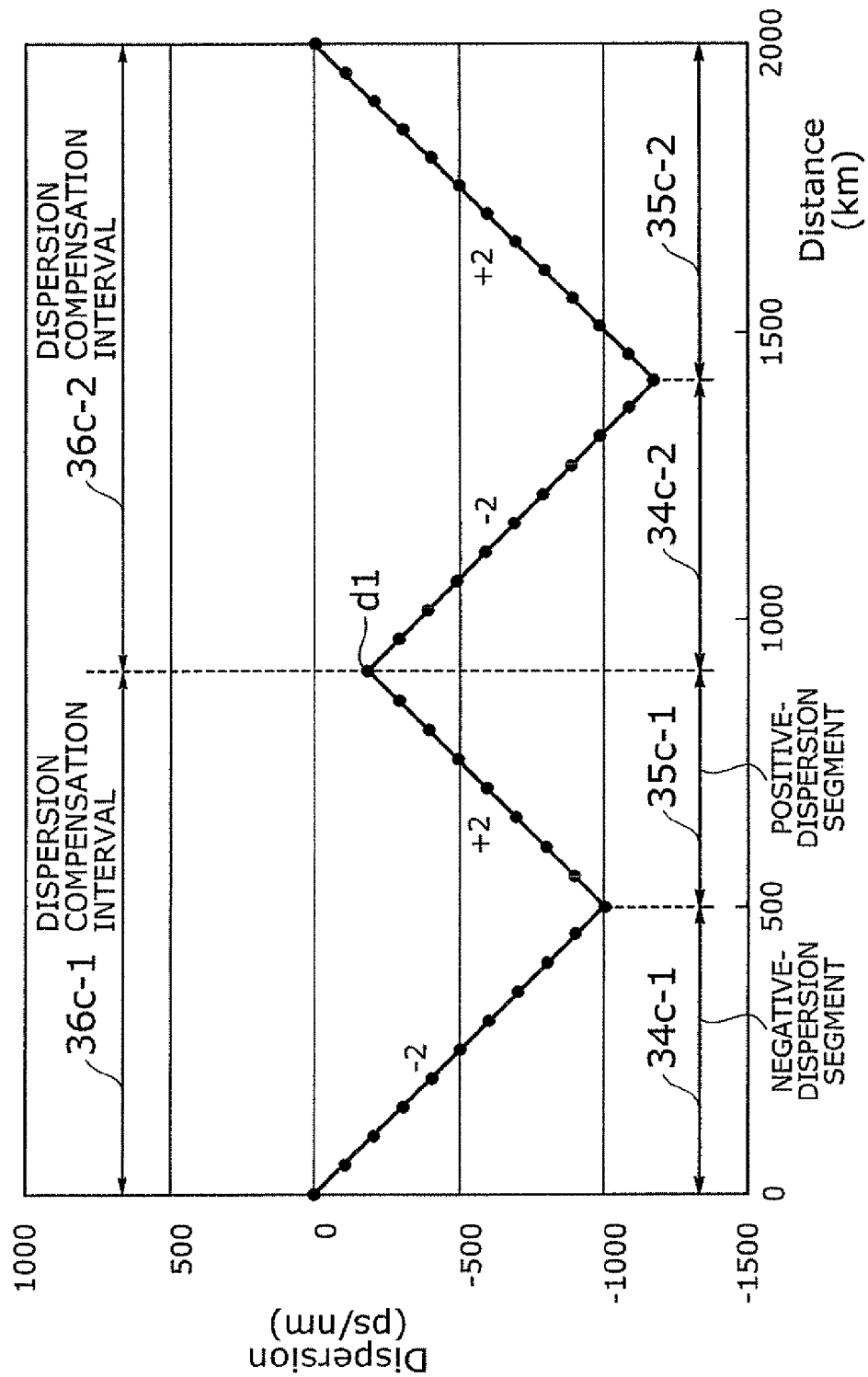
FIGS. 26 and 27 show dispersion maps according to the dispersion management scheme of FIG. 25.

The above-described dispersion management scheme B-2 provides a non-uniform distribution of net chromatic dispersions. FIG. 26 shows an example of a dispersion map. The illustrated map M5-1 represents variable-length dispersion compensation intervals, each consisting of a different number of repeater sections. Those compensation intervals are designed to have a negative net dispersion at their boundary point.

More specifically, the optical transmission line 3-5 has two dispersion compensation intervals 36*c*-1 and 36*c*-2. Their respective negative-dispersion segments 34*c*-1 and 34*c*-2 use a fiber medium with a dispersion coefficient of, for example, −2 ps/nm/km, and they are both ten spans in length. On the other hand, the corresponding positive-dispersion segments 35*c*-1 and 35*c*-2 have a dispersion coefficient of +2 ps/nm/km, and their lengths are eight and twelve spans, respectively.

The above-described arrangement yields a negative net chromatic dispersion at the boundary point d1 between two dispersion compensation intervals 36*c*-1 and 36*c*-2 as shown in FIG. 26. Such a non-zero net dispersion will alleviate nonlinear effects, thus reducing the deterioration of transmission signals.

Figure 27:
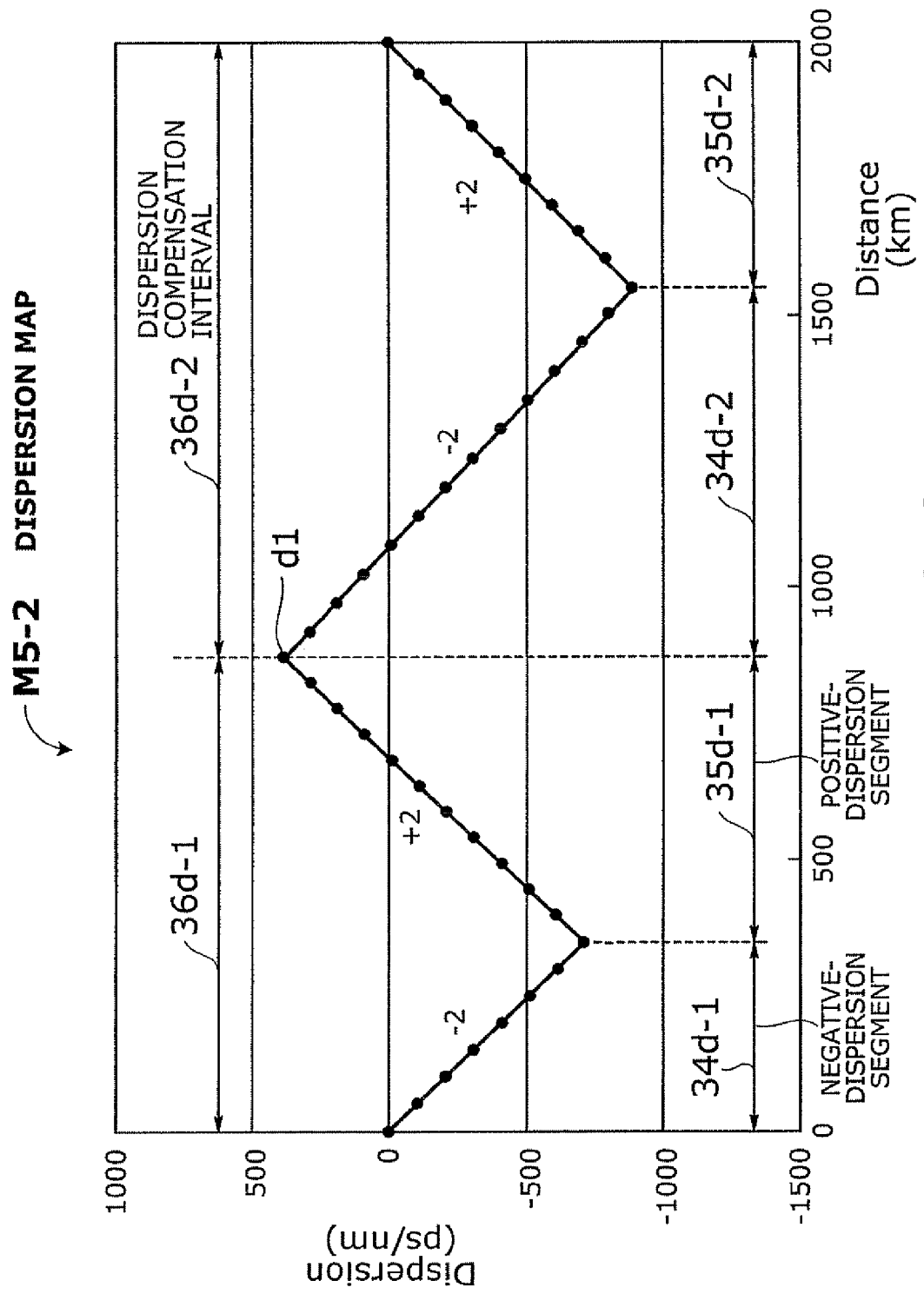

FIG. 27 shows another example of a dispersion map. The illustrated map M5-2 represents variable-length dispersion compensation intervals, each consisting of a different number of repeater sections. Those compensation intervals are designed to have a positive net dispersion at their boundary point. In this example, the optical transmission line 3-5 has two dispersion compensation intervals 36*d*-1 and 36*d*-2. Their negative-dispersion segments 34*d*-1 and 34*d*-2 are span seven and eleven repeater sections, respectively, and both use a fiber medium with a dispersion coefficient of −2 ps/nm/km. The corresponding positive-dispersion segments 35*d*-1 and 35*d*-2 have a dispersion coefficient of +2 ps/nm/km, and their lengths are thirteen and nine spans, respectively.

The above-described arrangement yields a positive net chromatic dispersion at the boundary point d1 between two dispersion compensation intervals 36*d*-1 and 36*d*-2 as shown in FIG. 27. Such a non-zero net dispersion will alleviate nonlinear effects, thus reducing the deterioration of transmission signals. The dispersion management scheme B-2 may also be configured to have net chromatic dispersions with alternating polarities (explanations omitted).

Third Embodiment

We will now describe a dispersion management scheme according to a third embodiment of the present invention. The third embodiment provides a randomized (i.e. non-uniform) distribution of net chromatic dispersions at boundaries between dispersion compensation intervals by combining positive-dispersion and negative-dispersion fibers in each individual repeater section. That is, in the third embodiment, repeater sections have a hybrid structure of a negative-dispersion fiber (−D fiber) and a positive-dispersion fiber (+D fiber). This is unlike the foregoing first and second embodiments, in which repeater sections are composed of either a negative-dispersion fiber or a positive-dispersion fiber.

Figure 28:
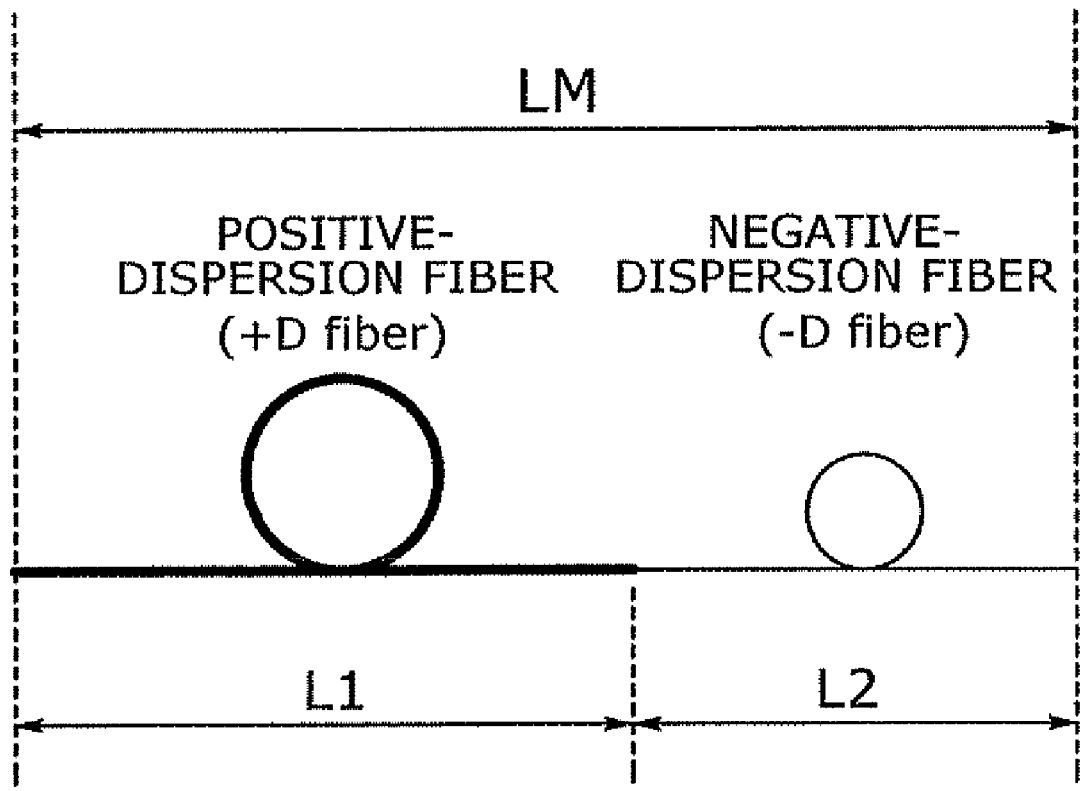
FIG. 28 shows a hybrid transmission line according to a third embodiment of the present invention.

FIG. 28 shows a hybrid-structured repeater section LM according to the third embodiment of the invention, which consists of a +D fiber medium and a −D fiber medium. That is, the transmission line of each repeater section takes a hybrid structure of two kinds of fibers. By varying the ratio of fiber lengths, we can obtain a desired average dispersion for each repeater section, if required. +D fiber and −D fiber may be connected in either order. While FIG. 28 shows a combination of two fibers, one repeater section may consist of any number of +D fibers and −D fibers (e.g., three +D fibers and two −D fibers).

The following example shows how the hybrid solution is applied to optical transmission lines with multiple dispersion compensation intervals each composed of a main segment and a compensation segment. The dispersion compensation intervals are assumed to be uniform in length, and the net chromatic dispersions at boundary points between those intervals are randomized by combining repeater sections having various absolute average dispersions.

Figure 29:
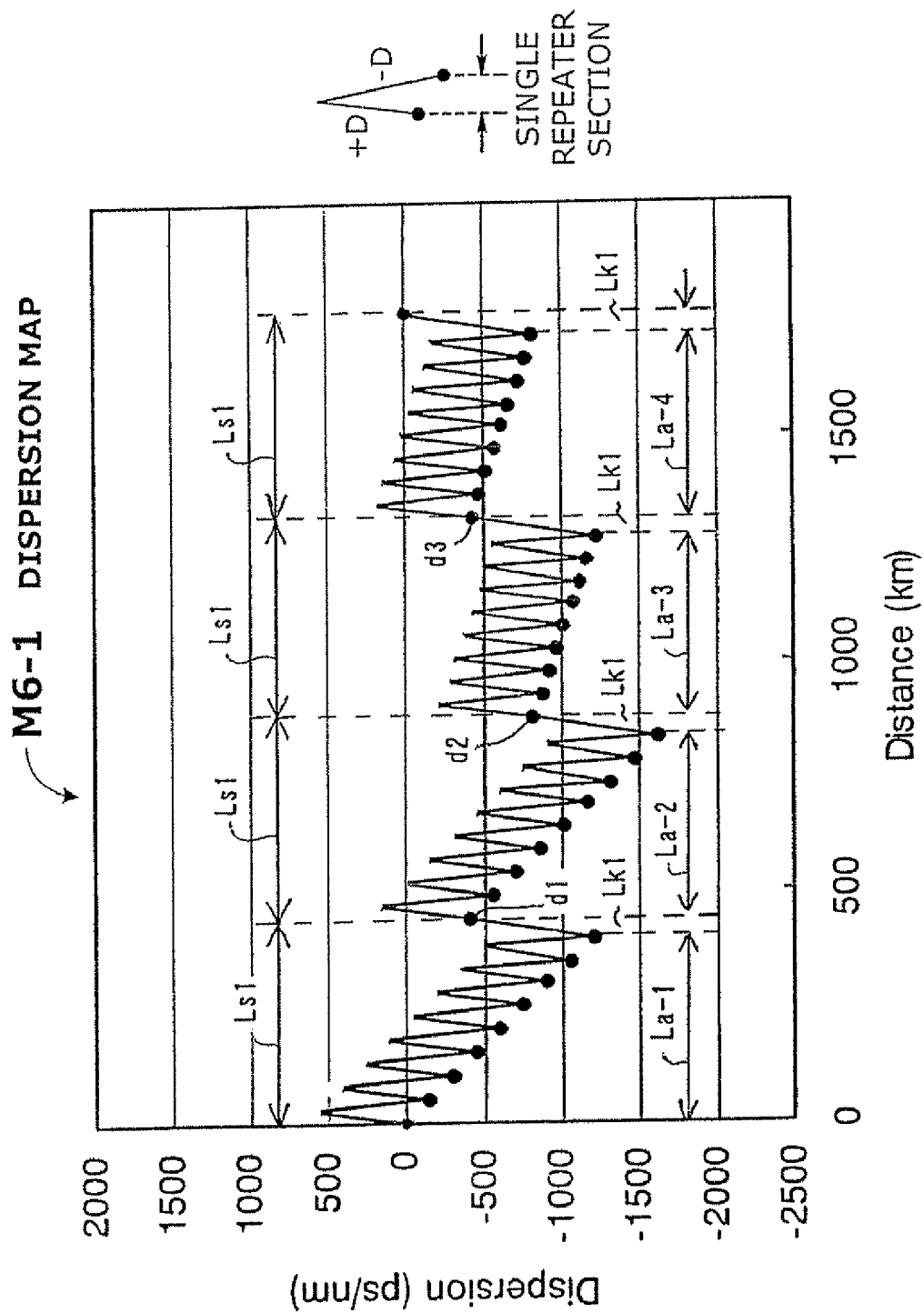
FIGS. 29 to 32 show various dispersion maps according to the dispersion management scheme of FIG. 28.

FIG. 29 shows an example of a dispersion map according to the third embodiment. Particularly, this dispersion map M6-1 illustrates the case where the boundary point between dispersion compensation intervals has a negative net dispersion. In the first two main segments La-1 and La-2, each repeater section begins with +D fiber with a dispersion coefficient of +20 ps/nm/km, which is followed by −D fiber with a dispersion coefficient of −40 ps/nm/km. The former is 30.8 km in length, while the latter is 19.2 km. The subsequent two main segments La-3 and La-4 are each composed of −D fiber and +D fiber, connected in that order. The −D fiber has a dispersion coefficient of −40 ps/nm/km and its length is 17.5 km. The +D fiber has a positive dispersion coefficient of +20 ps/nm/km and its length is 32.5 km. Every main segment is followed by a compensation segment Lk1, a 40-km long +D fiber with a dispersion coefficient of +20 ps/nm/km.

The above-described arrangement yields a negative net chromatic dispersion d1 to d3 at every boundary point of the dispersion compensation intervals Ls1 as shown in FIG. 29. Such non-zero net dispersions will alleviate nonlinear effects, thus reducing the deterioration of transmission signals.

Figure 30:
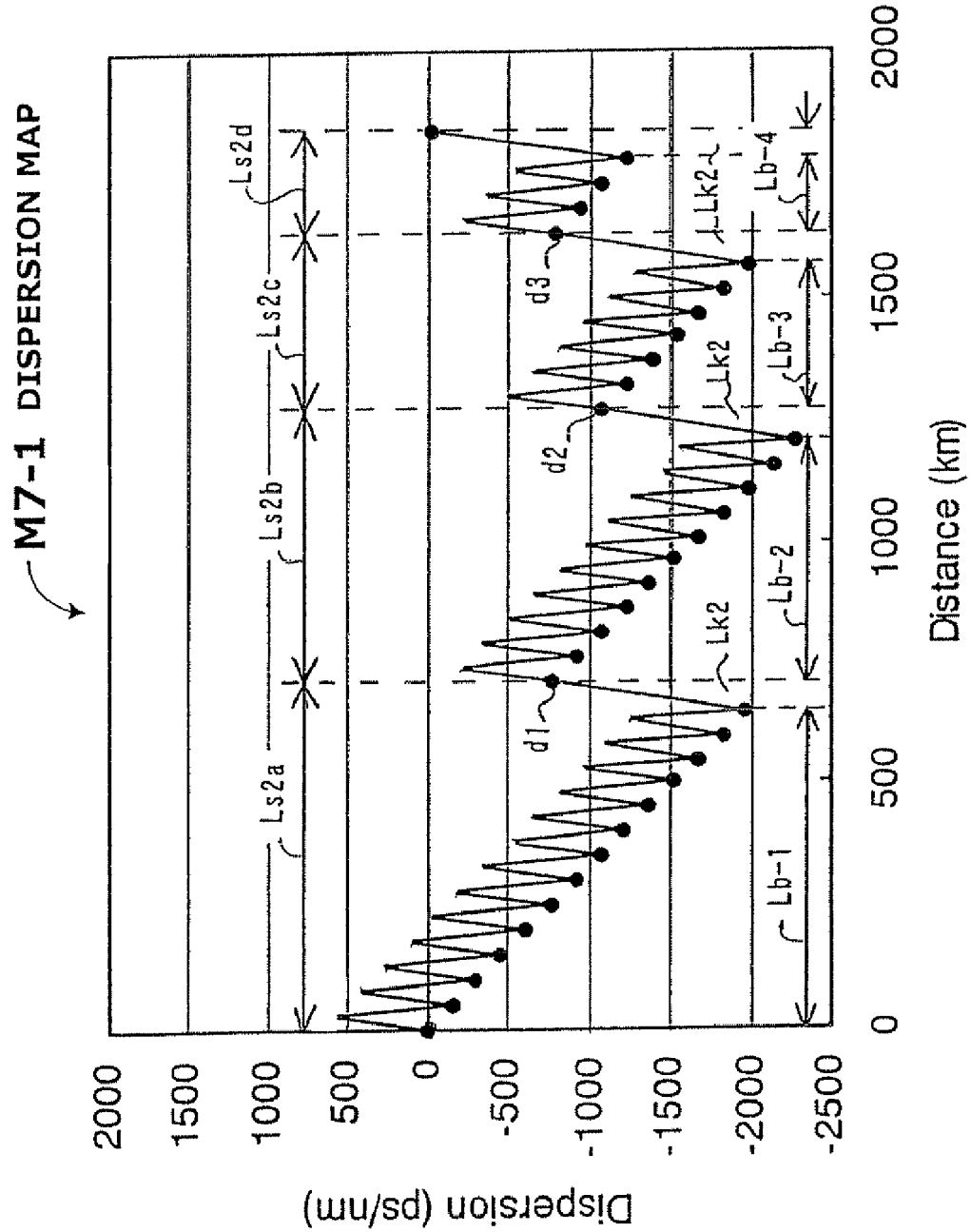

The preceding example of FIG. 29 has assumed the use of two kinds of hybrid transmission media and fixed-length compensation intervals to yield various net chromatic dispersion values. The same purpose may also be achieved by varying the length of each dispersion compensation interval as needed, and to this end, the number of repeater sections in a dispersion compensation interval may be changed. FIG. 30 shows a dispersion map of this type of approach. The illustrated dispersion map M7-1 represents a pattern of dispersion management using variable-length dispersion compensation intervals, each consisting of a different number of repeater sections. The compensation intervals are designed to have a negative net dispersion at their boundary points.

The transmission line has four dispersion compensation intervals Ls2a to Ls2d each consisting of a variable-length main segment and a fixed-length compensation segment. Main segments Lb-1 to Lb-4 are formed from a plurality of fixed-length repeater sections, each of which begins with a 30.8-km long +D fiber with a dispersion coefficient of +20 ps/nm/km, followed by a 19.2-km long −D fiber with a dispersion coefficient of −40 ps/nm/km. Those four main segments Lb-1 to Lb-4 accommodate thirteen, ten, six, and three repeater sections, respectively. Every main segment is followed by a compensation segment Lk2, i.e., 40-km long +D fiber with a dispersion coefficient of +20 ps/nm/km.

The above arrangement yields a negative net chromatic dispersion d1 to d3 at every boundary point between dispersion compensation intervals Ls2a to Ls2d as shown in FIG. 30. Such non-zero net dispersions will alleviate nonlinear effects, thus reducing the deterioration of transmission signals.

The preceding two examples have assumed that all hybrid repeater sections have negative average dispersions. Repeater sections, however, can actually be configured to have a positive average dispersion, and any values can be set to such average dispersions as required. The following example will demonstrate how non-uniform net chromatic dispersions are provided through the combined use of negative-dispersion segments and positive-dispersion segments, each composed of repeater sections with various dispersion coefficients. The example assumes that dispersion compensation intervals are equal in length.

Figure 31:
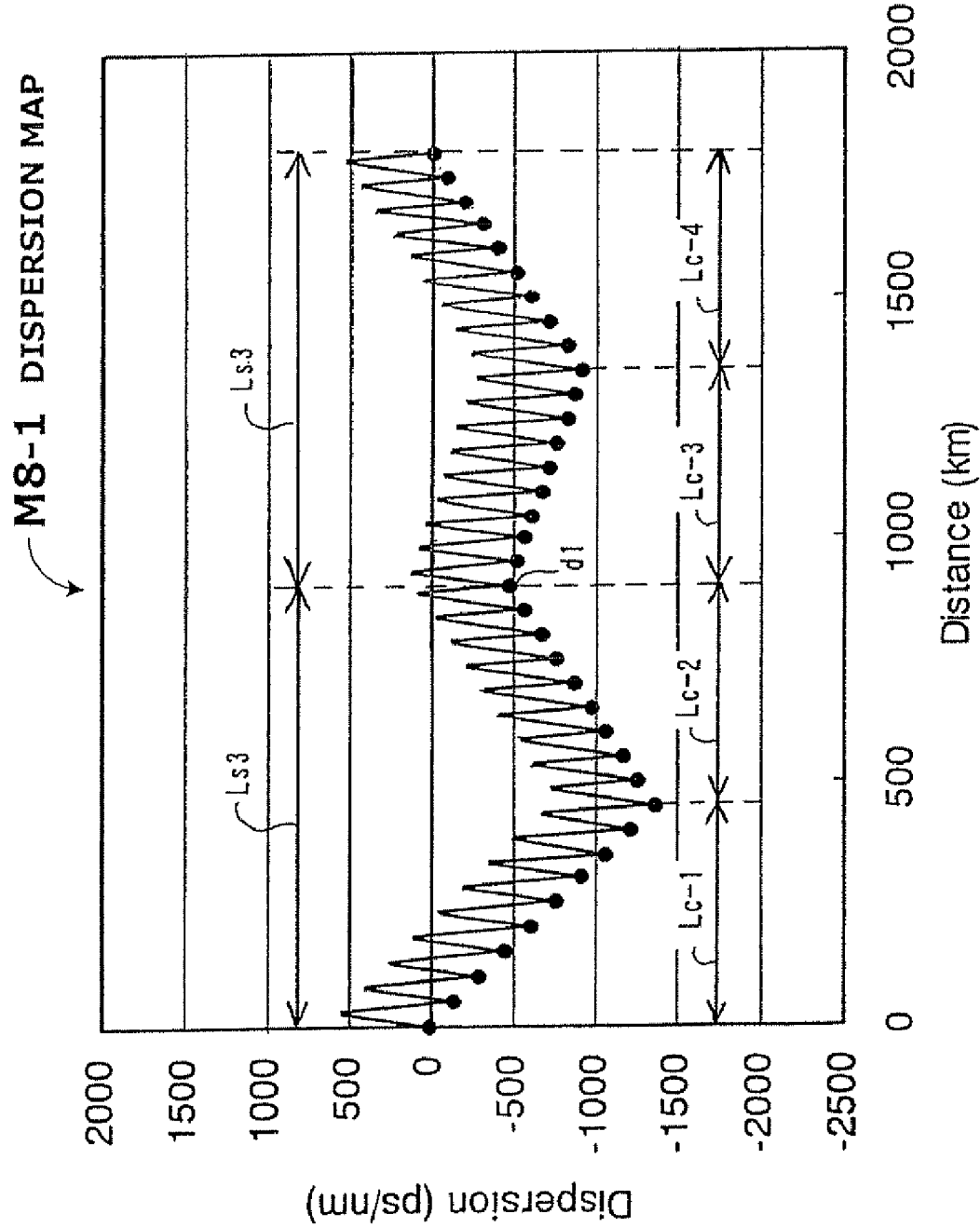

FIG. 31 shows a dispersion map. This dispersion map M8-1 illustrates the case where dispersion compensation intervals have negative net dispersions at their boundaries. More specifically, the transmission line has two fixed-length dispersion compensation intervals Ls3. The first negative-dispersion segment Lc-1 is composed of hybrid-structured repeater sections, each having a 30.8-km long fiber with a positive dispersion coefficient of +20 ps/nm/km and a 19.2-km long fiber with a negative dispersion coefficient of −40 ps/nm/km. In the second negative-dispersion segment Lc-3, each repeater section begins with a 32.5-km long +D fiber with a dispersion coefficient of +20 ps/nm/km, which is followed by a 17.5-km long −D fiber with a dispersion coefficient of −40 ps/nm/km. Those two negative-dispersion segments Lc-1 and Lc-3 are followed by positive-dispersion segments Lc-2 and Lc-4, respectively, each of whose repeater section has a hybrid structure of a 35-km long +D fiber with a dispersion coefficient of +20 ps/nm/km and a 15-km long −D fiber with a dispersion coefficient of −40 ps/nm/km.

The above-described arrangement yields a negative net chromatic dispersion at the boundary point d1 between two dispersion compensation intervals Ls3 as shown in FIG. 31. Such a non-zero net dispersion will alleviate nonlinear effects, thus reducing the deterioration of transmission signals.

Figure 32:
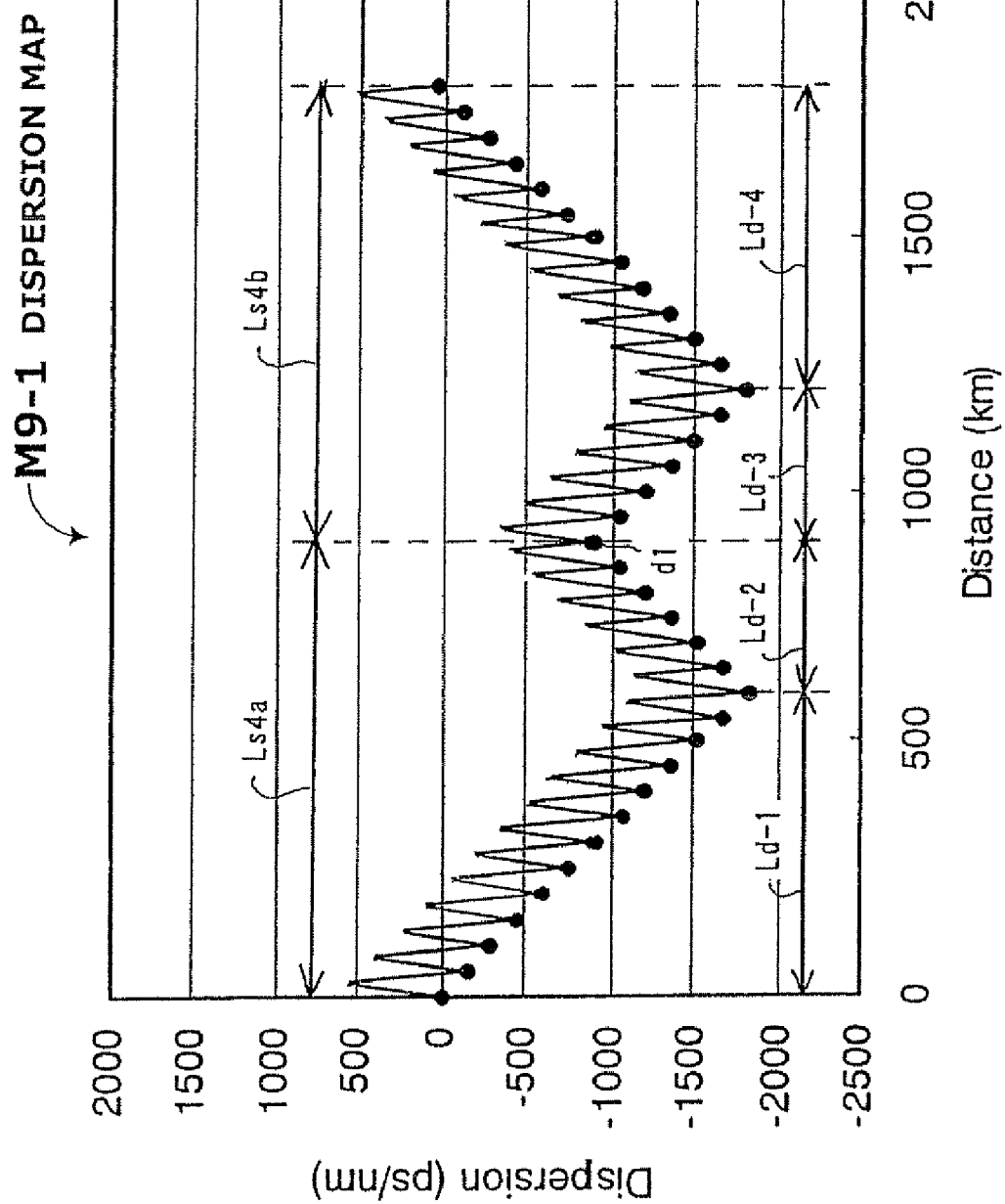

The next example will show the case where the number of repeater sections in a segment is flexible, while their average dispersions are fixed. That is, a pair of negative-dispersion and positive-dispersion segments form a variable-length dispersion compensation interval. Net chromatic dispersions are randomized by varying the number of hybrid-structured repeater sections that constitute each compensation interval. FIG. 32 shows a dispersion map of this type. The illustrated dispersion map M9-1 represents a pattern of dispersion management using variable-length dispersion compensation intervals, each consisting of a different number of repeater sections. The compensation intervals are designed to have a negative net dispersion at their boundary points.

More specifically, the transmission line has two different dispersion compensation intervals Ls4a and Ls4b. Their respective negative-dispersion segments Ld-1 and Ld-3 are composed of hybrid-structured repeater sections, each having a 30.8-km long +D fiber with a dispersion coefficient of +20 ps/nm/km and a 19.2-km long −D fiber with a dispersion coefficient of −40 ps/nm/km. The lengths of those negative-dispersion segments Ld-1 and Ld-3 are twelve spans and six spans, respectively. The positive-dispersion segments Ld-2 and Ld-4, on the other hand, are composed of repeater sections each having a hybrid structure of a 35.9-km long +D fiber with a dispersion coefficient of +20 ps/nm/km and a 14.1-km long −D fiber with a dispersion coefficient of −40 ps/nm/km.

The above-described arrangement yields a negative net chromatic dispersion at the boundary point d1 of the dispersion compensation interval Ls4a as shown in FIG. 32. Such a non-zero net dispersion will alleviate nonlinear effects, thus reducing the deterioration of transmission signals.

Dispersion Compensating Fiber

Figure 33:
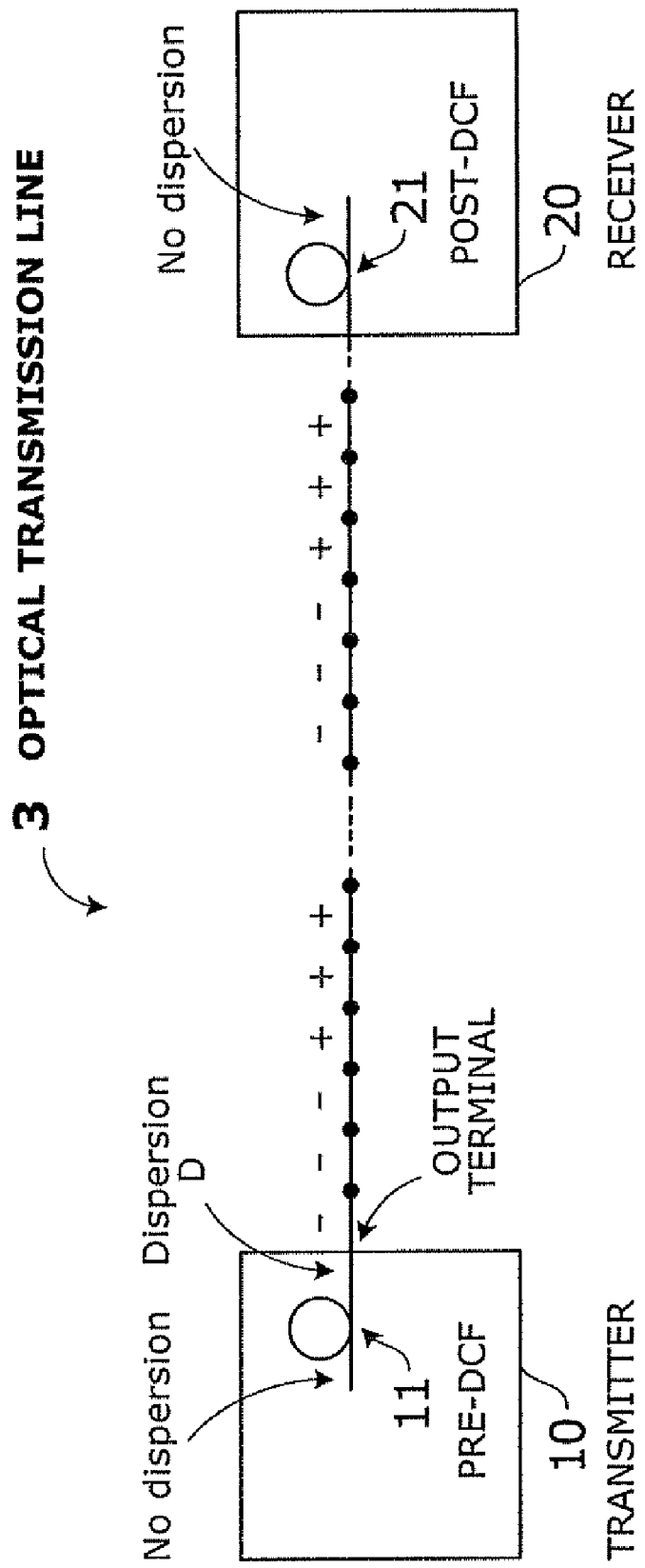
FIG. 33 shows an example of dispersion management using pre-compensation and post-compensation fibers.

This section describes dispersion management using dispersion compensating fibers (DCF). More specifically, the proposed non-zero net dispersion management is implemented by placing a pre-compensation fiber in a transmitter 10 and a post-compensation fiber in a receiver 20. FIG. 33 shows an example of a dispersion management scheme of this type. The illustrated system has a transmitter 10 with a pre-compensation fiber (PRE-DCF) 11 and a receiver 20 with a post-compensation fiber (POST-DCF) 21. An optical transmission line 3 runs between the pre-compensation fiber 11 and post-compensation fiber 21. Optical repeaters 40 are deployed on the optical transmission line 3, and the average dispersion of each repeater section is determined according to one of the dispersion management schemes that we have described up to here.

The transmitter 10 is the source of optical signals; there is no dispersion at the input end of the pre-compensation fiber 11. The pre-compensation fiber 11 gives a certain offset (D) of chromatic dispersion to the signals before they go out of the transmitter 10. The optical signals travel over the optical transmission line 3, their chromatic dispersions being compensated at appropriate intervals, so that the net dispersion will not become zero. At the receiver 20, incoming optical signals are directed to the post-compensation fiber 21 to cancel out the dispersion accumulated so far. The pre-compensation fiber 11 and post-compensation fiber 21 prevent the dispersion from becoming zero at the ends of the optical transmission line 3. This alleviates nonlinear distortions more effectively, thus reducing the deterioration of transmission signals.

Figure 34:
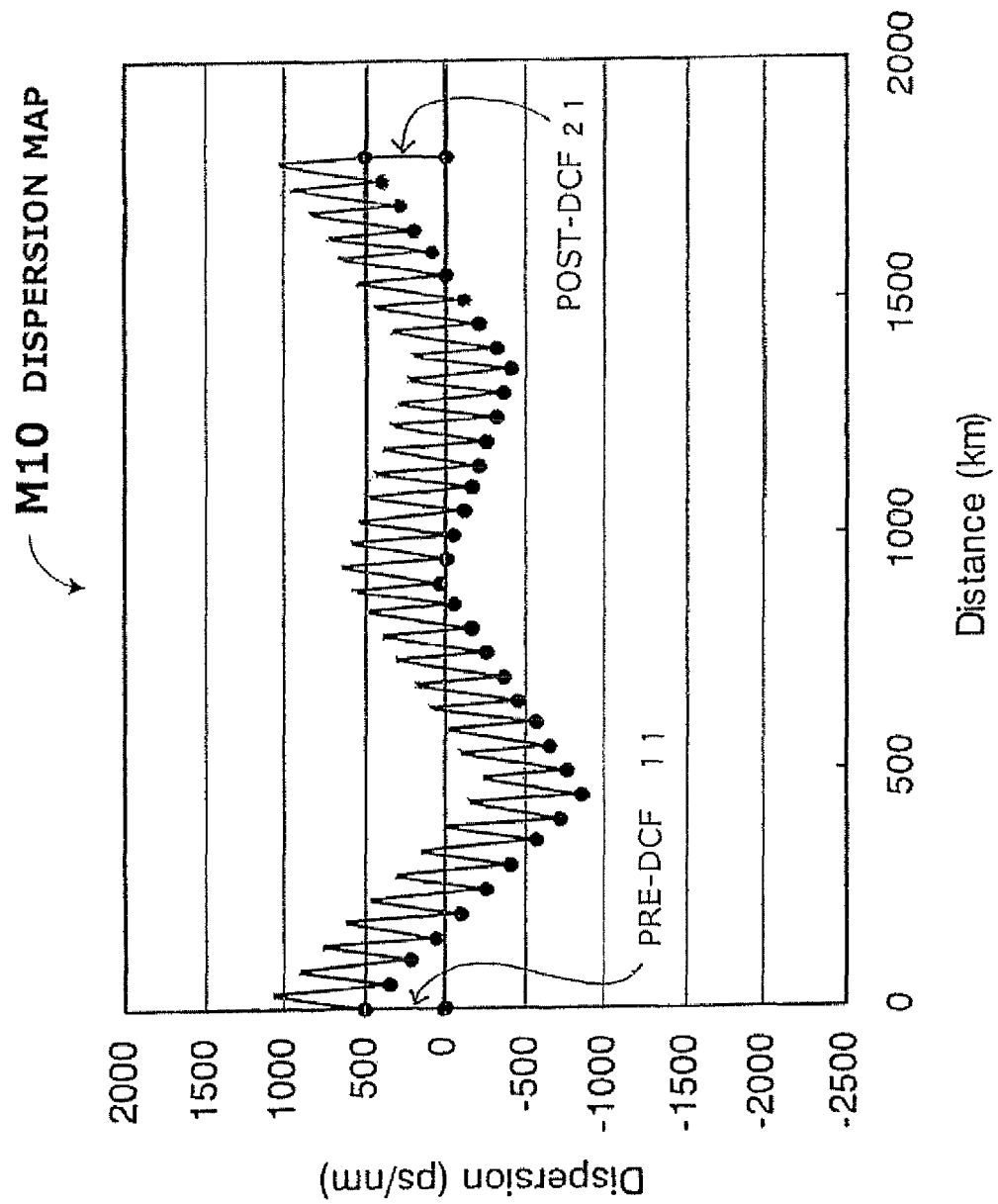
FIG. 34 shows a dispersion map according to the dispersion management of FIG. 33.

FIG. 34 shows an example of a dispersion map representing a pattern of dispersion management using pre-compensation and post-compensation fibers. As can be seen from this dispersion map M10, the dispersion is 500 ps/nm at either end of the optical transmission line 3. This chromatic dispersion is corrected to zero at the receiving end, by the effect of the post-compensation fiber 21.

Optical Transmission System

Figure 35:
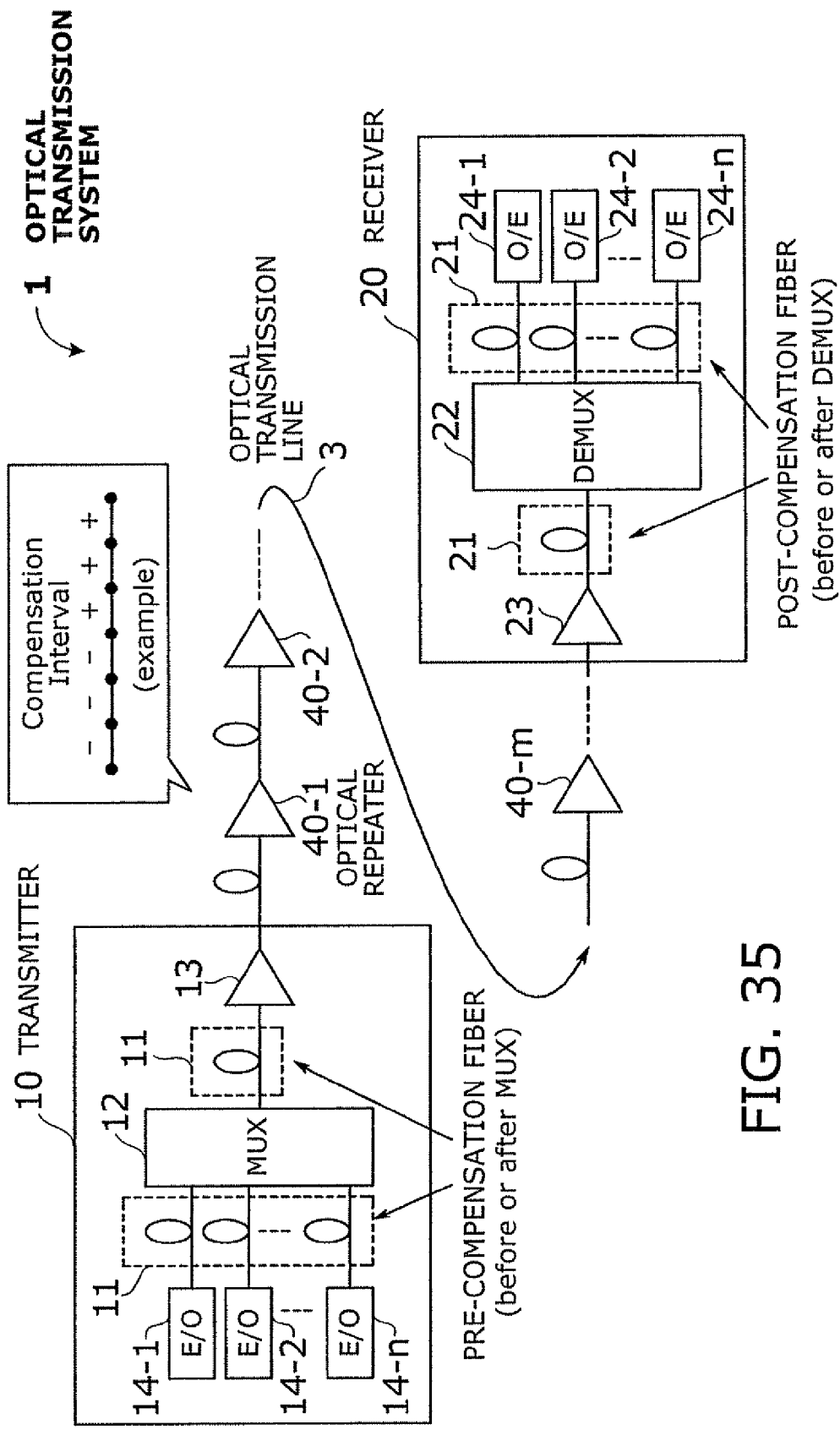
FIG. 35 shows an overall structure of an optical transmission system.

In this section, we will describe an optical transmission system using dispersion management schemes according to the present invention. FIG. 35 shows an overall structure of an optical transmission system 1. This system 1 comprises the following elements: a transmitter 10, a receiver 20, a plurality of optical repeaters 40-1 to 40-*m*, and an optical transmission line 3. The optical transmission line 3 is divided into a plurality of repeater sections. While real-world systems communicate in both directions, FIG. 35 illustrates only one direction for the purpose of simplicity.

The transmitter 10 comprises a pre-compensation fiber 11, a wavelength-division multiplexer 12, a post amplifier 13, and a plurality of electrical-to-optical (E/O) converters 14-1 to 14-*n*. The receiver 20 comprises a post-compensation fiber 21, a wavelength demultiplexer 22, a preamplifier 23, and a plurality of optical-to-electrical (O/E) converters 24-1 to 24-*n*. The pre-compensation fiber 11 is placed either before or after the wavelength-division multiplexer 12. Likewise, the post-compensation fiber 21 is placed either before or after the wavelength demultiplexer 22.

The E/O converters 14-1 to 14-*n* convert electrical signals into optical form, thus producing a plurality of optical signals with different wavelengths. The wavelength-division multiplexer 12 combines those wavelengths, thus supplying WDM optical signals to the post amplifier 13. The post amplifier 13 boosts them up to a specified power level for transmission over the optical transmission line 3.

The optical signals travels over the optical transmission line 3 and reach the receiver 20. The preamplifier 23 amplifies incoming WDM signals up to a predetermined level, and the wavelength demultiplexer 22 splits them into individual optical channel signals. The O/E converters 24-1 to 24-*n* convert them back to electrical signals for further processing.

As can be seen from the above explanation, the optical transmission system 1 of the present invention is designed to send WDM optical signals over a dispersion-managed optical transmission line that is constructed as a series of dispersion compensation intervals. The transmission line is designed in such a way that it has a non-zero net chromatic dispersion at every boundary point between dispersion compensation intervals, or in such a way that the number of boundary points with zero net chromatic dispersion is minimized. This feature of the present invention alleviates waveform distortions due to nonlinear effects in fibers, thus improving quality and reliability of optical communication services.

Figure 36:
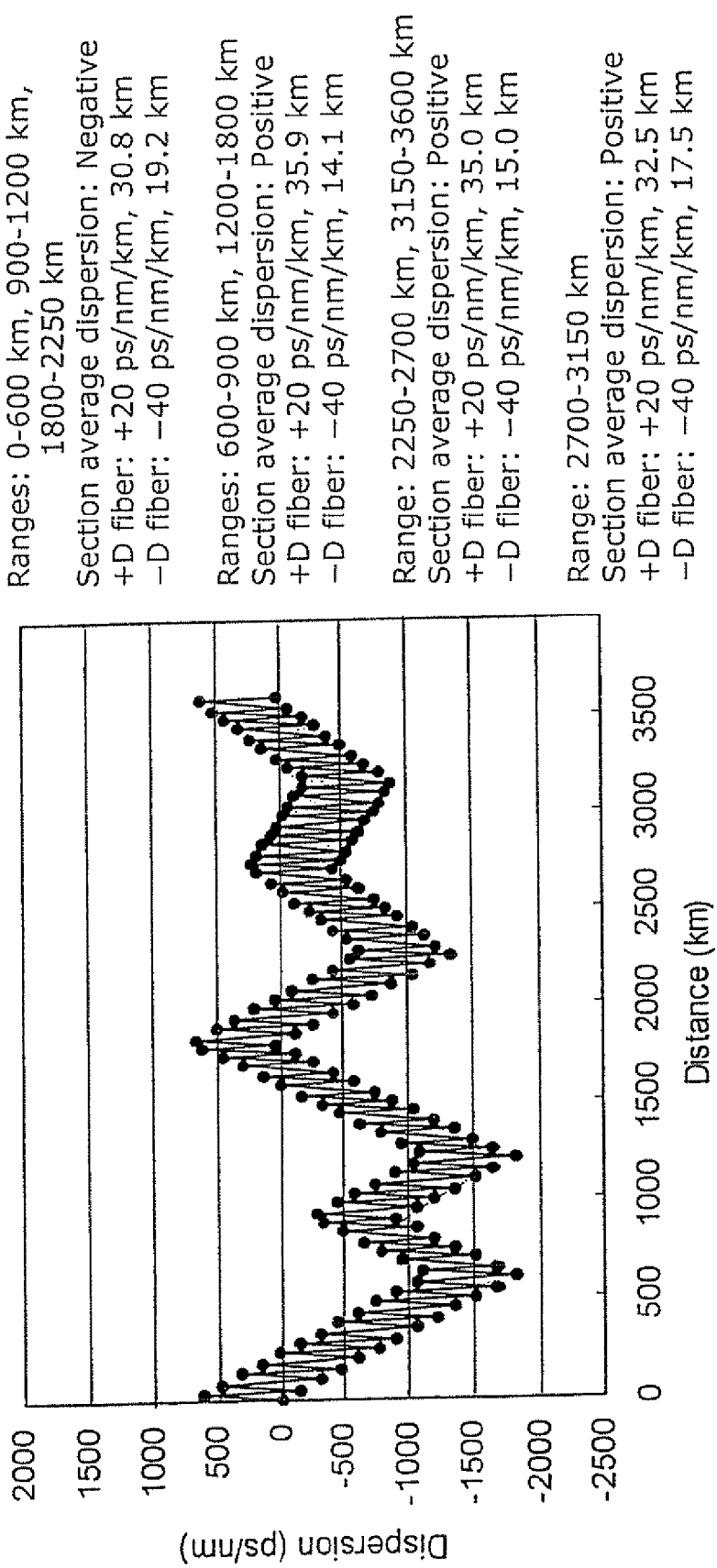
FIG. 36 shows a dispersion map of the present invention, in which various types of repeater sections are combined.

We have described various dispersion management schemes, presenting specific dispersion maps for illustrative purposes. The present invention, however, should not be limited to those specific examples. Those skilled in the art would appreciate that the foregoing dispersion compensation intervals may be combined in flexible ways to construct a desired optical transmission line. One such example is shown in FIG. 36.

Optical Transmission System with Raman Amplifiers

Figure 37:
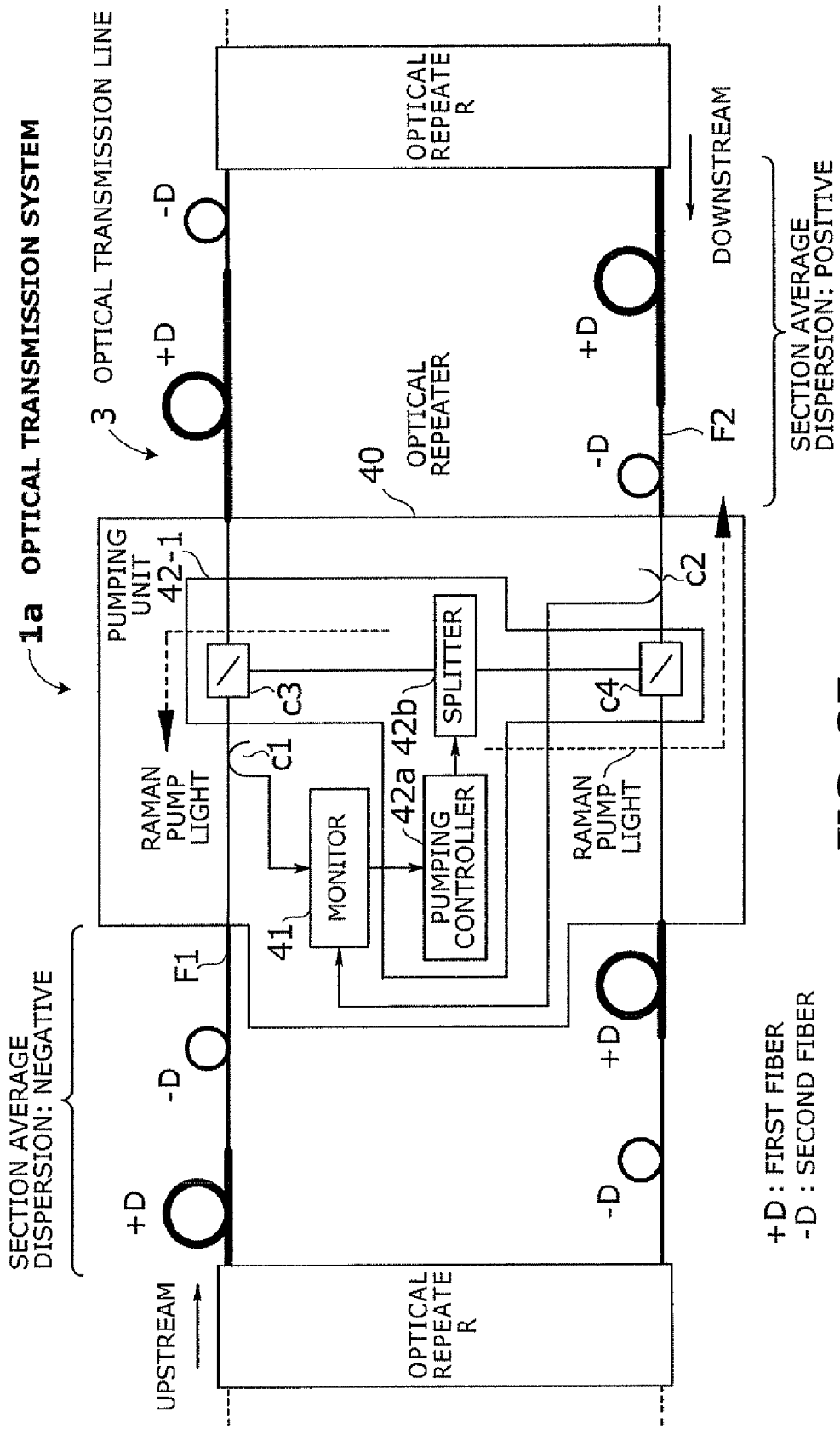
FIG. 37 is a conceptual view of an optical transmission system according to the present invention.

This section will describe an optical transmission system with improved stability of Raman amplification. FIG. 37 is a conceptual view of an optical transmission system 1*a* according to the present invention, which employs Raman amplifiers in optical repeaters. The optical transmission lines 3 are divided into repeater sections each having a first fiber with positive dispersion and a second fiber with negative dispersion. The second fiber has a smaller mode field diameter than the first fiber. The first and second fibers are referred to hereafter as +D fiber and −D fiber, respectively. In each repeater section, those two types of fibers are connected in such a way that optical signals will propagate from +D fiber to −D fiber. The lengths of +D fiber and −D fiber may vary to obtain a different dispersion value. In FIG. 37, −D fiber F1 of the left section is longer than −D fiber F2 of the right section.

The optical repeater 40 comprises a monitor 41 and a pumping unit 42-1. The pumping unit 42-1 comprises a pumping controller 42*a*, a splitter 42*b*, and couplers c3 and c4. The monitor 41 monitors the power levels of upstream and downstream optical signals received through couplers c1 and c2, respectively. Based on the monitoring results, the pumping controller 42*a* varies its pump light output. The splitter 42*b* divides the generated pump light into two beams for delivery to the upstream −D fiber and downstream −D fiber through their corresponding couplers c3 and c4. The launched pump light beam propagates through the fiber medium in the opposite direction from the signal light. This is known as the backward pumping. While FIG. 37 shows only one pump beam source (i.e., pumping controller 42*a*), the optical repeater 40 may haw two or more such light sources to create a redundant system.

Optical Power Control

Figure 38:
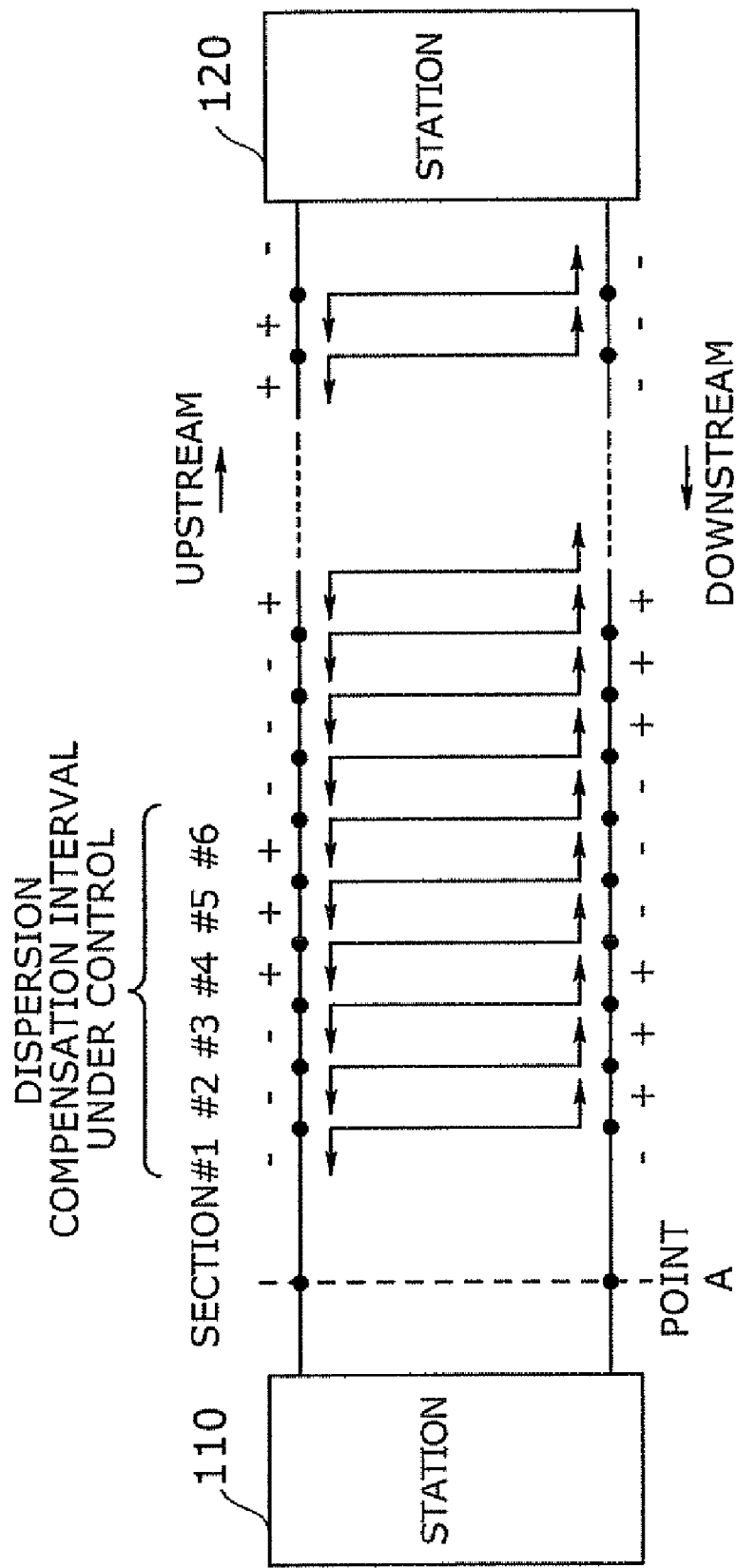
FIG. 38 shows an example of an optical transmission system.

The optical transmission system 1*a* described in the preceding section controls optical signal power levels as follows. FIG. 38 shows an example of the optical transmission system 1*a*. Two distant stations 110 and 120 communicate through a set of upstream and downstream optical transmission lines 3. The bidirectional arrows in FIG. 38 indicate Raman pump lights provided from optical repeaters 40 (details omitted). Each repeater section has a hybrid structure of +D fiber (e.g., +20 ps/nm/km) and −D fiber (e.g., −40 ps/nm/km). Those two types of fibers are connected in series, so that optical signals will propagate from +D fiber to −D fiber. The ratio of +D fiber length versus −D fiber length may vary to yield a different average dispersion in a different section. In FIG. 38, the symbols "−" and "+" represent whether the average dispersion of each repeater section is negative or positive. For the sake of simplicity, some additional symbols are defined as follows:

−Davg (repeater section with negative average dispersion
  +Davg (repeater section with positive average dispersion)
  −Davg/+Davg (combination of upstream −Davg and downstream +Davg)
  +Davg/−Davg (combination of upstream +Davg and downstream −Davg)
  +Davg/+Davg (combination of upstream +Davg and downstream +Davg)
  −Davg/−Davg (combination of upstream −Davg and downstream −Davg)

Figure 39:
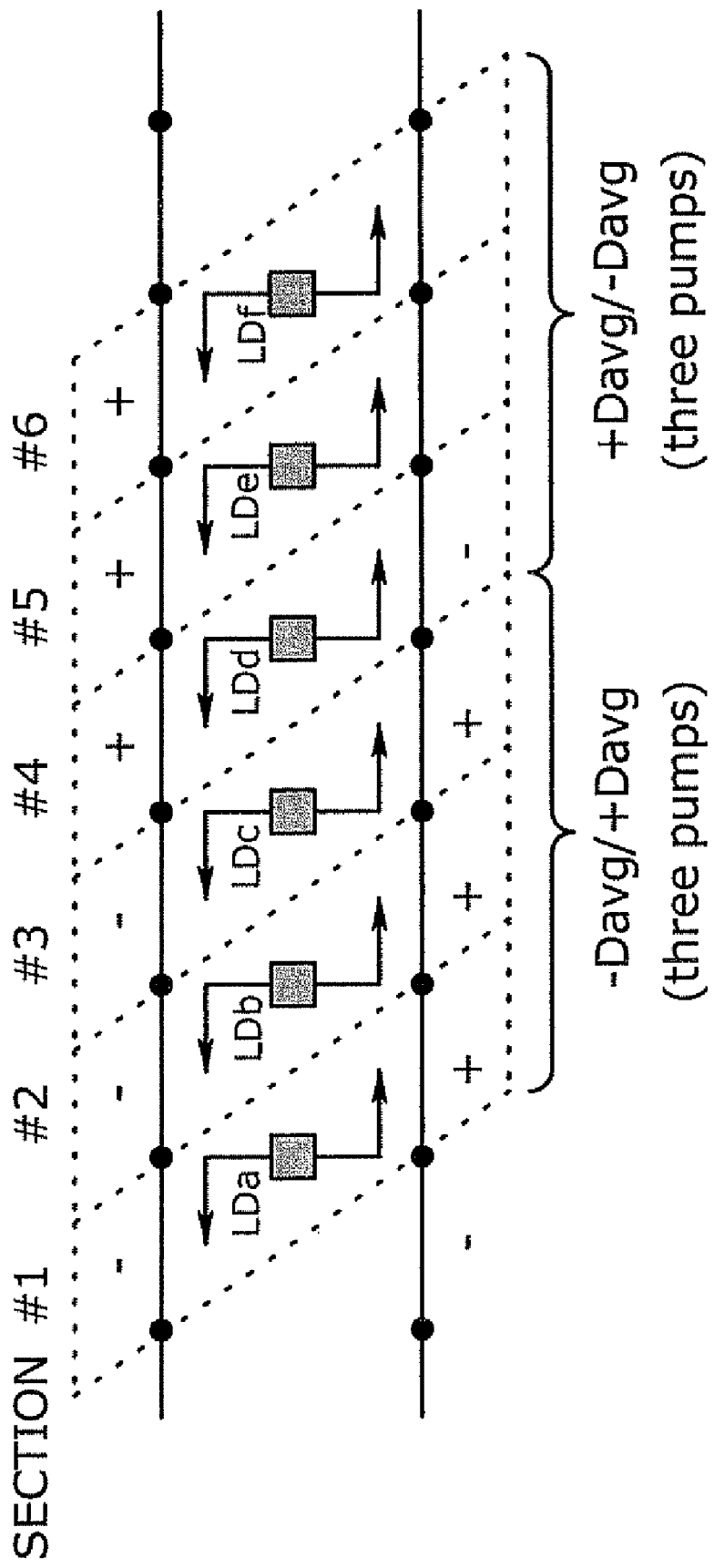
FIG. 39 shows the number of pumps in a dispersion compensation interval.
Figure 40A:
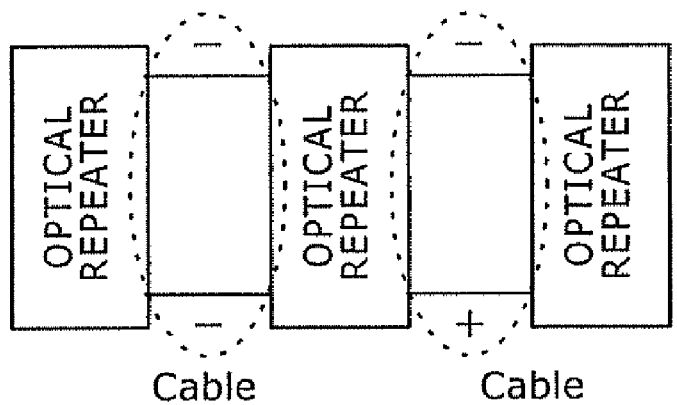
FIG. 40A shows cables used to connect optical repeaters, which have different average dispersions.
Figure 40B:
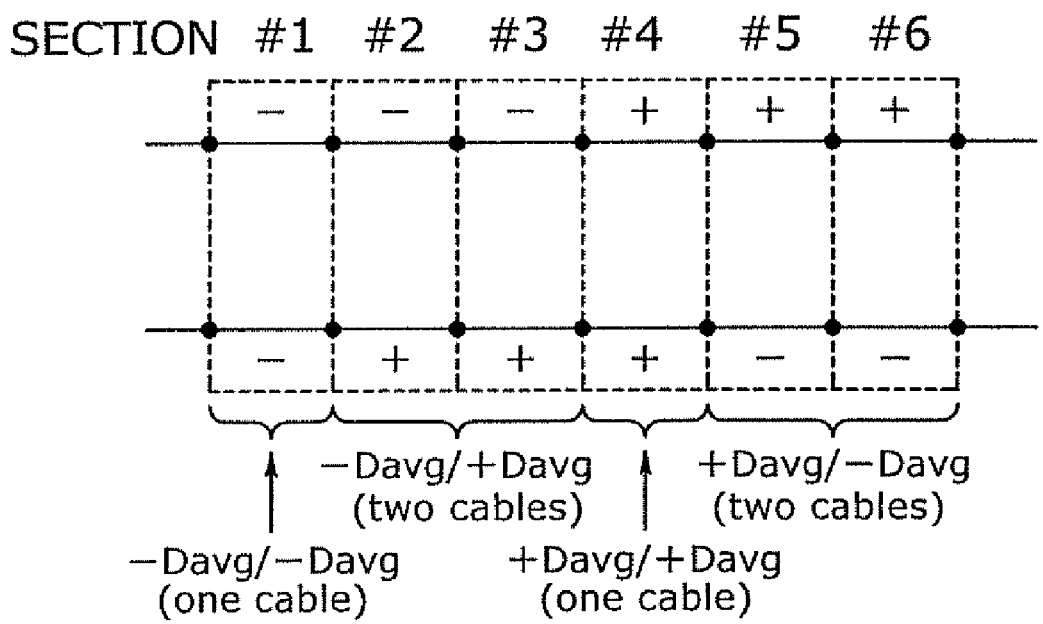
FIG. 40B shows the number of cables used in a dispersion compensation interval.

Think of, for example, a dispersion compensation interval consisting of six repeater sections #1 to #6, three being positive and the other three being negative as shown in FIG. 38. Repeaters are connected by optical cables containing an upstream fiber and a downstream fiber (see FIG. 40A) In the present example, four different type of cables, i.e., −Davg/+Davg, +Davg/−Davg, +Davg/+Davg, and −Davg/−Davg are needed. Pump light beams produced by laser diodes are supplied to three +Davg/−Davg sections and three −Davg/+Davg sections. The present invention provides a technique to adjust the balance of optical signal power levels between upstream and downstream links by tuning the pump light sources in these six sections. FIG. 39 shows the number of such pumps in the dispersion compensation interval of FIG. 38, and FIG. 40B shows the number of such cables used in the same. FIG. 41 shows a table T1 that summarizes the number of pumps and the number of cables for each pattern of sections shown in FIG. 38.

FIG. 42 represents, in table form, an algorithm of power balance adjustment for optical signals. This algorithm AL1 gives how to tune the output of pump laser diodes depending on the optical power condition of upstream and downstream links. Rule #1, for example, means the following: if the upstream link power is high while the downstream link power is small, then raise the output of pump laser diodes for +Davg/−Davg sections (e.g., LDa, LDb, LDc in FIG. 39) while lowering the output of pump laser diodes for −Davg/+Davg sections (e.g., LDd, LDe, LDf in FIG. 39). By controlling the pump light sources in this way, the optical transmission system 1a reduces the difference of optical signal power levels between the upstream and downstream links, while maintaining a specified average Raman gain. The system operates in a similar way for the other rules #2 to #4.

Figure 44:
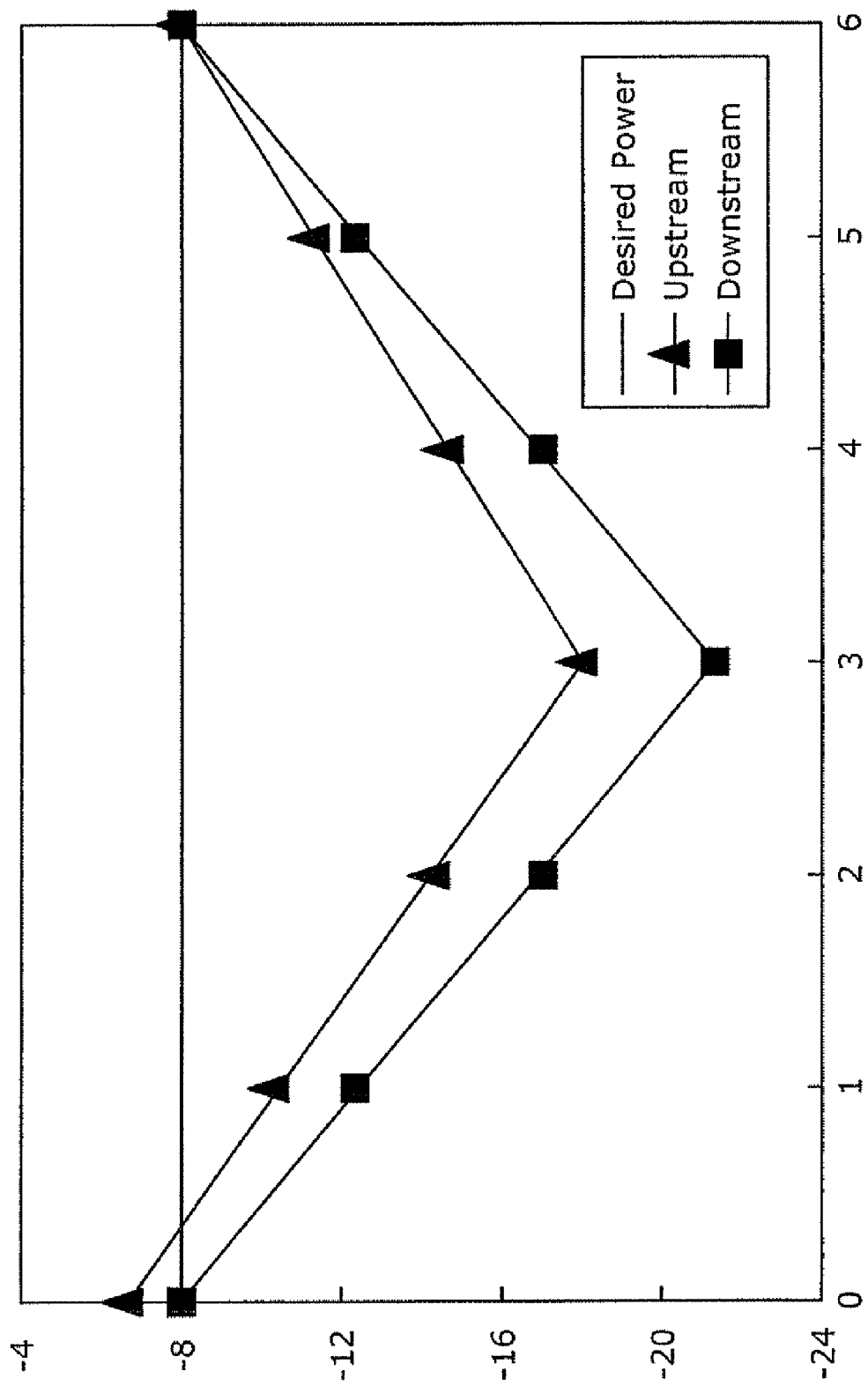
FIG. 44 is a graphical representation of the optical signal power distribution provided in the table of FIG. 43.

Referring next to FIGS. 43 to 45, we will present more specific, quantitative results of the above-described optical signal power control, assuming the six-section dispersion compensation interval of FIG. 38. FIG. 43 is a table showing the initial distribution of optical signal power levels, and FIG. 44 gives a graphical representation of that distribution. That is, FIG. 44 shows the distribution of upstream and downstream signal power levels measured at point A and each repeater. As seen, the optical power level of upstream signals at point A is −6 dBm, and that of downstream signals is −8 dBm, whereas the desired power level is −7 dBm. The power balance adjustment algorithm AL1 of FIG. 42 is applied in this situation, resulting in the pump light power and Raman gain shown in FIG. 45. That is, the algorithm AL1 reduces the pump light power in −Davg/+Davg sections while it increase that in +Davg/−Davg sections. This control operation decreases the optical power difference between upstream and downstream at point A, thus changing both the upstream and downstream signals toward the desired power level of −7 dBm.

Optical Signal Power Adjustment with VOA

Figures 46A, 46B:
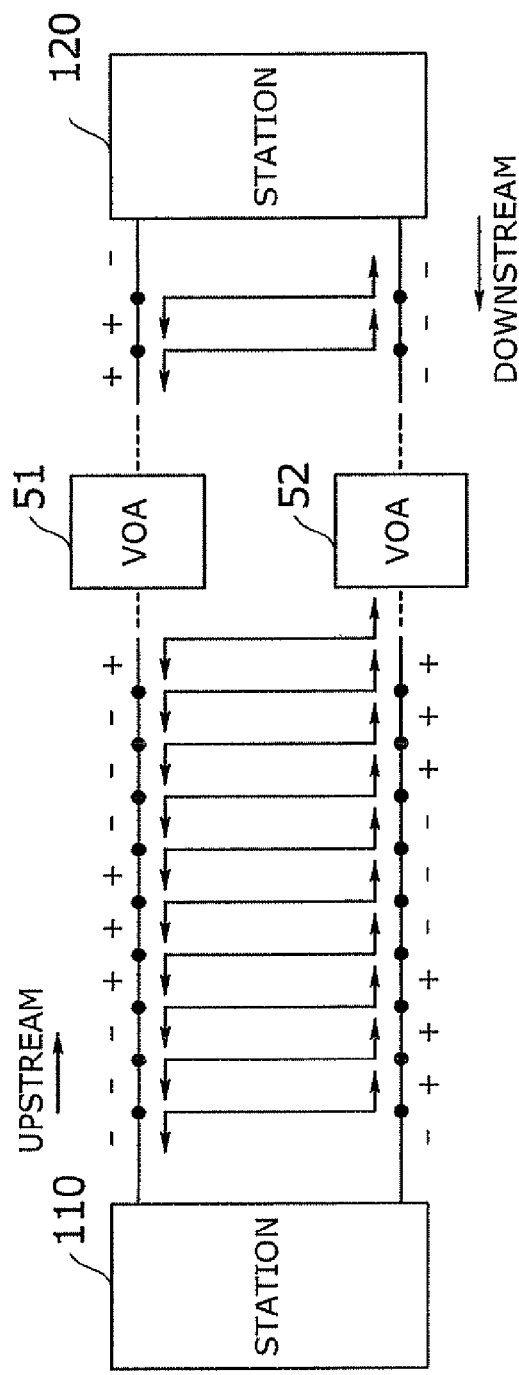
FIGS. 46A and 46B show a structure of an optical transmission system with variable optical attenuators.

This section describes optical signal power adjustment using variable optical attenuators (VOA). FIG. 46A shows an example of an optical transmission system with VOAs according to the present inventions and FIG. 46B shows the configuration of a dispersion compensation interval. Upstream and downstream links interconnect two distant stations 110 and 120. To assist the adjustment of optical signal power levels for each individual fiber strand, a plurality of VOAs 51 and 52 are disposed on the upstream and downstream links, one pair for every several repeater sections.

FIG. 47 represents, in table form, an algorithm of power balance adjustment for optical signals. Rule #1, for example, means the following: if the upstream link power is high while the downstream link power is small, then raise the output of pump laser diode for +Davg/−Davg sections while lowering the output of pump laser diodes for −Davg/+Davg sections, and in addition, raise the attenuation at the upstream VOA 51 while lowering the attenuation at the downstream VOA 52. The VOAs 51 and 52 enables fine tuning of power balance, which may not be achieved by controlling pump laser diodes alone. Such control operations will bring the upstream and downstream power levels into better balance, while maintaining average Raman gains at a constant level. The system operates in similar ways for the other rules #2 to #4.

Optical Signal Power Adjustment with VGE

Figures 48A, 48B:
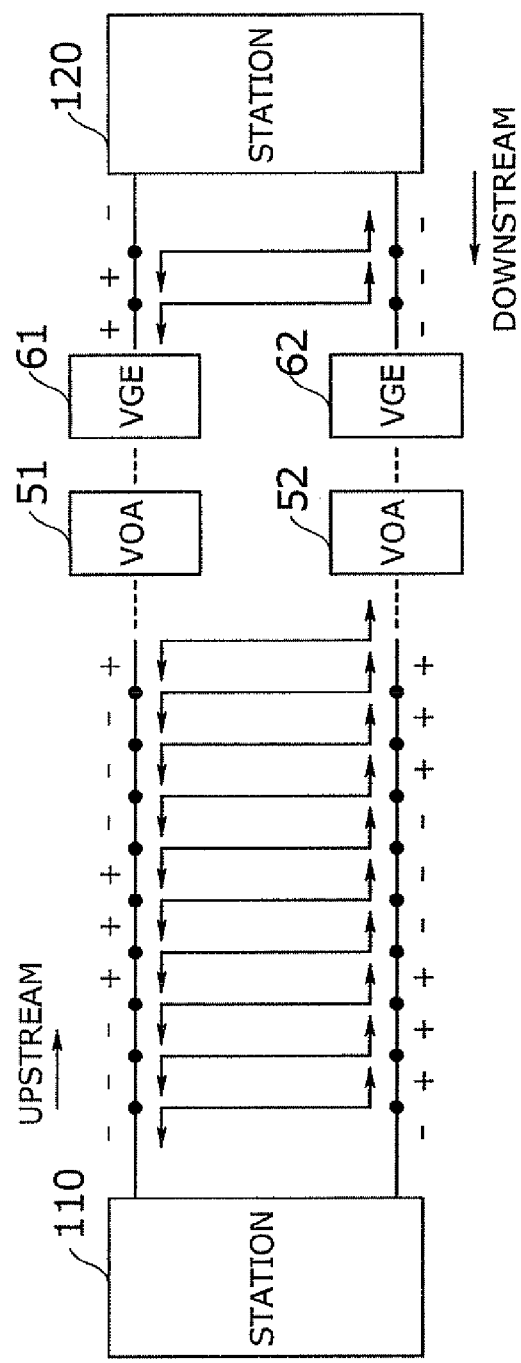
FIGS. 48A and 48B show a structure of an optical transmission system with variable optical attenuators and variable gain equalizers.

This section describes optical signal power adjustment using variable gain equalizers (VGE). FIG. 48A gives an example of an optical transmission system with VOAs and VGEs according to the present invention, and FIG. 48B shows the configuration of a dispersion compensation interval. Upstream and downstream links interconnect two distant stations 110 and 120. In addition to VOAs 51 and 52, VGEs 61 and 62 are disposed on the upstream/downstream links, one pair for every several repeater sections. When the system adjusts pump laser power to compensate for an increased transmission loss, the resultant change in Raman gains could bring about a different state of imbalance between upstream and downstream Raman amplification gains. VGEs would work effectively in correcting such Raman gain imbalance and preventing transmission signals from deteriorating.

Figure 49:
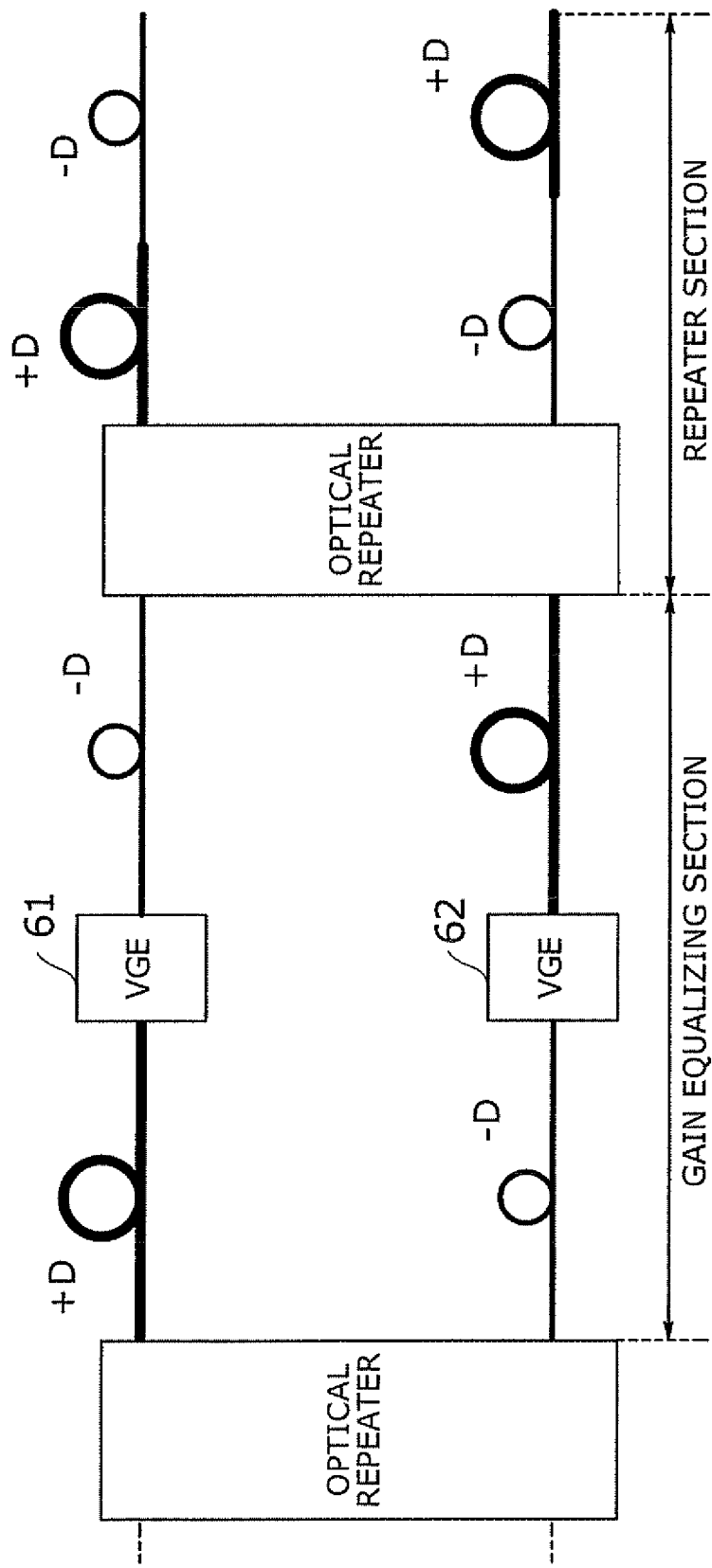
FIG. 49 shows optical transmission lines having a gain equalizing section.

FIG. 49 shows optical transmission lines having gain equalizing sections. It is desirable, when using VGEs, that −D fiber and +D fiber connected to opposite ports of each VGE 61 and 62 be equal in length. If this requirement is satisfied, then it means that the gain equalizing section in question has a negative average dispersion because the magnitude of chromatic dispersion in −D fiber is larger than that in +D fiber. It is also desirable to make the length of −D fiber equal to that of a section with a negative section average dispersion. This is because it eliminates the need for preparing optical repeaters having different pump laser power, and because the system becomes more tolerant about insertion loss of gain equalizers.

Figures 50A, 50B, 50C:
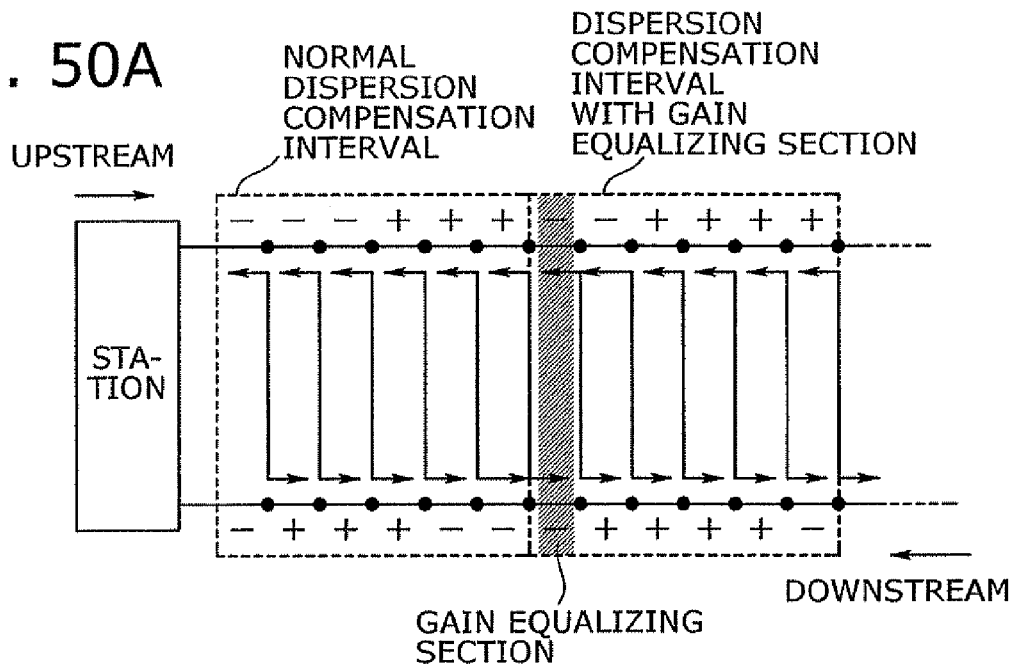
FIGS. 50A, 50B, and 50C show a structure of an optical transmission system with a gain equalizing section.

FIG. 50A gives an example of an optical transmission system with equalization sections, and FIGS. 50B and 50C show the configuration of dispersion compensation intervals. As stated above, a gain equalizing section is assigned to a repeater section that is supposed to have a negative average dispersion in both upstream and downstream links. Since +D fiber and −D fiber in a gain equalizing section have substantially equal lengths, the resulting net chromatic dispersion in that section is three times as high as a normal negative-dispersion section's. For this reason, six repeater sections constituting the second dispersion compensation interval in FIG. 50A include two −Davg sections (one of which is a gain equalizing section) and four +Davg sections.

Table T2 in FIG. 50C shows the configuration of this dispersion compensation interval with a gain equalizing section. Specifically, it needs all four kinds of cables, i.e., +Davg/−Davg, −Davg/+Davg, +Davg/+Davg, and −Davg/−Davg. Pump light beams are supplied to two +Davg/−Davg sections, two −Davg/+Davg sections, and two +Davg/+Davg sections. A proper optical power balance between upstream and downstream links can be attained by tuning the pump light power in two −Davg/+Davg sections and two +Davg/−Davg sections out of the six sections.

Optical Repeater with Variable Splitter

Figure 51:
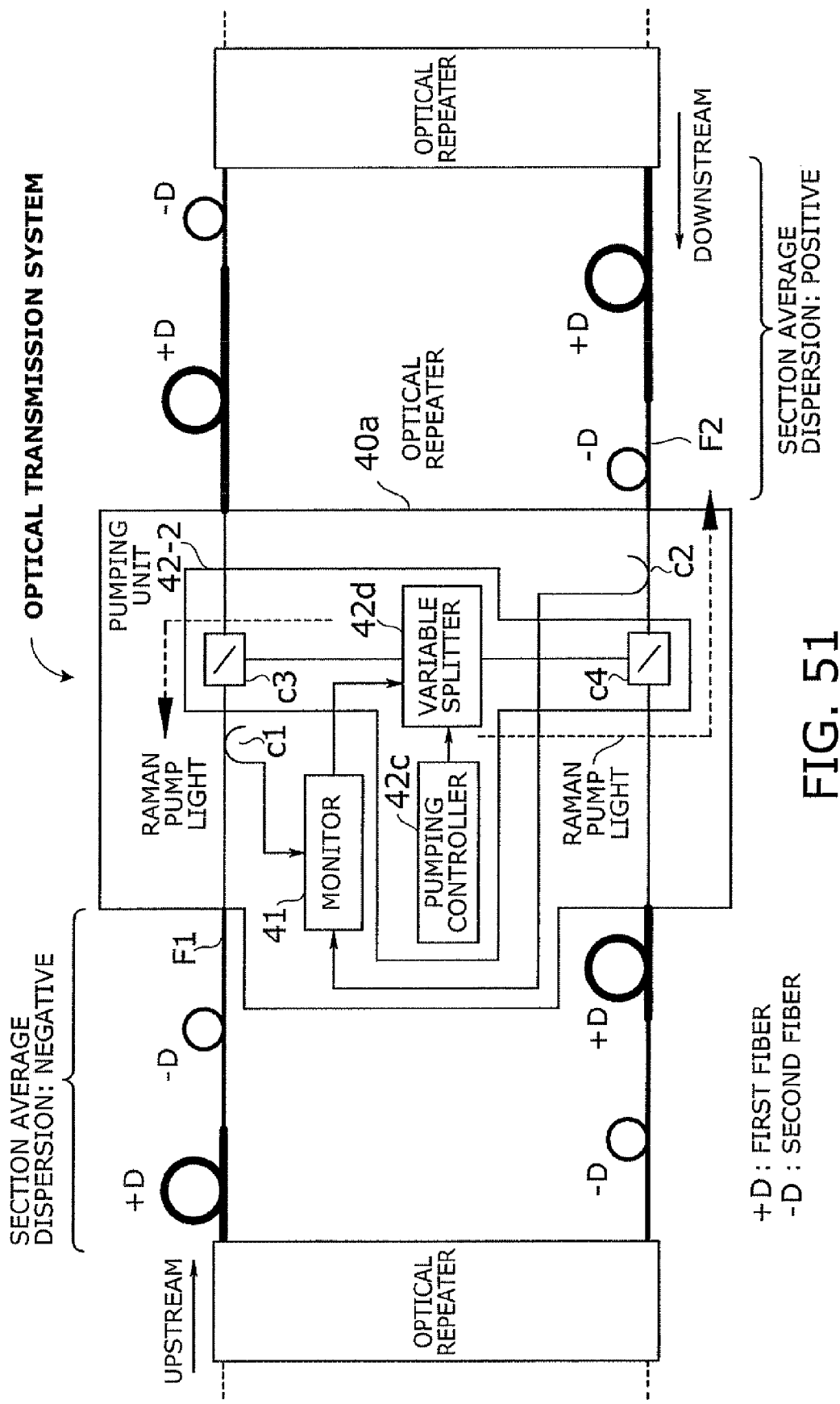
FIG. 51 shows a variation of the proposed optical repeater structure.

We will now present a variation of the optical repeater described earlier in FIG. 37. FIG. 51 shows an optical repeater 40a, which has a monitor 41 and a pumping unit 42-2. The pumping unit 42-2 comprises a pumping controller 42c, a variable splitter 42d, and couplers c3 and c4. The monitor 41 monitors the power levels of upstream and downstream optical signals received through couplers c1 and c2, respectively. The pumping controller 42c produces a pump light at a constant level. The variable splitter 42d varies its split ratio depending on the monitoring results, so that the constant pump light will be split into two beams for delivery to −D fibers. The divided pump light beams are supplied to the upstream and downstream fibers through the couplers C3 and c4, respectively. Each pump light beam propagates through the fiber medium in the opposite direction from the signal light, which is known as the backward pumping.

The proposed optical repeater 40a uses a variable splitter 42d in the way described above to control the power of pump light beams for the upstream and downstream transmission lines. The variable splitter 42d is implemented by using, for example, Mach-Zender waveguide devices. The optical repeaters 40a are expected to work more effectively when they are employed in −Davg/+Davg sections or +Davg/−Davg sections. Preferably, the proposed optical repeater 40a is inserted every few repeater sections.

Examples of Dispersion Compensation Intervals

In this section, we will present several examples of the proposed optical transmission system and explain how they adjust optical signal power levels.

Figures 52A, 52B:
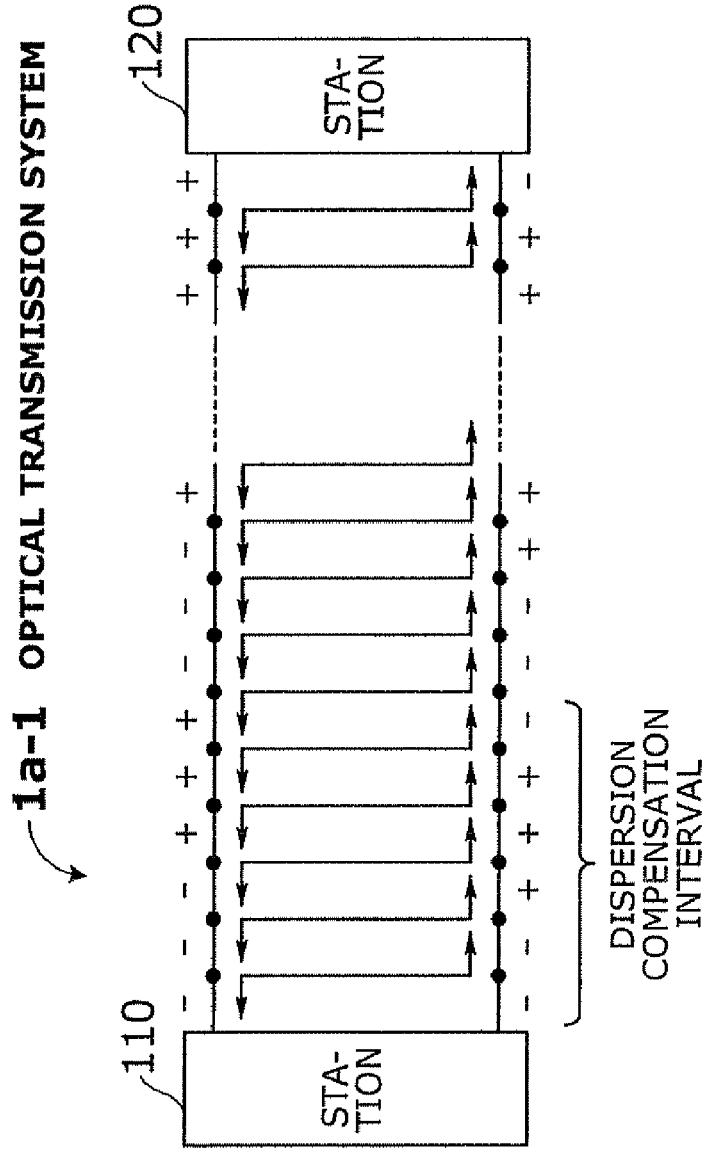
FIGS. 52A and 52B shows an example of an optical transmission system.

FIG. 52A gives an example of an optical transmission system, and FIG. 52B shows the configuration of each dispersion compensation interval. FIG. 53 shows an algorithm AL3 of power balance adjustment for optical signals. In the illustrated optical transmission system 1a-1, each dispersion compensation interval includes six repeater sections. Specifically, it requires all four kinds of cables, i.e., +Davg/−Davg, −Davg/+Davg, +Davg/+Davg, and −Davg/−Davg. Pump light beams are supplied to two +Davg/−Davg sections, two −Davg/+Davg sections, one +Davg/+Davg section, and one −Davg/−Davg section.

To attain a proper power balance between upstream and downstream links, the algorithm AL3 manipulates the pump light power in the −Davg/+Davg section and +Davg/−Davg section out of the six repeater sections. In addition to this, the algorithm AL3 manipulates −Davg/−Davg and +Davg/+Davg sections to vary the average gain of both upstream and downstream links.

Figures 54A, 54B:
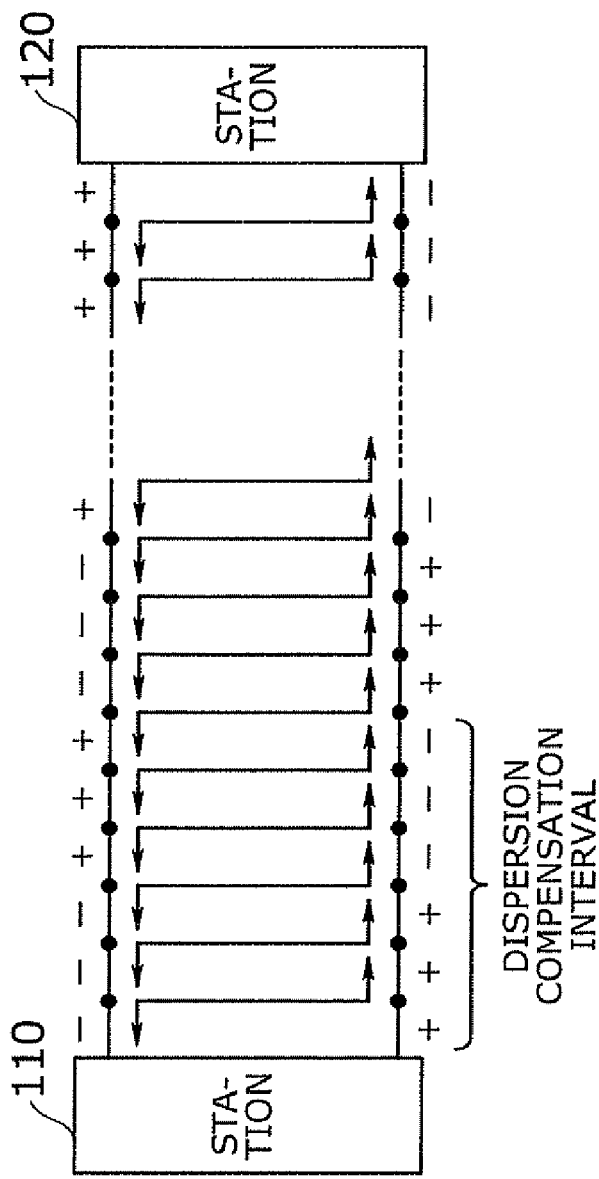
FIGS. 54A and 54B show a configuration of an optical transmission system.

FIG. 54A gives another optical transmission system, and FIG. 54B shows the configuration of each dispersion compensation interval. In the illustrated optical transmission system 1a-2, each dispersion compensation interval includes six repeater sections. Unlike the preceding system 1a-1, it only requires two kinds of cables, +Davg/+Davg and −Davg/−Davg. Pump light beams are supplied to two +Davg/−Davg sections, two −Davg/+Davg sections, one +Davg/+Davg section, and one −Davg/−Davg section.

The same power balance adjustment algorithm AL3 (FIG. 53) can be used to control the above system 1a-2. A proper optical power balance between upstream and downstream links can be attained by tuning the pump light power in two −Davg/+Davg sections and two +Davg/−Davg sections out of the six sections. Also, the algorithm AL3 manipulates −Davg/−Davg and +Davg/+Davg sections to vary the average gain of both upstream and downstream links.

Figures 55A, 55B:
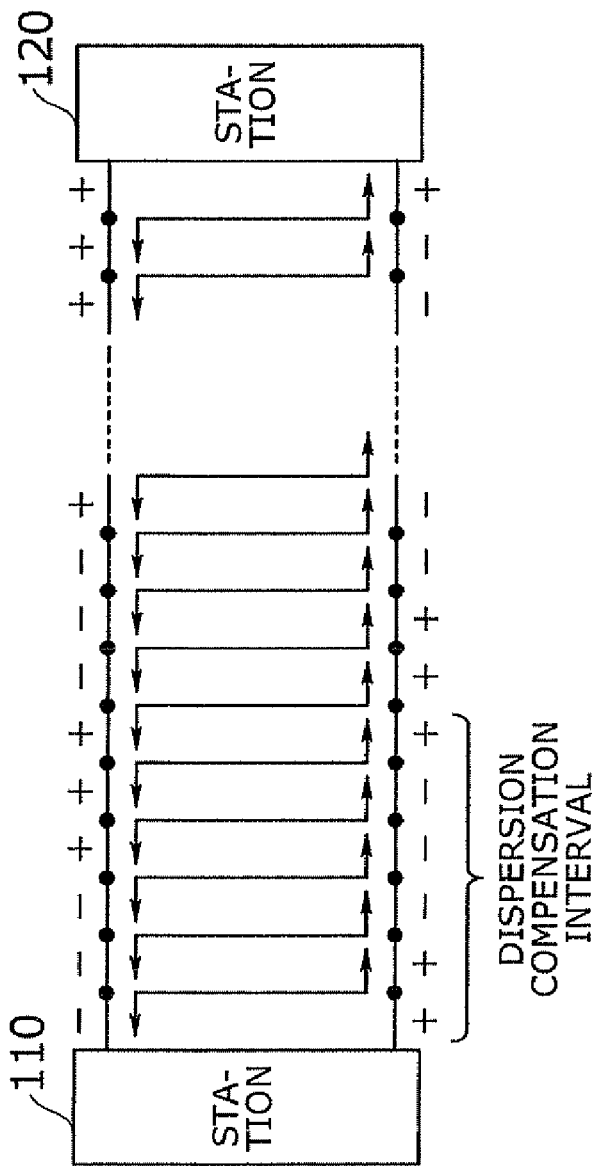
FIGS. 55A and 55B show a configuration of another optical transmission system.

FIG. 55A gives yet another optical transmission system, and FIG. 55B shows the configuration of each dispersion compensation interval. In the illustrated optical transmission system 1a-3, each dispersion compensation interval includes six repeater sections. Specifically, it requires all four kinds of cables, i.e., +Davg/−Davg, −Davg/+Davg, +Davg/+Davg, and −Davg/−Davg. Pump light beams are supplied to one +Davg/−Davg section, one −Davg/+Davg section, two +Davg/+Davg sections, and two −Davg/−Davg sections.

The same power balance adjustment algorithm AL3 (FIG. 53) can be used to control the above system 1a-3. To attain a proper power balance between upstream and downstream links, the algorithm AL3 manipulates pump light power in one −Davg/+Davg section and one +Davg/−Davg section out of the six repeater sections. The algorithm AL3 also manipulates −Davg/−Davg and +Davg/+Davg sections to vary the average gain of both upstream and downstream links.

Figures 56A, 56B:
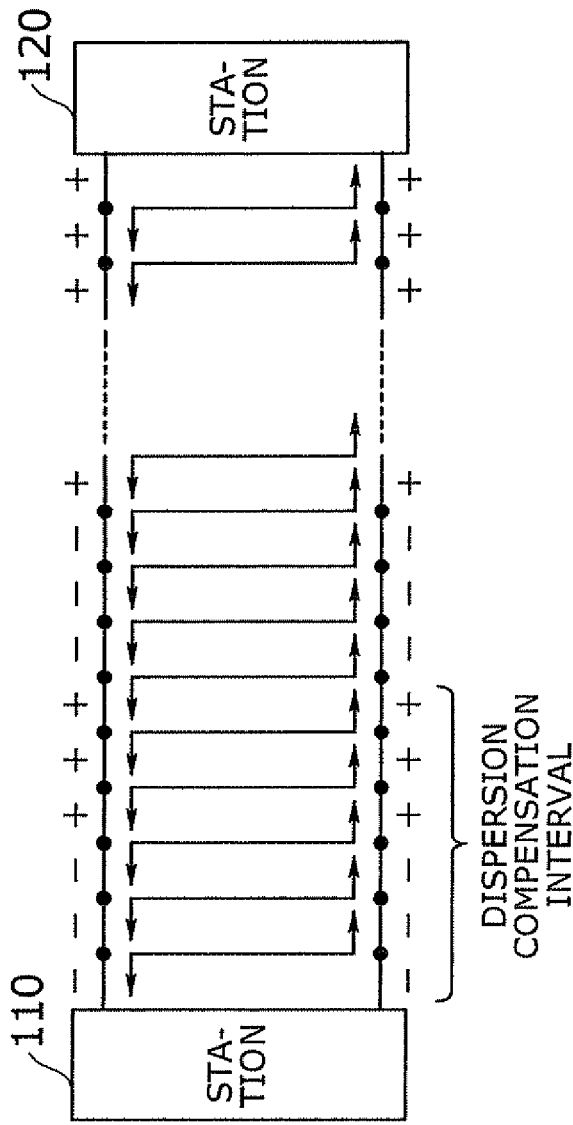
FIGS. 56A and 56B show a configuration of yet another optical transmission system.

FIG. 56A gives still another optical transmission system, and FIG. 56B shows the configuration of each dispersion compensation interval. In the illustrated optical transmission system 1a-4, each dispersion compensation interval includes six repeater sections. Specifically, it only requires two kinds of cables, i.e., +Davg/+Davg and −Davg/−Davg. Pump light beams are supplied to one +Davg/−Davg section, one −Davg/+Davg section, two +Davg/+Davg sections, and two −Davg/−Davg sections.

The same power balance adjustment algorithm AL3 (FIG. 53) can be used to control the above system 1a-4. To attain a proper power balance between upstream and downstream links, the algorithm AL3 manipulates pump light power in one −Davg/+Davg section and one +Davg/−Davg section out of the six repeater sections. The algorithm AL3 also manipulates −Davg/−Davg and +Davg/+Davg sections to vary the average gain of both upstream and downstream links.

To summarize the above discussion, the proposed optical transmission system sends WDM optical signals over a dispersion-managed optical transmission line that is constructed as a series of dispersion compensation intervals. The transmission line is designed in such a way that it has a non-zero net chromatic dispersion at every boundary point between dispersion compensation intervals, or in such a way that the number of boundary points with zero net chromatic dispersion is reduced.

Repeater sections may have a hybrid structure of a negative-dispersion fiber and a positive-dispersion fiber. When repeaters employ Raman amplifiers, different lengths of negative-dispersion and negative-dispersion fibers would cause imbalance between upstream and downstream signal levels. The present invention addresses this problem by controlling pump light power within each dispersion compensation interval, so that the balance between upstream and downstream signal power levels will be attained. Those features of the present invention alleviates waveform distortions due to nonlinear effects in fibers, as well as avoiding imbalance between upstream and downstream Raman gains. The present invention thus improves quality and reliability of optical communication services.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system that delivers optical signals in upstream and downstream directions, the optical transmission system comprising:

(a) upstream and downstream optical transmission lines that are divided into a plurality of repeater sections each composed of a first fiber and a second fiber, the first fiber having positive dispersion, the second fiber having negative dispersion, the second fiber having a smaller mode field diameter than the first fiber, the optical signals propagating from the first fiber to the second fiber;

(b) a plurality of optical repeaters, each comprising:

a monitor that monitors power levels of the upstream and downstream optical signals, and a pumping unit that controls pump light power based on monitoring results supplied from said monitor, so as to adjust power balance between the upstream optical signals and the downstream optical signals for each dispersion compensation interval, when the second fibers used in the immediately adjacent repeater sections have different lengths;

(c) a variable optical attenuator disposed on said optical transmission line that assists said optical repeaters to adjust the power balance between the upstream optical signals and downstream optical signals; and (d) a variable gain equalizer disposed on said optical transmission line that compensates for deviation of optical amplification gain;

wherein:

said variable gain equalizer resides in a gain equalizing section that is one of the repeater sections;

the first fiber and second fiber in the gain equalizing section have equal lengths, and the dispersion compensation interval accommodating the gain equalizing section has a different pattern of section average dispersions from the other dispersion compensation intervals.

2. The optical transmission system according to claim 1, wherein said pumping unit comprises:

a pumping controller that varies power level of a pump light, depending on the monitoring results; and a splitter that splits the pump light into two light beams for delivery to the second fibers constituting the upstream and downstream transmission lines.

3. The optical transmission system according to claim 1, wherein said pumping unit comprises:

a pumping controller that produces a pump light at a constant power level; and a variable splitter that splits the pump light into two light beams at a split ratio for delivery to the second fibers constituting the upstream and downstream transmission lines, the split ratio being determined in accordance with the monitoring results.

4. A method of amplifying and relaying optical signals over upstream and downstream transmission lines, the optical transmission lines being divided into a plurality of repeater sections each composed of a first fiber with positive dispersion and a second fiber with negative dispersion, the second fiber having a smaller mode field diameter than the first fiber, the optical signals propagating from the first fiber to the second fiber in each repeater section, said method comprising:

(a) monitoring power levels of upstream and downstream optical signals;

(b) controlling pump light power based on monitoring results supplied from said monitor, so as to adjust power balance between the upstream optical signals and the downstream optical signals for each dispersion compensation interval, when the second fibers used in the immediately adjacent repeater sections have different lengths;

(c) providing at least one of a variable optical attenuator and a variable gain equalizer for assisting said adjustment of the power balance;

(d) providing the first fiber and second fiber with equal lengths in a gain equalizing section that accommodates the variable gain equalizer; and (e) assigning different patterns of section average dispersions to the dispersion compensation interval accommodating the gain equalizing section and the other dispersion compensation intervals.

* * * * *